(12) United States Patent
Mesher et al.

(10) Patent No.: US 9,631,136 B2
(45) Date of Patent: Apr. 25, 2017

(54) AMIDE BRANCHED AROMATIC GELLING AGENT ENHANCERS AND BREAKERS

(71) Applicant: SynOil Fluids Holdings Inc., Calgary (CA)

(72) Inventors: Shaun T. Mesher, Calgary (CA); Olivia Steward, Frome (GB); Daniel Firth, St. Andrews (GB); Robert Moran, St. Helens (GB)

(73) Assignee: SynOil Fluids Holding Inc., Calgary (CA)

( * ) Notice: Subject to any disclaimer, the term of this patent is extended or adjusted under 35 U.S.C. 154(b) by 159 days.

(21) Appl. No.: 14/035,837

(22) Filed: Sep. 24, 2013

(65) Prior Publication Data

US 2014/0142004 A1 May 22, 2014

Related U.S. Application Data

(60) Provisional application No. 61/706,493, filed on Sep. 27, 2012.

(30) Foreign Application Priority Data

Sep. 24, 2012 (CA) ..................................... 2790760

(51) Int. Cl.
*C09K 8/80* (2006.01)
*C09K 8/035* (2006.01)
(Continued)

(52) U.S. Cl.
CPC ................ *C09K 8/80* (2013.01); *C09K 8/035* (2013.01); *C09K 8/34* (2013.01); *C09K 8/502* (2013.01);
(Continued)

(58) Field of Classification Search
None
See application file for complete search history.

(56) References Cited

U.S. PATENT DOCUMENTS 3,846,310 A 11/1974 Blackwell
6,372,235 B1 4/2002 Livoreil
(Continued)

FOREIGN PATENT DOCUMENTS

CA 2790760 A1 3/2013
EP 2 254 127 A1 11/2010
(Continued)

OTHER PUBLICATIONS

"AC1N5TIQ—Compound Summary," PubChem Chemical Database, <http://pubchem.ncbi.nlm.nih.gov/summary/summary.cgi?cid=4203179&loc=ec_rcs> [retrieved Jan. 28, 2013], 4 pages.
(Continued)

*Primary Examiner* — Jeffrey Washville
(74) *Attorney, Agent, or Firm* — Christensen O'Connor Johnson Kindness PLLC

(57) ABSTRACT

A downhole fluid comprises a base fluid, for example a hydrocarbon base fluid, a gelling agent, and a gel enhancer. The gelling agent has an aromatic core of one or more aromatic rings, the gelling agent having two or more amide branches distributed about the aromatic core, each of the two or more amide branches having one or more organic groups. An example gelling agent is a pyromellitamide gelling agent. A method of making a downhole fluid, the method comprising: combining a base fluid, a gelling agent, and a gel enhancer. A downhole fluid comprising a base fluid, a gelling agent, a breaker, and a gel enhancer. Downhole fluids with such gels and a breaker are also disclosed.

23 Claims, 41 Drawing Sheets

(51) Int. Cl.
C09K 8/92 (2006.01)
C09K 8/34 (2006.01)
C09K 8/64 (2006.01)
C09K 8/502 (2006.01)
C09K 8/565 (2006.01)
C09K 8/82 (2006.01)

(52) U.S. Cl.
CPC .............. C09K 8/565 (2013.01); C09K 8/64 (2013.01); C09K 8/82 (2013.01); C09K 8/92 (2013.01)

(56) References Cited

U.S. PATENT DOCUMENTS

| | | | |
|---|---|---|---|
| 6,645,577 | B2 | 11/2003 | Horikiri |
| 7,186,454 | B2 | 3/2007 | Nagano |
| 7,235,191 | B2 | 6/2007 | Schmidt |
| 7,423,088 | B2 | 9/2008 | Mäder |
| 7,521,400 | B2 | 4/2009 | Samuel |
| 7,790,793 | B2 | 9/2010 | Schmidt |
| 8,034,952 | B2 | 10/2011 | Eddaoudi |
| 2007/0078256 | A1 | 4/2007 | Takaragi |
| 2007/0149663 | A1 | 6/2007 | Schmidt |
| 2011/0105370 | A1 | 5/2011 | Mesher |
| 2011/0230109 | A1 | 9/2011 | Chin |

FOREIGN PATENT DOCUMENTS

| | | | | |
|---|---|---|---|---|
| FR | EP 2254127 A1 | * | 11/2010 | ............... H01B 3/20 |
| JP | 2006-257382 A | | 9/2006 | |
| WO | 2013/040718 A1 | | 3/2013 | |

OTHER PUBLICATIONS

Almog, J., et al., "Synthesis of 'Capped Porphyrins,'" Tetrahedron 37(21):3589-3601, 1981.

Cheng, R.R., and S.L. Wunder, "NMR and FTIR Investigation of the Solution Imidization Kinetics of Model Compounds of PMDA/ODA Polyamic Ethyl Ester," Journal of Polymer Science: Part B: Polymer Physics 34(3):435-448, Feb. 1996.

"CID 13363507—Compound Summary," PubChem Chemical Database, <http://pubchem.ncbi.nlm.nih.gov/summary/summary.cgi?cid=11363507&loc=ec_rcs> [retrieved Feb. 5, 2013], 3 pages.

"CID 59109418—Compound Sum may,"PubChemChemical Database <htp://pubchem.ncbi.nlm.nih.gov/summay/summary.cgi?cid=59109418&loc=ec_rcs> [retrieved Jan. 28, 2013], 3 pages.

"Compound Summary CID 1419369," PubChem Chemical Database, <http://pubchem.ncbi.nlm.nih.gov/summary/summary.cgi?cid=14419369> [retrieved Jun. 23, 2011], 2 pages.

Compounds found on a search performed on the PubChem Chemical Database [online], at least as early as Jun. 2011, 14 pages.

Dehn, S., et al., "The Structure and Luminescence Properties of Europium (III) Triflate Doped Self-Assembled Pyromellitamide Gels," New Journal of Chemistry 35(7):1466-1471, Jul. 2011.

"Detail of 137707-32-5," LookChem, <http://www.lookchem.com/cas-137/137707-32-5.html> [retrieved Jul. 11, 2011], 2 pages.

"Hydrocarbon Liquid Analysis," CoreLab Reservoir Analysis, Sep. 20, 2011, 1 page.

International Search Report and Written Opinion of the International Searching Authority mailed Jan. 15, 2013, issued in corresponding International Application No. PCT/CA2012/050670, filed Sep. 24, 2012, 8 pages.

International Search Report and Written Opinion of the International Searching Authority mailed Dec. 3, 2013, issued in International Application No. PCT/CA2013/050238, filed Mar. 22, 2013, 12 pages.

International Search Report and Written Opinion of the International Searching Authority mailed Dec. 4, 2013, issued in International Application No. PCT/CA2013/050729, filed Sep. 24, 2013, 11 pages.

Juwarker, H., and K.-S. Jeong, "Anion-Controlled Foldamers," Chemical Society Reviews 39(10):3664-3674, Oct. 2010.

"SureCN12245070," PubChem Chemical Database, <http://pubchem.ncbi.nlm.nih.gov/summary/summary.cgi?cid=58436287&loc=ec_rcs> [retrieved Feb. 5, 2013], 3 pages.

"SureCN3071609—Compound Summary," PubChem Chemical Database, <http://pubchem.ncbi.nlm.nih.gov/summary/summary.cgi?cid=12731559&loc=ec_rcs> [retrieved Jan. 28, 2013], 3 pages.

"SureCN5080845—Compound Summary," PubChem Chemical Database, <http://pubchem.ncbi.nlm.nih.gov/summary/summary.cgi?cid=21966950&loc=ec_rcs> [retrieved Jan. 28, 2013], 3 pages.

"SureCN9164909—Compound Summary," PubChem Chemical Database, <http://pubchem.ncbi.nlm.nih.gov/summary/summary.cgi?cid=54488810&loc=ec_rcs> [retrieved Jan. 28, 2013], 3 pages.

Thordarson, P., "From Anion- to Redox-Sensitive Gelators—Improving Our Understanding of Self-Assembled Gels," poster session presented at the Conference of the International Symposium on Macrocyclic & Supramolecular Chemistry, Brighton, U.K., Jul. 3-7, 2011 <http://rsc.conference-services.net/resources/728/2367/pdf/ISMSC2011_0053.pdf>, 1 page.

Tong, K.W.K., et al., "Pyromellitamide Gelators: Exponential Rate of Aggregation, Hierarchical Assembly, and Their Viscoelastic Response to Anions," Langmuir 25(15):8586-8592, Aug. 2009.

Truong, W.T., et al., "Self-Assembled Gels for Biomedical Applications," Chemistry—An Asian Journal 6(1):30-42, Jan. 2011.

Webb, J.E.A., et al., "Pyromellitamide Aggregates and Their Response to Anion Stimuli," Journal of the American Chemical Society 129(22):7155-7162, Jun. 2007.

Extended European Search Report mailed Mar. 9, 2016, issued in European Application No. EP 13839421, filed Sep. 24, 2013, 11 pages.

* cited by examiner

AMIDE BRANCHED AROMATIC GELLING AGENT ENHANCERS AND BREAKERS

TECHNICAL FIELD

This document relates to amide branched aromatic gelling agent enhancers and breakers.

BACKGROUND

Benzamide gelling agents have been proposed or used in LCD displays and as amide nucleating agents. Pyromellitamide gelling agents have been proposed or used in tissue engineering, drug delivery, LCD displays, and catalysis.

SUMMARY

A downhole fluid is disclosed comprising a base fluid and a gelling agent with an aromatic core of one or more aromatic rings, the gelling agent having two or more amide branches distributed about the aromatic core, each of the two or more amide branches having one or more organic groups. A gel enhancer, breaker, or both may be added to such a fluid.

A downhole fluid is disclosed comprising a base fluid and a pyromellitamide gelling agent. The pyromellitamide gelling agent may have the general formula of:

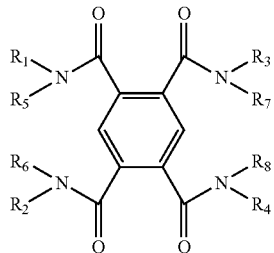

with $R_1$, $R_2$, $R_3$, $R_4$, $R_5$, $R_6$, $R_7$, and $R_8$ each being a hydrogen or an organic group.

A downhole fluid is also disclosed comprising a base fluid, a gelling agent, and a gel enhancer, in which the gelling agent has an aromatic core of one or more aromatic rings, the gelling agent has two or more amide branches distributed about the aromatic core, and each of the two or more amide branches has one or more organic groups.

A method is also disclosed comprising introducing the downhole fluid into a downhole formation. A method of making a downhole fluid is also disclosed, the method comprising: combining the base fluid and gelling agent. A composition for gelling a downhole fluid is also disclosed, the composition comprising an amide branched aromatic gelling agent and a wetting agent.

A gelling agent is also disclosed for a downhole fluid, the gelling agent having the general formula of:

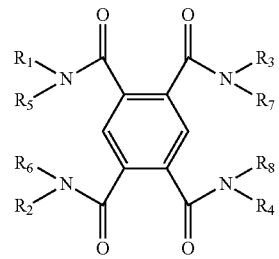

with $R_1$, $R_2$, $R_3$, $R_4$, $R_5$, $R_6$, $R_7$, and $R_8$ each being a hydrogen or a C7-24 alkyl group.

A method is also disclosed comprising using the downhole fluid as a drilling fluid or as a downhole treatment fluid.

A method is disclosed of making the downhole fluid by combining the base fluid, the gelling agent, and the gel enhancer.

A downhole fluid is also disclosed comprising a base fluid, a gelling agent, and a breaker, in which the gelling agent has an aromatic core of one or more aromatic rings, the gelling agent has two or more amide branches distributed about the aromatic core, and each of the two or more amide branches has one or more organic groups.

A downhole fluid is also disclosed comprising a base fluid, a pyromellitamide gelling agent, a breaker, and a gel enhancer.

In various embodiments, there may be included any one or more of the following features: Each of the amide branches is connected to the aromatic core via a carbon-carbon or carbon-nitrogen bond. One or more of the amide branches are connected to the aromatic core via a carbon-nitrogen bond. Each of the amide branches is connected to the aromatic core via a carbon-nitrogen bond. Three or four amide branches are present. Each organic group is an alkyl group. Each alkyl group is a straight chain alkyl group. Each alkyl group has 6-24 carbon atoms. The aromatic core is benzene. Each of the amide branches are connected to the aromatic core via a carbon-nitrogen bond, and each organic group is an alkyl group with 6-24 carbon atoms. One or more of the amide branches is connected to the aromatic core via a carbon-carbon bond and one or more of the amide branches are connected to the aromatic core via a carbon-nitrogen bond. Each alkyl group has 6-12 carbon atoms. The aromatic core is naphthalene. Each of the amide branches has one organic group. The gelling agents exclude pyromellitamide gelling agents. The gelling agent is a pyromellitamide gelling agent. The pyromellitamide gelling agent has the general formula of:

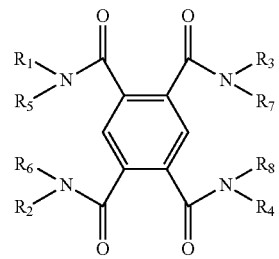

with $R_1$, $R_2$, $R_3$, $R_4$, $R_5$, $R_6$, $R_7$, and $R_8$ each being a hydrogen or an organic group. $R_5$, $R_6$, $R_7$, and $R_8$ are each hydrogens and one or more of $R_1$, $R_2$, $R_3$, and $R_4$ is each an alkyl group. $R_1$, $R_2$, $R_3$, and $R_4$ are each alkyl groups. $R_1=R_2=R_3=R_4$. $R_1$, $R_2$, $R_3$, and $R_4$ each has at least 6 carbon atoms. Each alkyl group has 6-24 carbon atoms. Each alkyl group has 6-10 carbon atoms. Each alkyl group is one or more of straight chain, branched, aromatic, or cyclic. Each alkyl group is straight chain. $R_5$, $R_6$, $R_7$, and $R_8$ are each hydrogens, and $R_1$, $R_2$, $R_3$, and $R_4$ are each straight chain alkyl groups with 6-10 carbon atoms. $R_1$, $R_2$, $R_3$, and $R_4$ have 6 carbon atoms. The base fluid comprises hydrocarbons. The hydrocarbons have 3-8 carbon atoms. The hydrocarbons have 3-24 carbon atoms. The hydrocarbons comprise liquefied petroleum gas. The base fluid comprises one or more of nitrogen or carbon dioxide. A breaker is used or present. The breaker is a water-activated breaker and the downhole fluid comprises a hydrate. The breaker further comprises an ionic salt. The ionic salt further comprises one or more of a bromide, a chloride an organic salt, and an amine salt. The breaker comprises one or more of an alcohol or alkoxide salt. The one or more of an alcohol or alkoxide salt has 2 or more carbon atoms. The alkoxide salt is present and comprises aluminium isopropoxide. The alkoxide salt is present and the downhole fluid comprises a hydrate. The breaker comprises a salt of piperidine and the downhole fluid comprises a hydrate. The breaker further comprises a coating. The coating further comprises wax. The gel enhancer may be a cross linker. The gel enhancer comprises an organic molecule, such as a heterocycle, with at least two heteroatoms that are spaced from one another and each have one or more lone pairs of electrons. The heterocycle forms a 6 atom ring with the two non carbon atoms located at the 1 and 4 positions or on respective functional groups originating from the 1 and 4 positions. The heterocycle comprises piperazine. The gel enhancer comprises one or more of a metal compound, potassium tert-butoxide, diethanolamine, L-menthol, lactic acid, mandelic acid, ammonium acetate, paraformaldehyde, hydroquinone, and tetramethylammonium hydroxide. The metal compound is present and comprises one or more of iron and aluminium. The downhole fluid has a surfactant for dispersing the gel enhancer in the base fluid. The metal compound comprises iron (III) sulfate. The surfactant forms a complex with the gel enhancer in the base fluid. The metal compound is soluble in pure form in the base fluid. The metal compound comprises a metal alkoxide. The metal alkoxide comprises aluminium isopropoxide. The gel enhancer comprises a salt of an aromatic carboxylic acid. The salt of an aromatic carboxylic acid comprises an ibuprofen salt. The gel enhancer comprises one or more of ammonium chloride, melamine, choline chloride, and hexamethylene diaminochloride. The gelling agent forms a hydrogen-bond network through intermolecular hydrogen bonds between the amide branches of adjacent gelling agent molecules, and in which the gel enhancer cross-links the intermolecular hydrogen bonds or facilitates the intermolecular hydrogen bonds. The downhole fluid has a modifier selected to convert the gel enhancer into a breaker. The gel enhancer is present below a threshold concentration above which the gel enhancer becomes a breaker, and in which the modifier comprises an additional source of gel enhancer sufficient to raise the concentration of gel enhancer to above the threshold concentration. The gel enhancer comprises piperidine or piperazine. The gel enhancer comprises piperidine and the modifier comprises benzylamine. The gel enhancer comprises a salt of an aromatic carboxylic acid, and in which the modifier comprises a protonation source or a cation complexing agent. The protonation source comprises acid. The cation complexing agent comprises citric acid and the salt of an aromatic carboxylic acid comprises ibuprofen salt. The modifier further comprises a coating. A breaker and a gel enhancer may be present and distinct from one another. The breaker comprises an aromatic carboxylic acid. The breaker comprises one or more of ibuprofen and hydrocinnamic acid. The breaker comprises one or more of diphenylacetic acid, benzoic acid, and phenylacetic acid. A cation complexing agent is present, in which the aromatic carboxylic acid is a salt. The aromatic carboxylic acid comprises an ibuprofen salt and the cation complexing agent comprises citric acid. The gelling agent forms a hydrogen-bond network through intermolecular hydrogen bonds between the amide branches of adjacent gelling agent molecules, and in which the breaker disrupts the intermolecular hydrogen bonds. The breaker is a hydrogen bonding agent that forms a hydrogen bond, with the amide branches of the gelling agent, that is stronger than the intermolecular hydrogen bonds between the amide branches of adjacent gelling agent molecules. The downhole fluid is for use as a drilling fluid. The downhole fluid is for use as a downhole treatment fluid. Introducing the downhole fluid into a downhole formation. Fracturing the downhole formation. Recovering downhole fluid from the downhole formation, and recycling the recovered downhole fluid. Recycling further comprises removing a breaker from the recovered downhole fluid. The gelling agent is provided with a carrier. The carrier comprises glycol. The gelling agent is provided with a wetting agent. The gelling agent is provided with a suspending agent. Combining is done on the fly before introducing the downhole fluid into a downhole formation.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

TABLE 1

Characteristics of viscosity testing of disclosed gelling agents.
Viscosity testing was carried out a Brookfield viscometer.
TB, TH, TO and TD refer to N,N',N'',N'''-tetrabutylbenzene-
1,2,4,5-tetracarboxamide (TB), N,N',N'',N'''-tetrahexylbenzene-
1,2,4,5- tetracarboxamide (TH), N,N',N'',N'''-tetraoctylbenzene-
1,2,4,5-tetracarboxamide (TO), and N,N',N'',N'''-
tetradecylbenzene-1,2,4,5-tetracarboxamide (TD), respectively.

| FIG. | Gelling Agent | Gelling Agent Concentration (mM) | Solvent | Shear Rate ($sec^{-1}$) | Temperature (° C.) |
|---|---|---|---|---|---|
| 3 | TH | 10 | TG740 | 100 | varying |
| 4 | TO | 10 | TG740 | 100 | varying |
| 5 | TD | 10 | TG740 | 100 | varying |
| 6 | TB | 10 | Cyclohexane | 100 | varying |
| 7 | TB | 7 | Cyclohexane | 100 | varying |
| 8 | TB | 5 | Cyclohexane | 100 | varying |
| 9 | TB | 4 | Cyclohexane | 100 | varying |
| 10 | TB | 3 | Cyclohexane | 100 | varying |

TABLE 1-continued

Characteristics of viscosity testing of disclosed gelling agents.
Viscosity testing was carried out a Brookfield viscometer.
TB, TH, TO and TD refer to N,N',N'',N'''-tetrabutylbenzene-
1,2,4,5-tetracarboxamide (TB), N,N',N'',N'''-tetrahexylbenzene-
1,2,4,5- tetracarboxamide (TH), N,N',N'',N'''-tetraoctylbenzene-
1,2,4,5-tetracarboxamide (TO), and N,N',N'',N'''-
tetradecylbenzene-1,2,4,5-tetracarboxamide (TD), respectively.

| FIG. | Gelling Agent | Gelling Agent Concentration (mM) | Solvent | Shear Rate (sec$^{-1}$) | Temperature (° C.) |
|---|---|---|---|---|---|
| 11 | TB | 2 | Cyclohexane | 100 | varying |
| 12 | TB | 1 | Cyclohexane | 100 | varying |
| 13 | TH | 7 | TG740 | 100 | varying |
| 14 | TH | 5 | TG740 | 100 | varying |
| 15 | TH | 4 | TG740 | 100 | varying |
| 16 | TH | 3 | TG740 | 100 | varying |
| 17 | TH | 2 | TG740 | 100 | varying |
| 18 | TH | 1 | TG740 | 100 | varying |
| 19 | TO | 7 | TG740 | 100 | varying |
| 20 | TO | 5 | TG740 | 100 | varying |
| 21 | TO | 4 | TG740 | 100 | varying |
| 22 | TO | 3 | TG740 | 100 | varying |
| 23 | TO | 2 | TG740 | 100 | varying |
| 24 | TO | 1 | TG740 | 100 | varying |
| 25 | TD | 7 | TG740 | 100 | varying |
| 26 | TD | 5 | TG740 | 100 | varying |
| 27 | TD | 4 | TG740 | 100 | varying |
| 28 | TD | 3 | TG740 | 100 | varying |
| 29 | TD | 2 | TG740 | 100 | varying |
| 30 | TD | 1 | TG740 | 100 | varying |
| 31 | TH:TO | 2:2 | TG740 | 100 | varying |
| 32 | TH:TO | 2:2 | TG740 | 100 | varying |
| 33 | TO:TD | 2:2 | TG740 | 100 | varying |
| 34 | TO:TD | 2:2 | TG740 | 100 | varying |
| 35 | TH:TD | 2:2 | TG740 | 100 | varying |
| 36 | TB | 7 | Cyclohexane | 100 | 25 |
| 37 | TB | 7 | Cyclohexane | 400 | 25 |
| 38 | TB | 7 | Cyclohexane | 500 | 25 |
| 39 | TB | 7 | Cyclohexane | varying | 25 |

Figure 39:
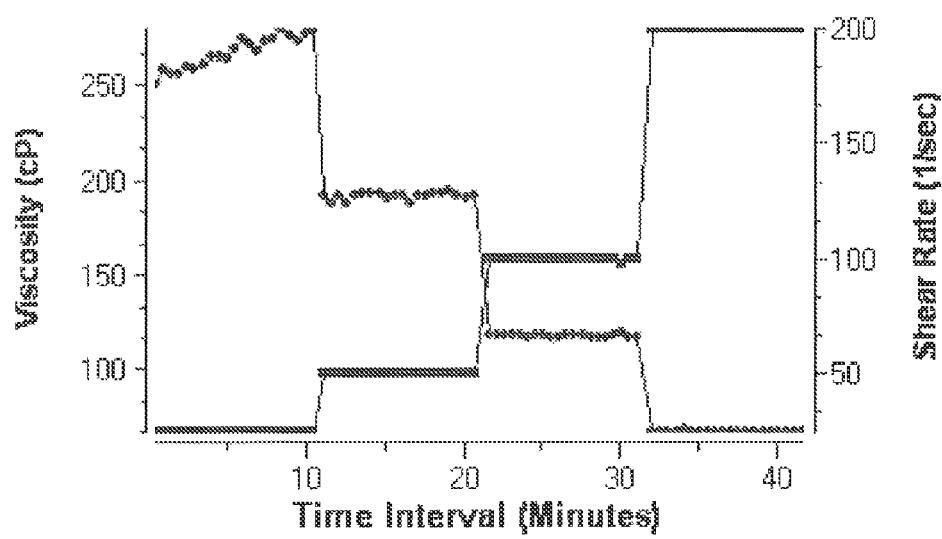
Figure 40:
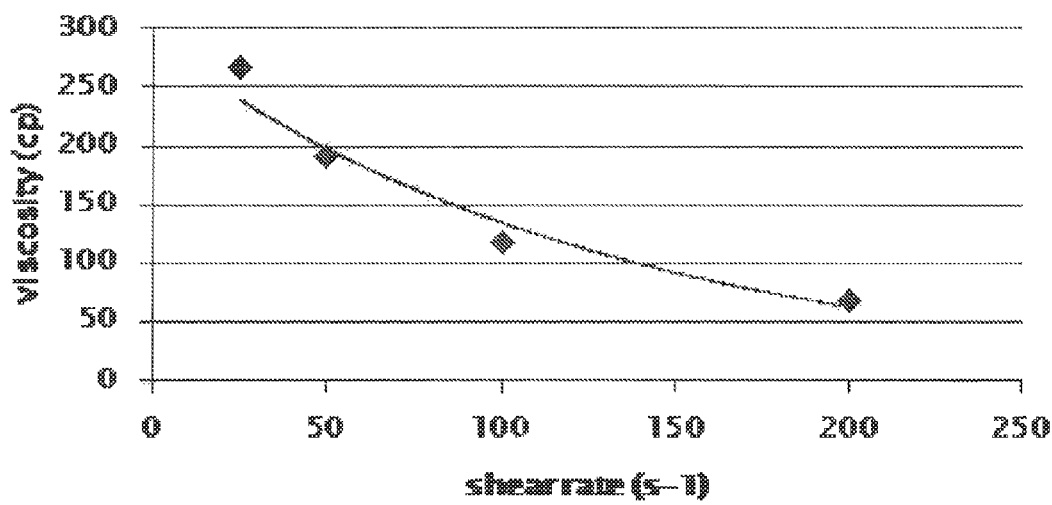

FIG. 40 is a graph of the data from FIG. 39, illustrating viscosity at different shear rates.

Figure 41:
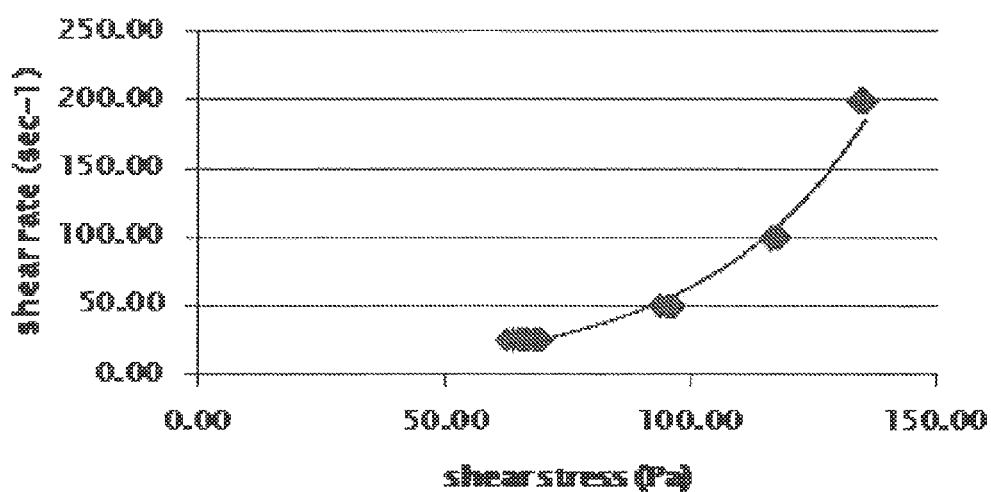

FIG. 41 is a graph of shear rate v. shear stress from the data of FIG. 39, illustrating non-newtonian behavior.

Figure 42:
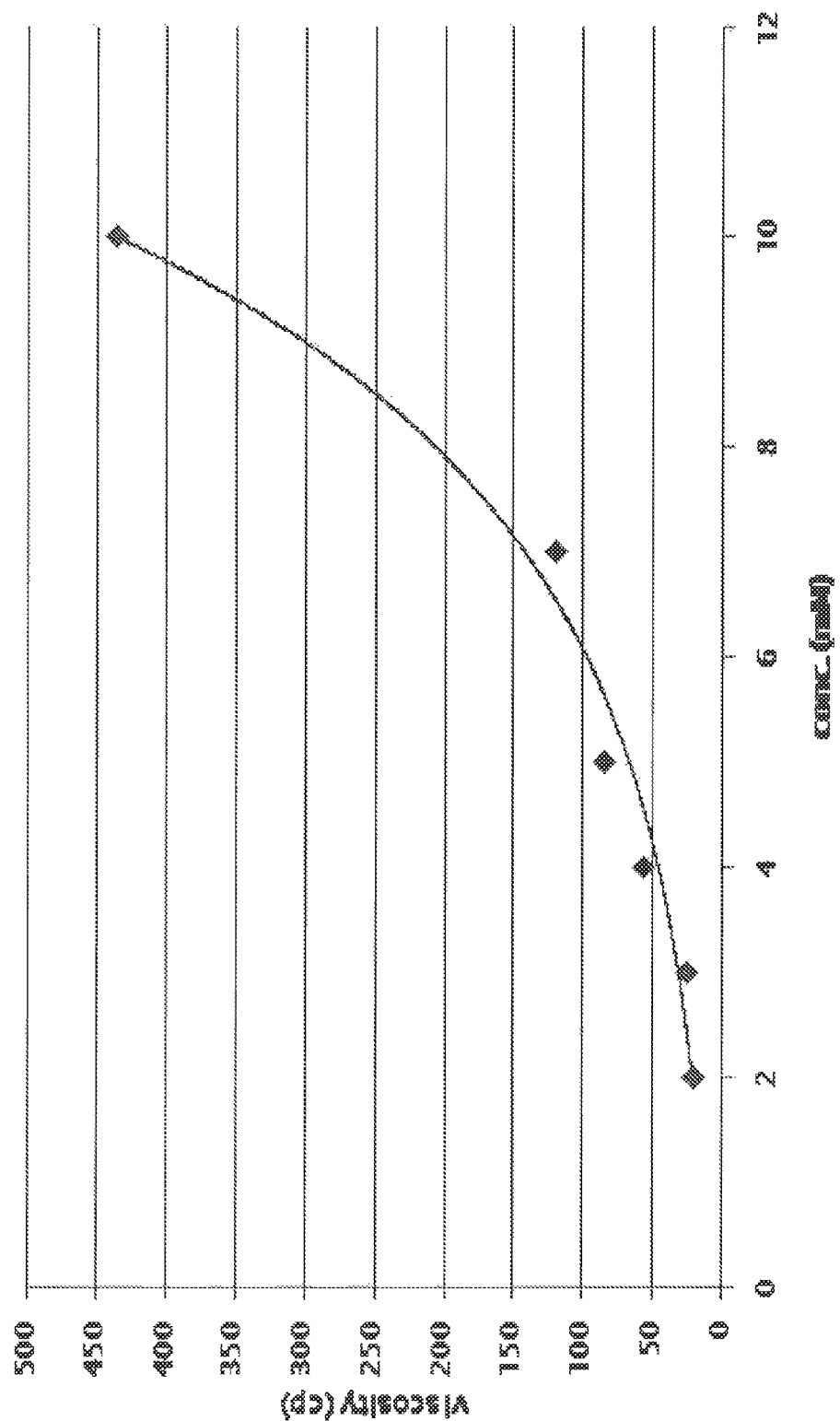

FIG. 42 is a graph of viscosity v. concentration for TB in cyclohexane.

Figure 43:
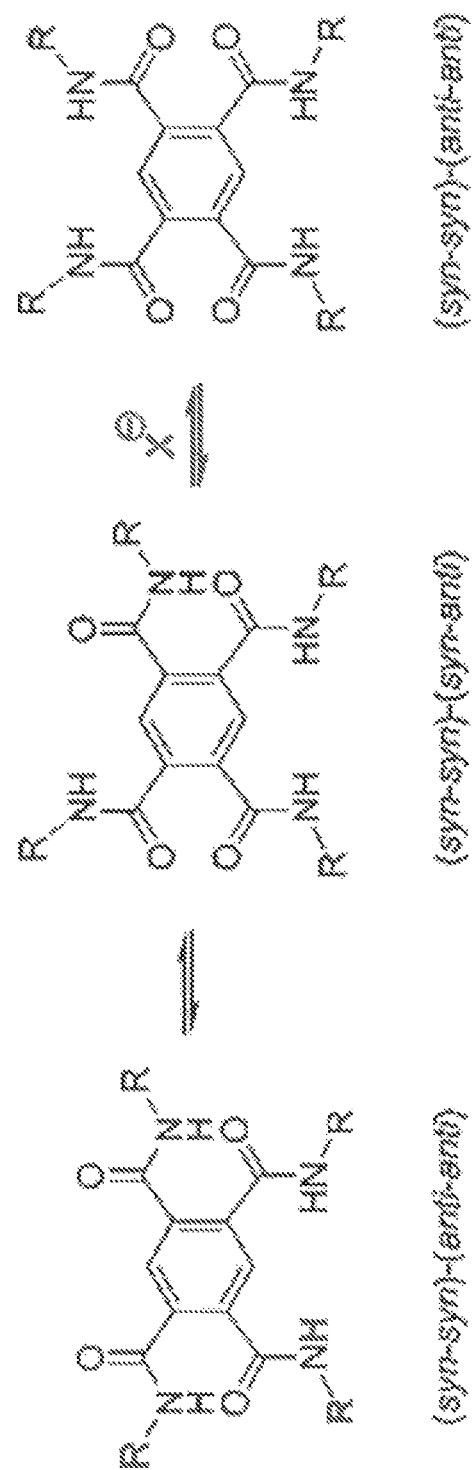

FIG. 43 is an illustration of various pyromellitamide rotamers.

Figure 44:
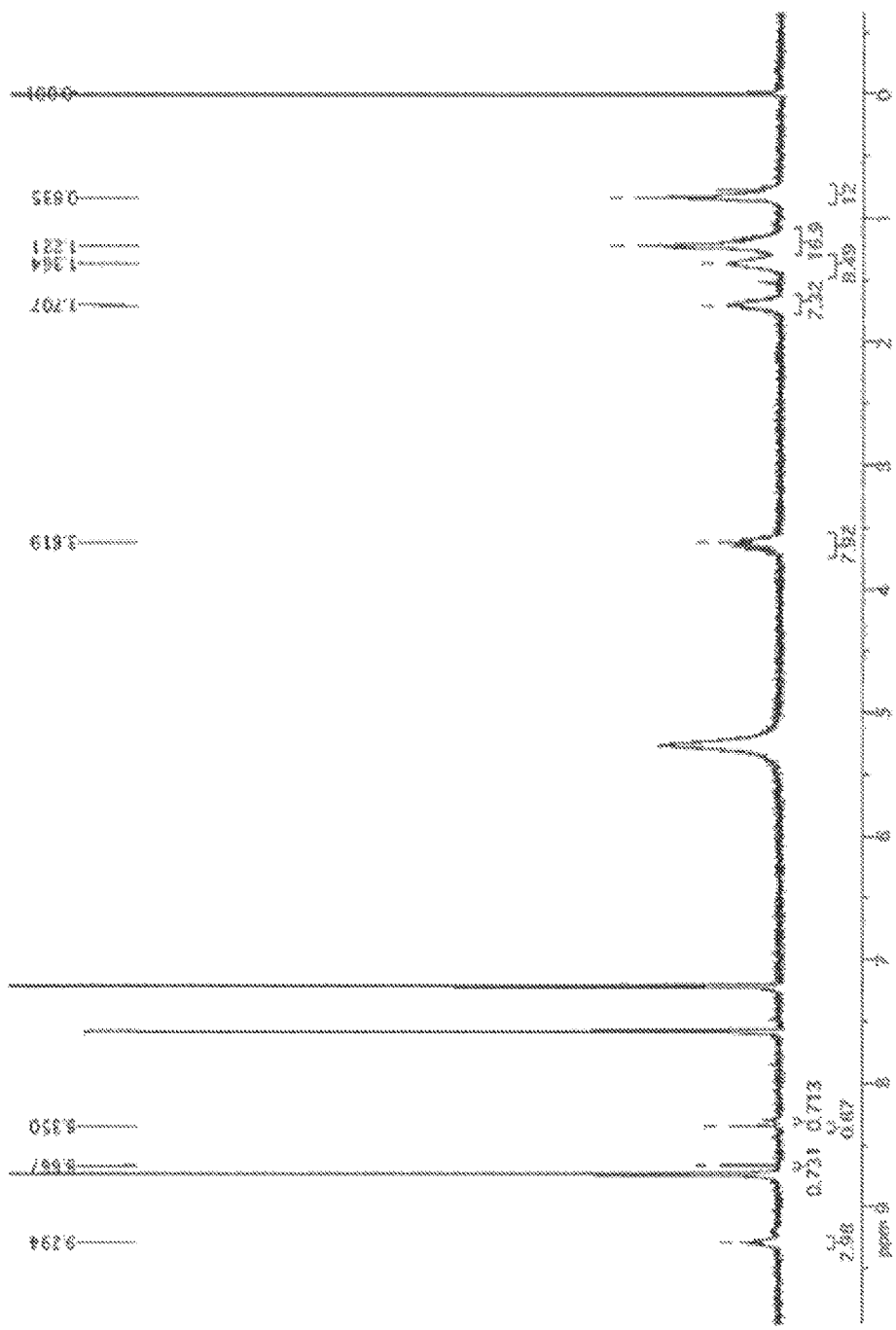

FIG. 44 is an $^1$H NMR spectrum for TH.

Figure 45:
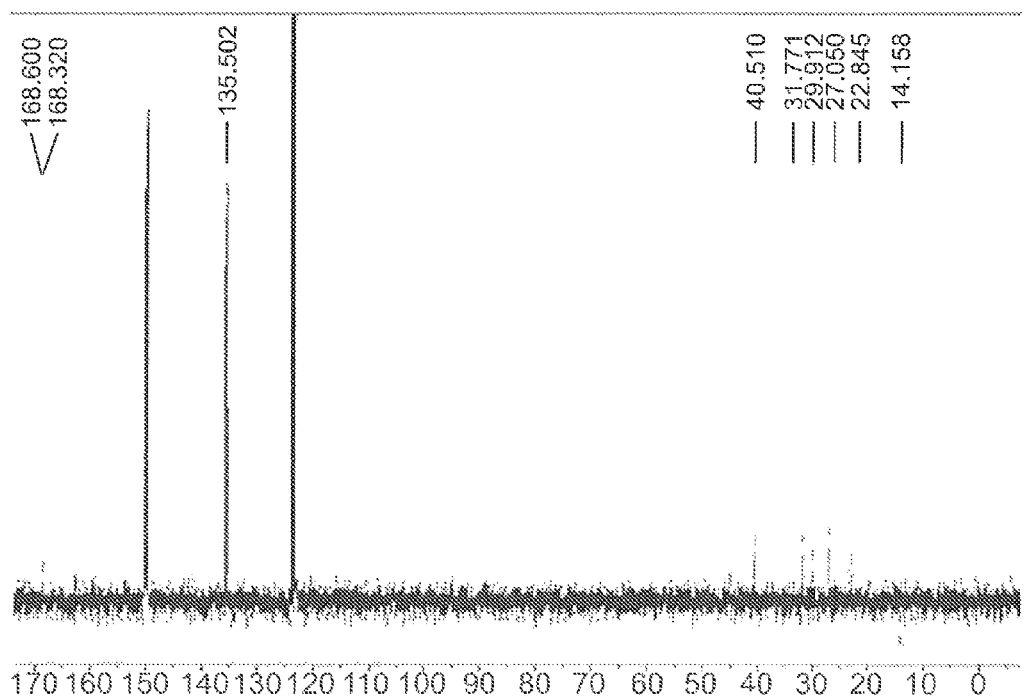

FIG. 45 is a $^{13}$C NMR spectrum for TH.

Figure 46:
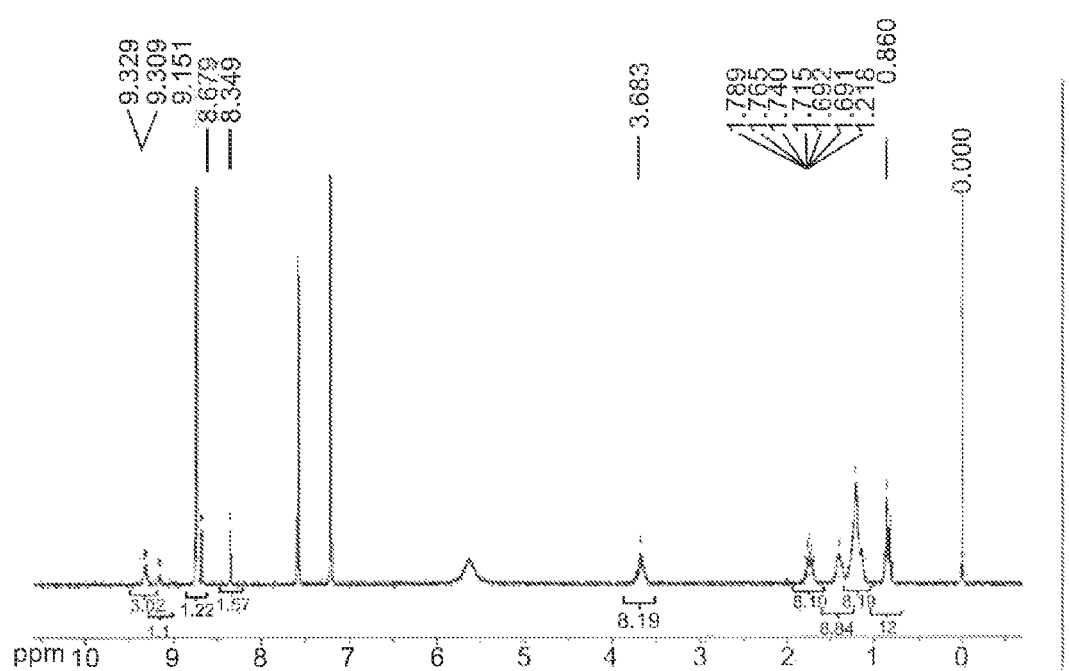

FIG. 46 is an $^1$H NMR spectrum for TO.

Figure 47:
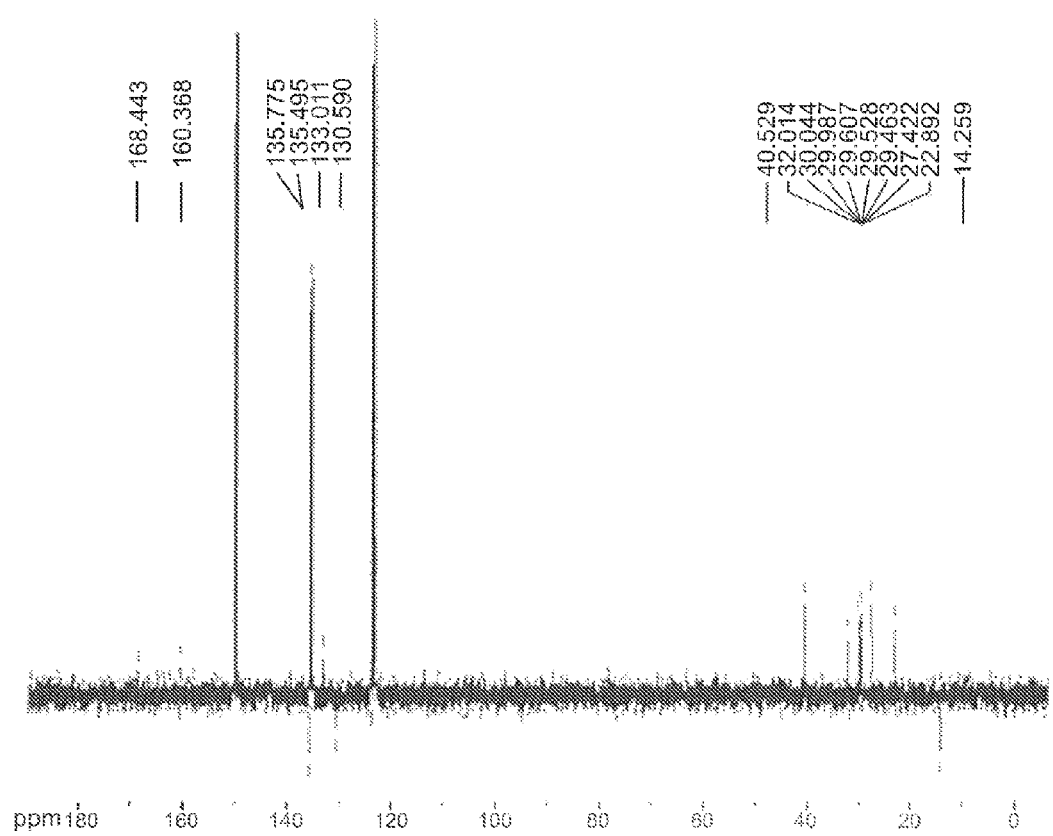
Figure 48:
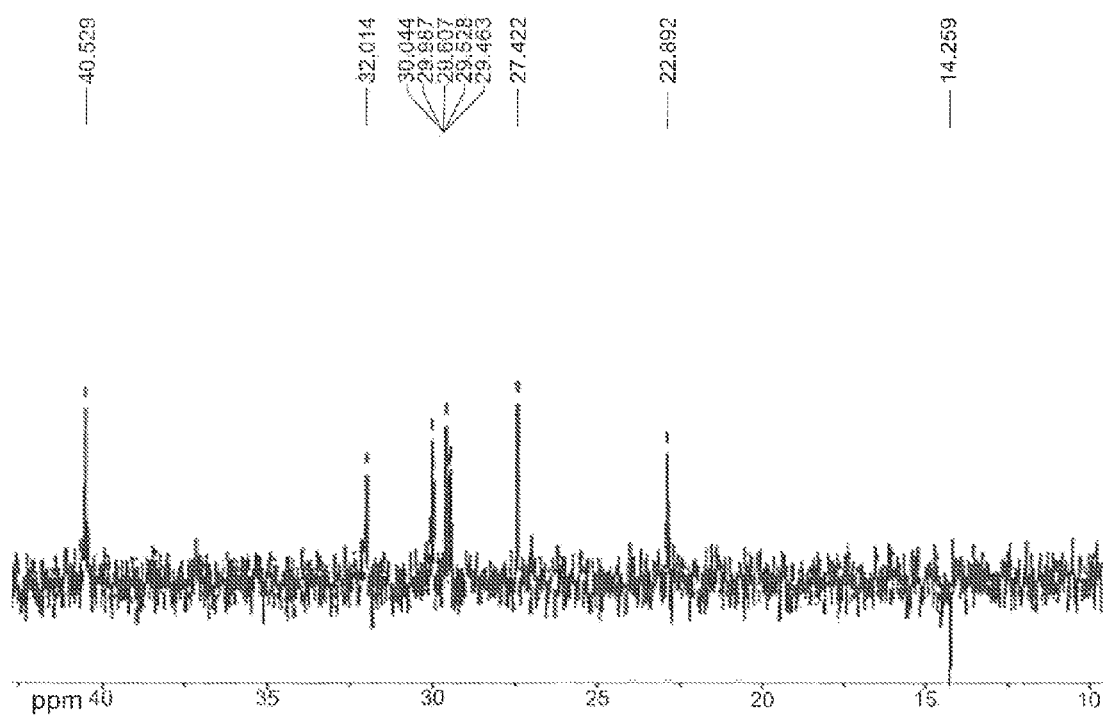

FIGS. 47 and 48 are $^{13}$C NMR spectra for TO. FIG. 48 is an expansion of a portion of the spectrum from FIG. 47 that illustrates the alkyl peaks.

Figure 49:
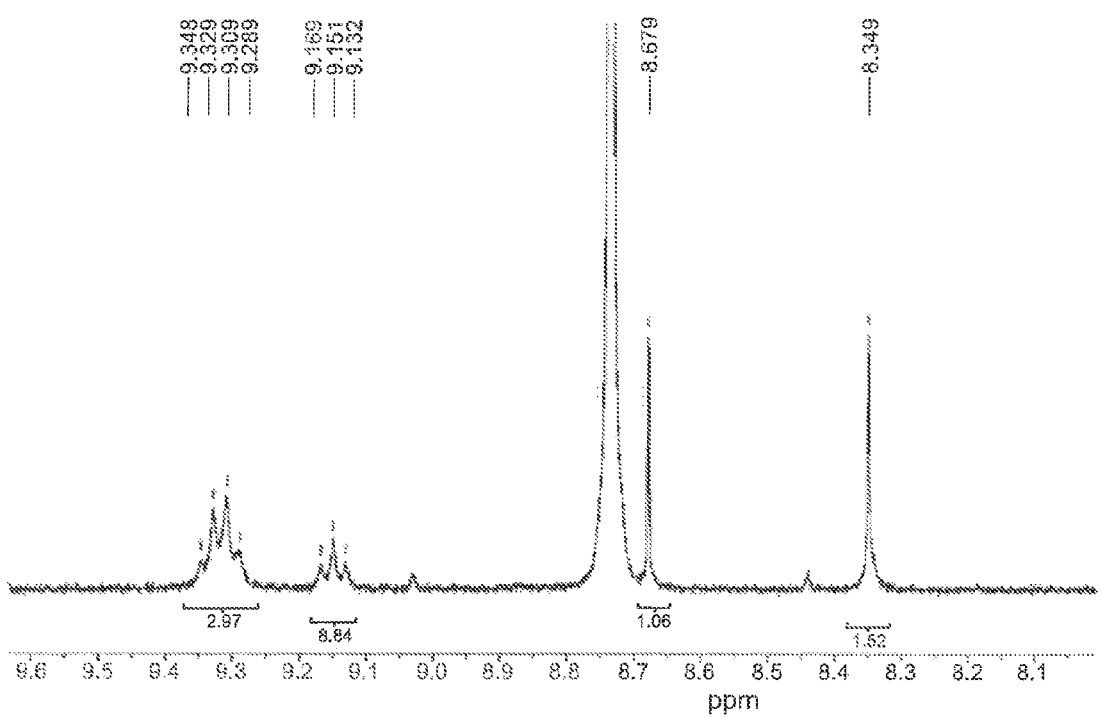

FIG. 49 is an expansion of the $^1$H NMR spectrum for TO from FIG. 46.

Figure 50:
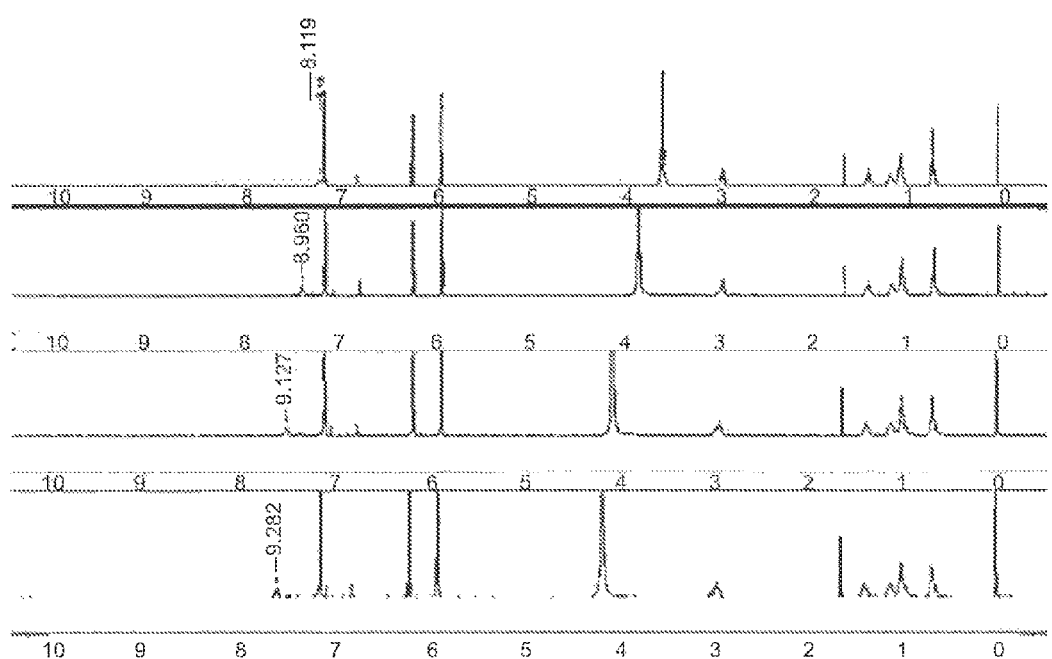

FIG. 50 is $^1$H NMR spectra for TH at varying temperatures of 25, 30, 50, and 70° C. from the bottom spectrum to the top spectrum respectively.

Figure 51:
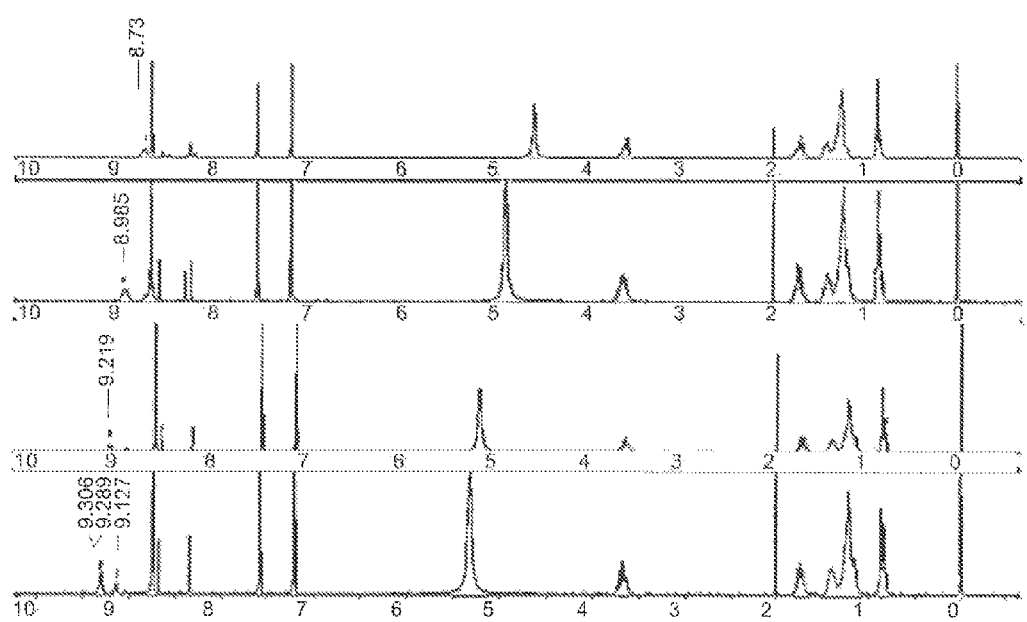

FIG. 51 is $^1$H NMR spectra for TO at varying temperatures of 25, 30, 50, and 70° C. from the bottom spectrum to the top spectrum respectively.

Figure 52:
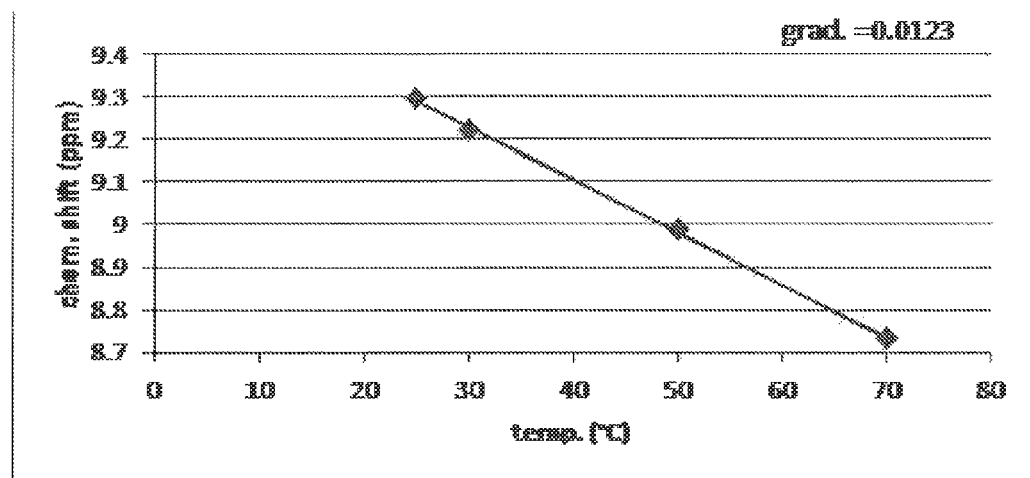

FIG. 52 is a graph of the amide hydrogen shift temperature dependence for TO.

Figure 53:
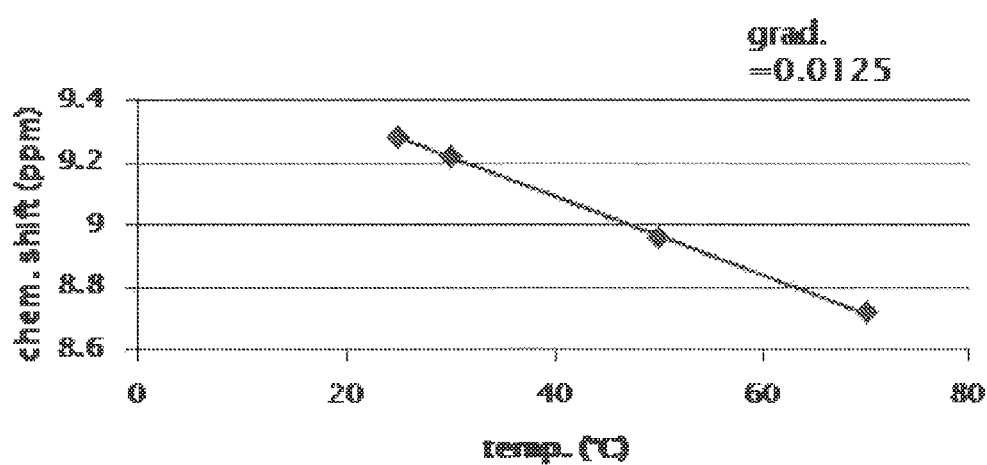

FIG. 53 is a graph of the amide hydrogen shift temperature dependence for TH.

Figure 54:
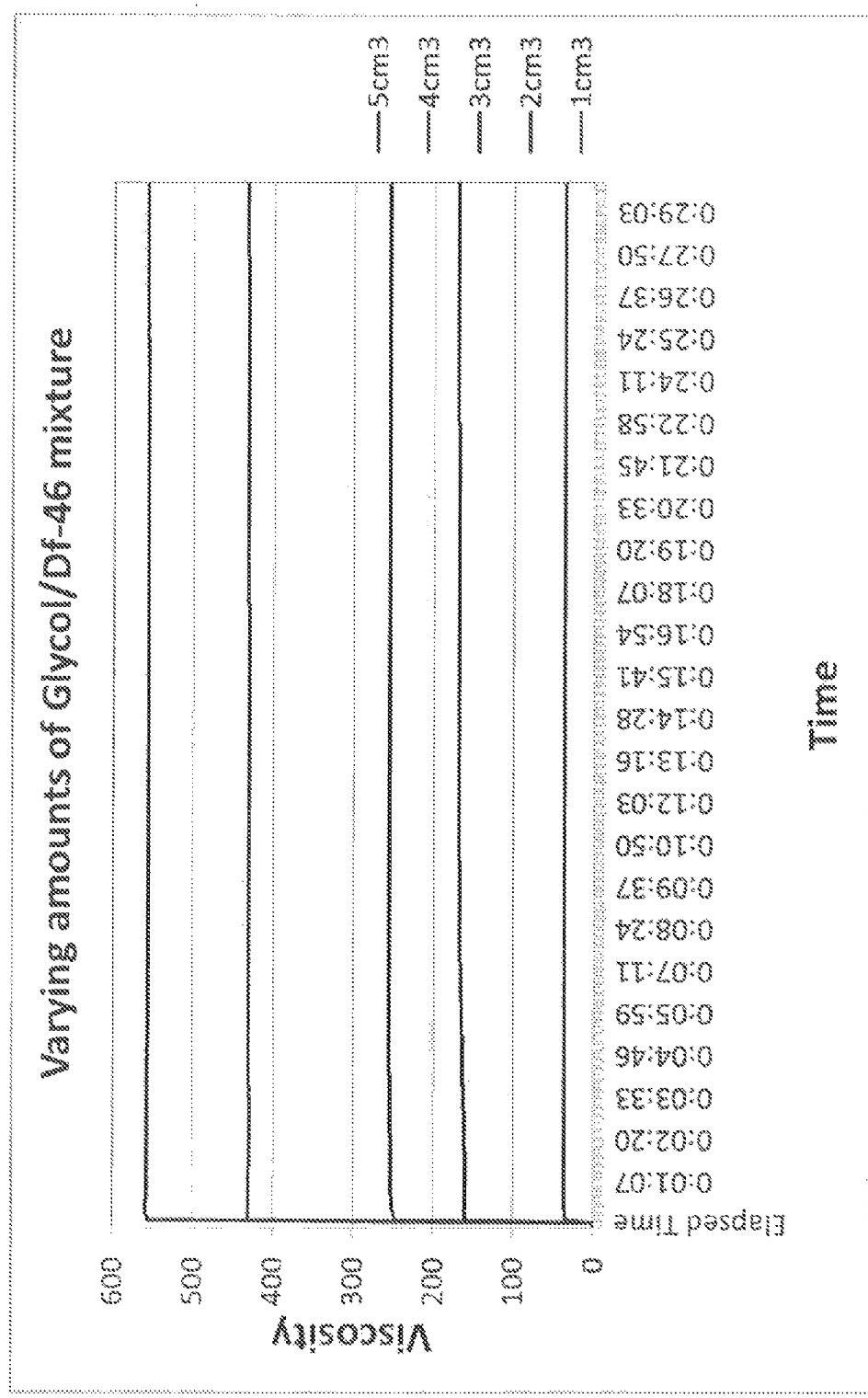

FIG. 54 is a graph of the viscosities achieved with various amounts of glycol added to TG740 frac fluid. The glycol solution was made up of 0.87 g tetra hexyl pyromellitamide (TH) in 100 mL of glycol with Dynol 604 surfactant (15 mM TH concentration).

Figure 55:
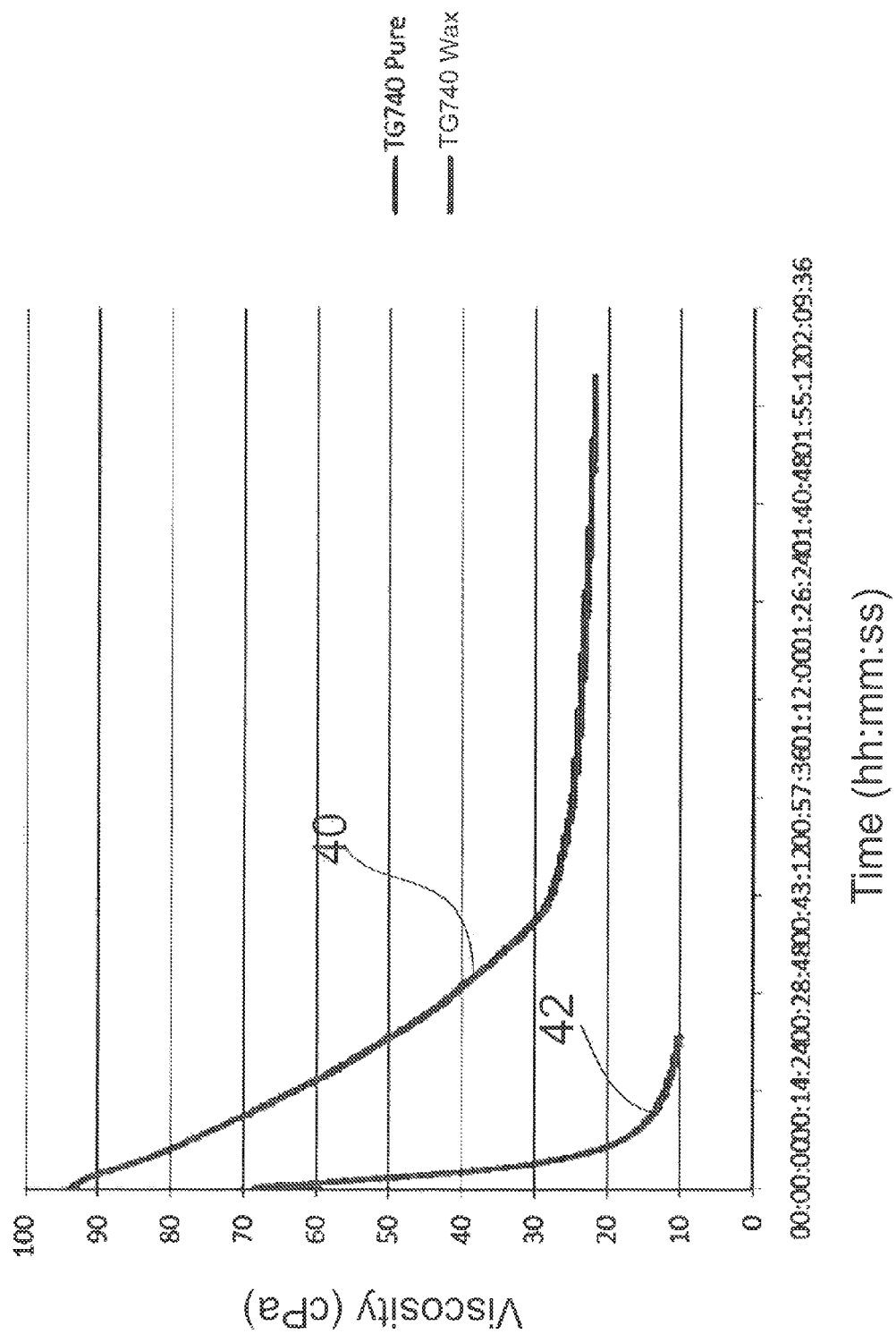

FIG. 55 is a graph of viscosity v. time of a gelled mixture of 5 mM TH in TG740 after addition of tetrabutyl ammonium bromide in pure form and in wax form.

Figure 56:
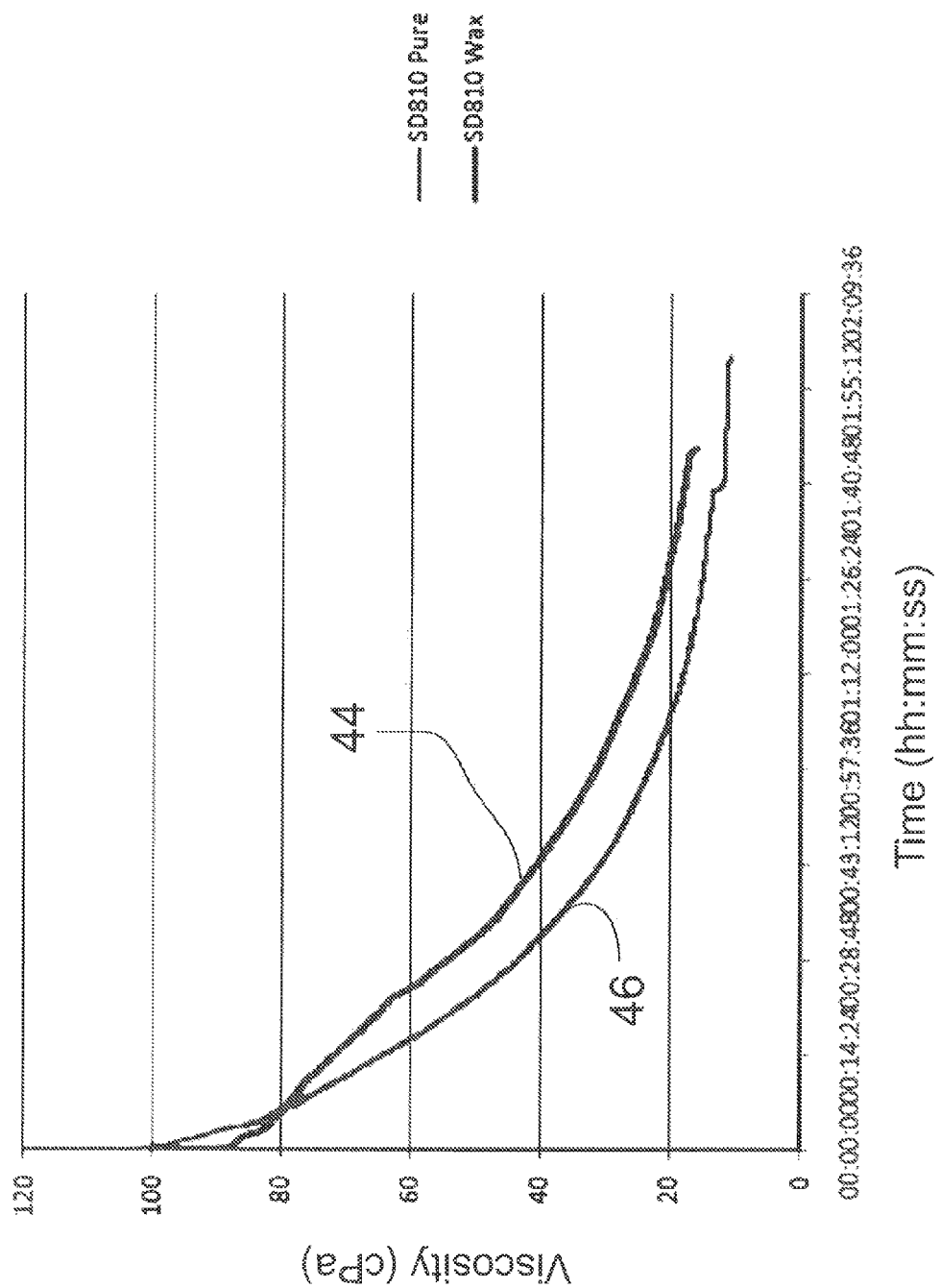

FIG. 56 is a graph of viscosity v. time of a gelled mixture of 5 mM TH in SD810 after addition of tetrabutyl ammonium bromide in pure form and in wax form.

Figure 57:
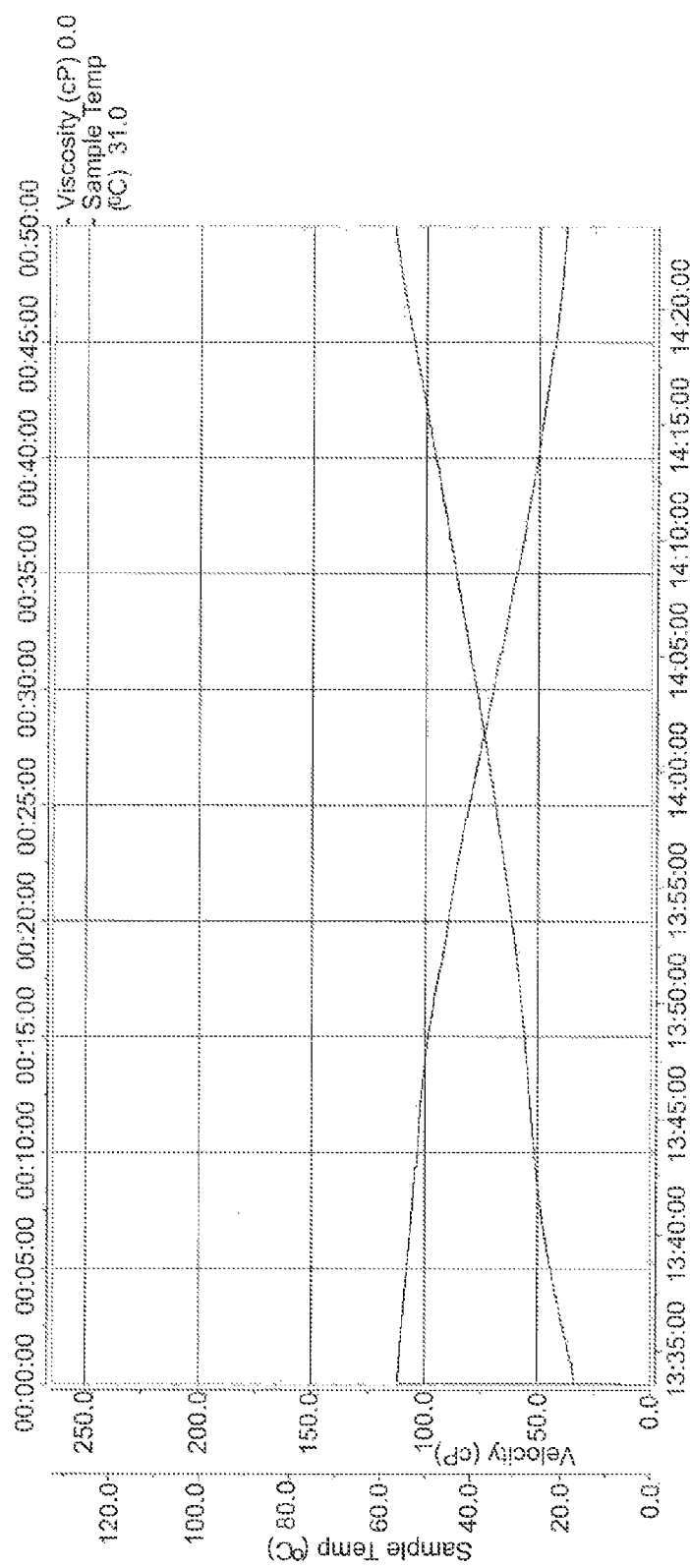

FIG. 57 is a graph of viscosity and temperature v. time for 10 mM N,N',N''-trihexyl, N'''-benzyl benzene-1,2,4,5-tetracarboxamide in SF840.

Figure 58:
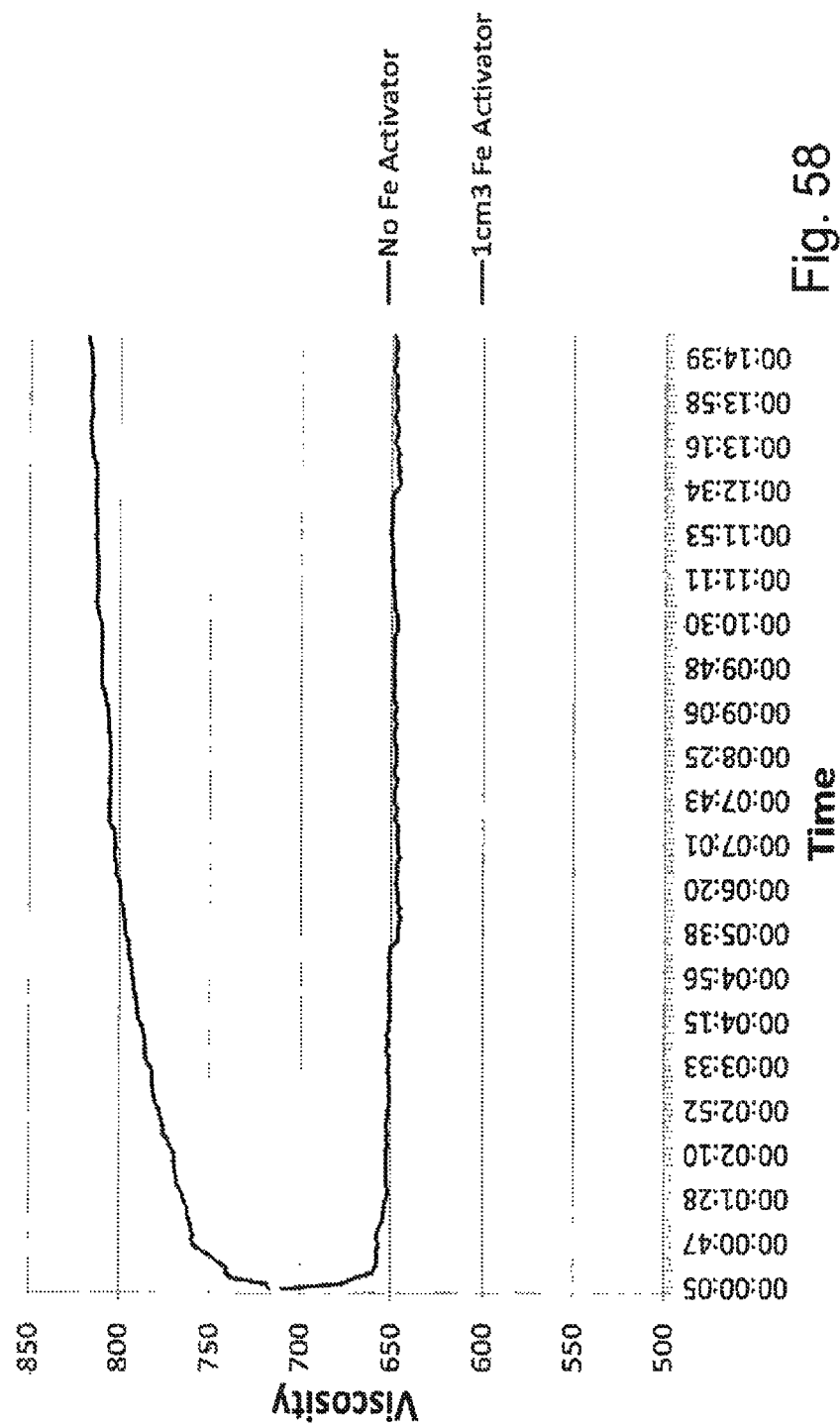

FIG. 58 is a graph of viscosity v. time for a 15 mM gel of TH in SF840 with Dynol 604, after being left overnight and then having various amounts of iron gel enhancer added.

Figure 59:
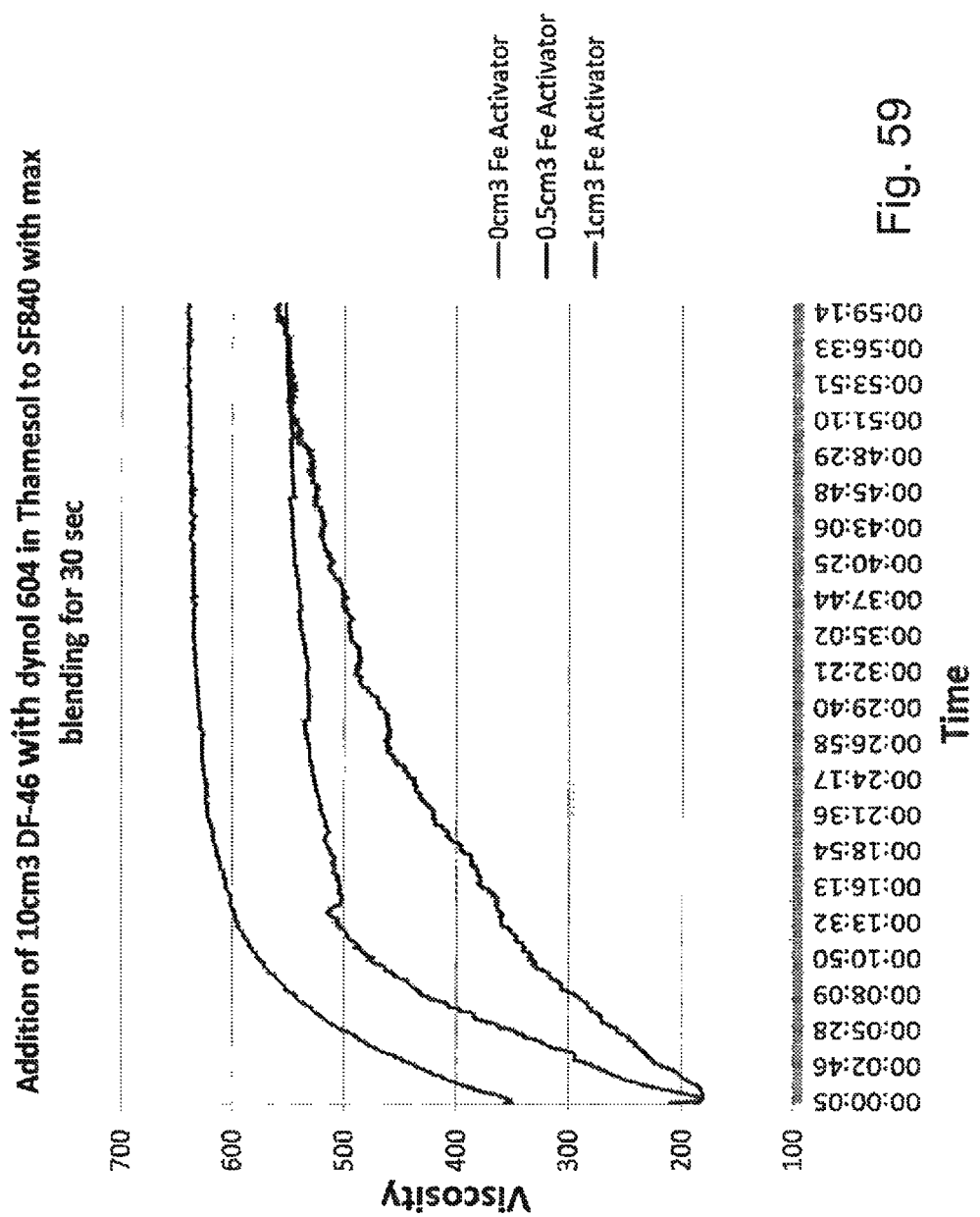

FIG. 59 is a graph of viscosity v. time for a mixture of SF840 and a 10 mL composition of TH (10 mM concentration), Dynol 604, glycol, and thamesol on max blending with various amounts of iron gel enhancer added to the base fluid.

Figure 60:
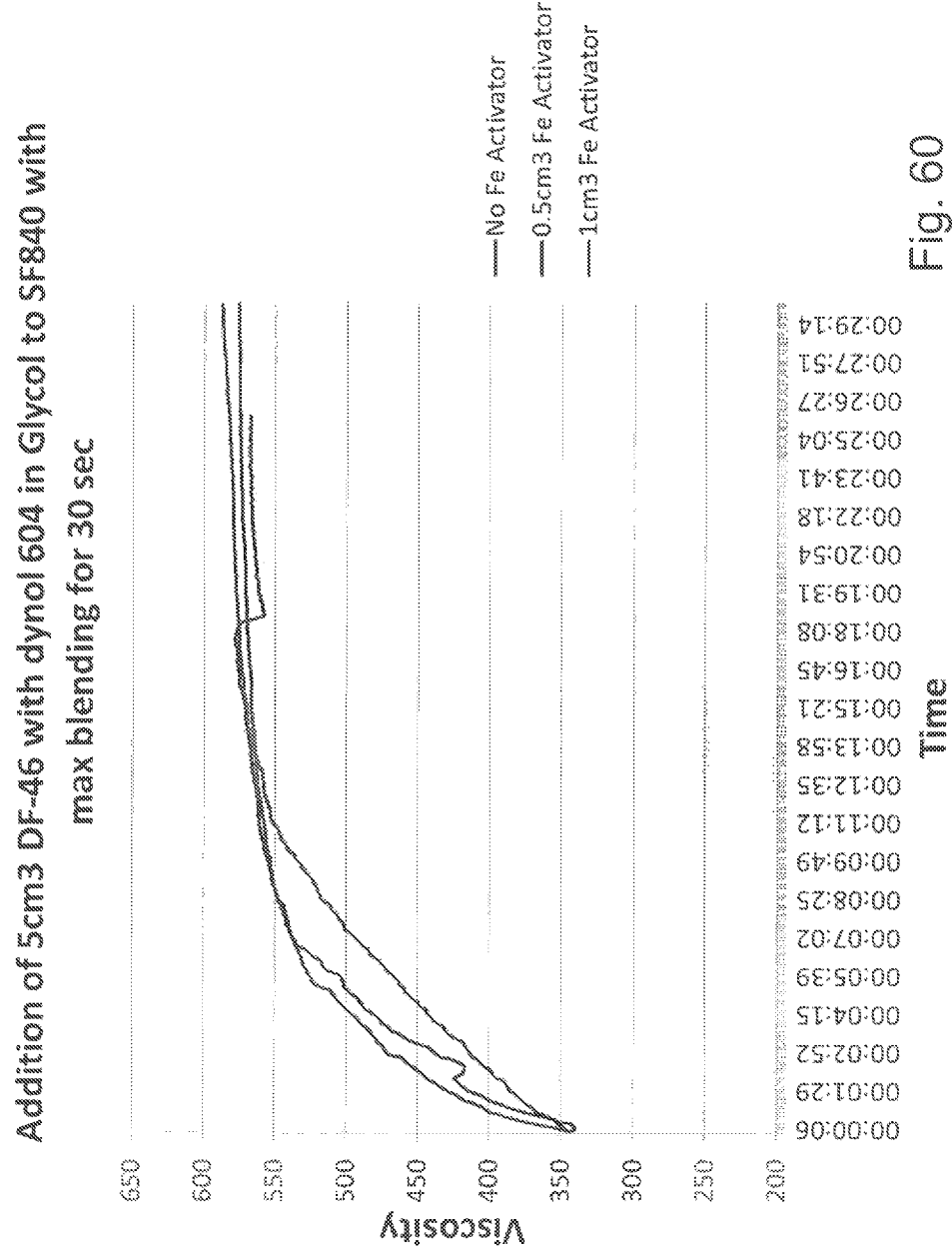

FIG. 60 is a graph of viscosity v. time for a mixture of SF840 and a 5 mL composition of TH (10 mM), Dynol 604, glycol, and thamesol on max blending with various amounts of iron gel enhancer added.

Figure 61:
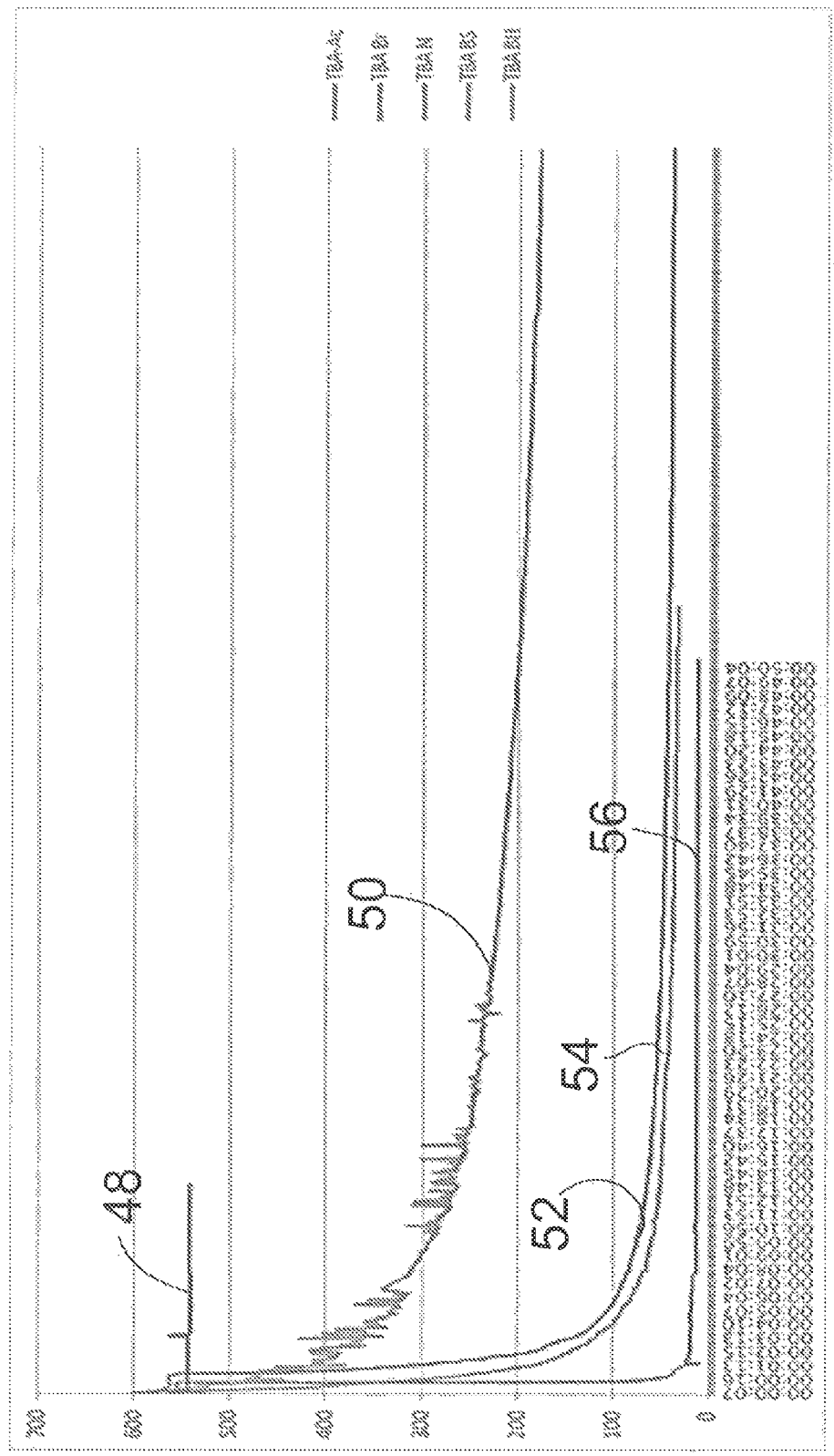

FIG. 61 is a graph of viscosity v. time for various tetrabutyl ammonium derivative breakers.

Figure 62:
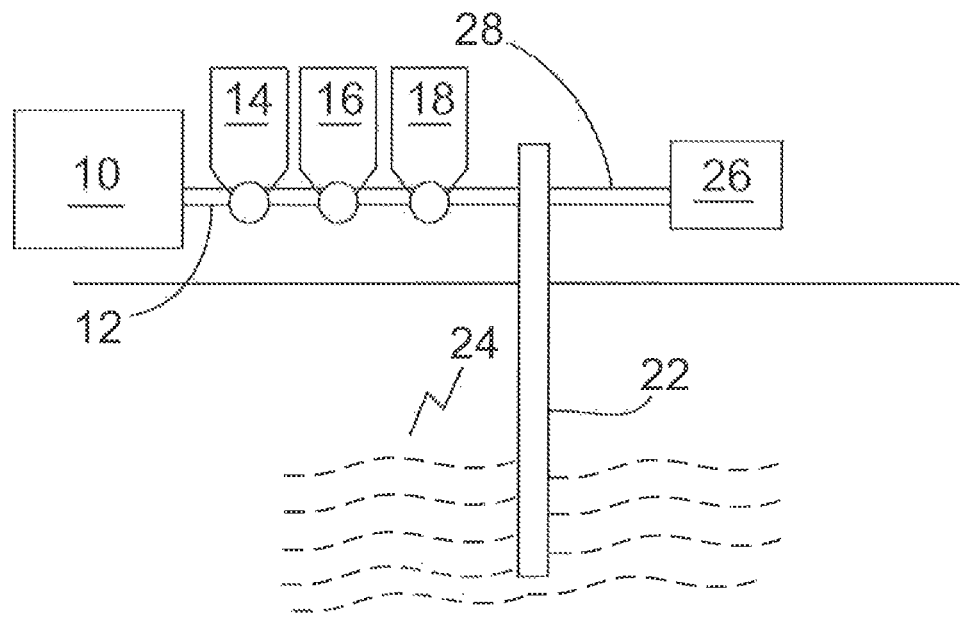

FIG. 62 is side elevation view illustrating a system and method of making a downhole fluid and a method of using a downhole fluid.

Figure 63:
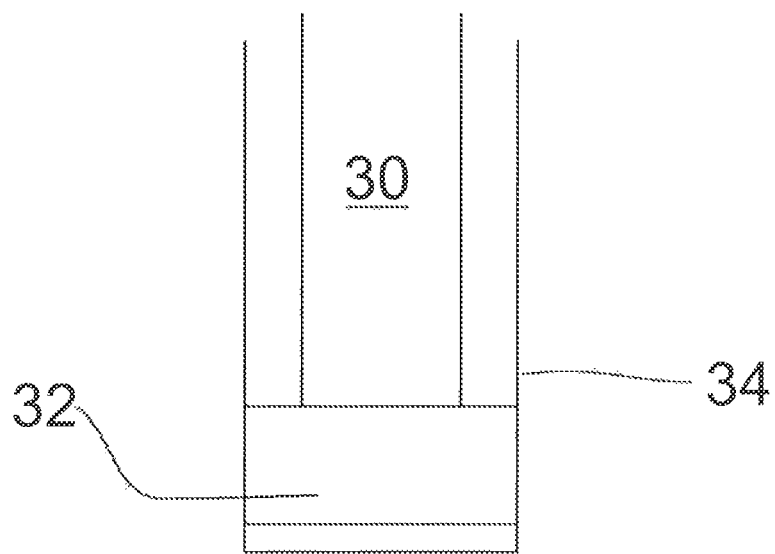

FIG. 63 is a side elevation view of a drill bit drilling a well.

Figure 64:
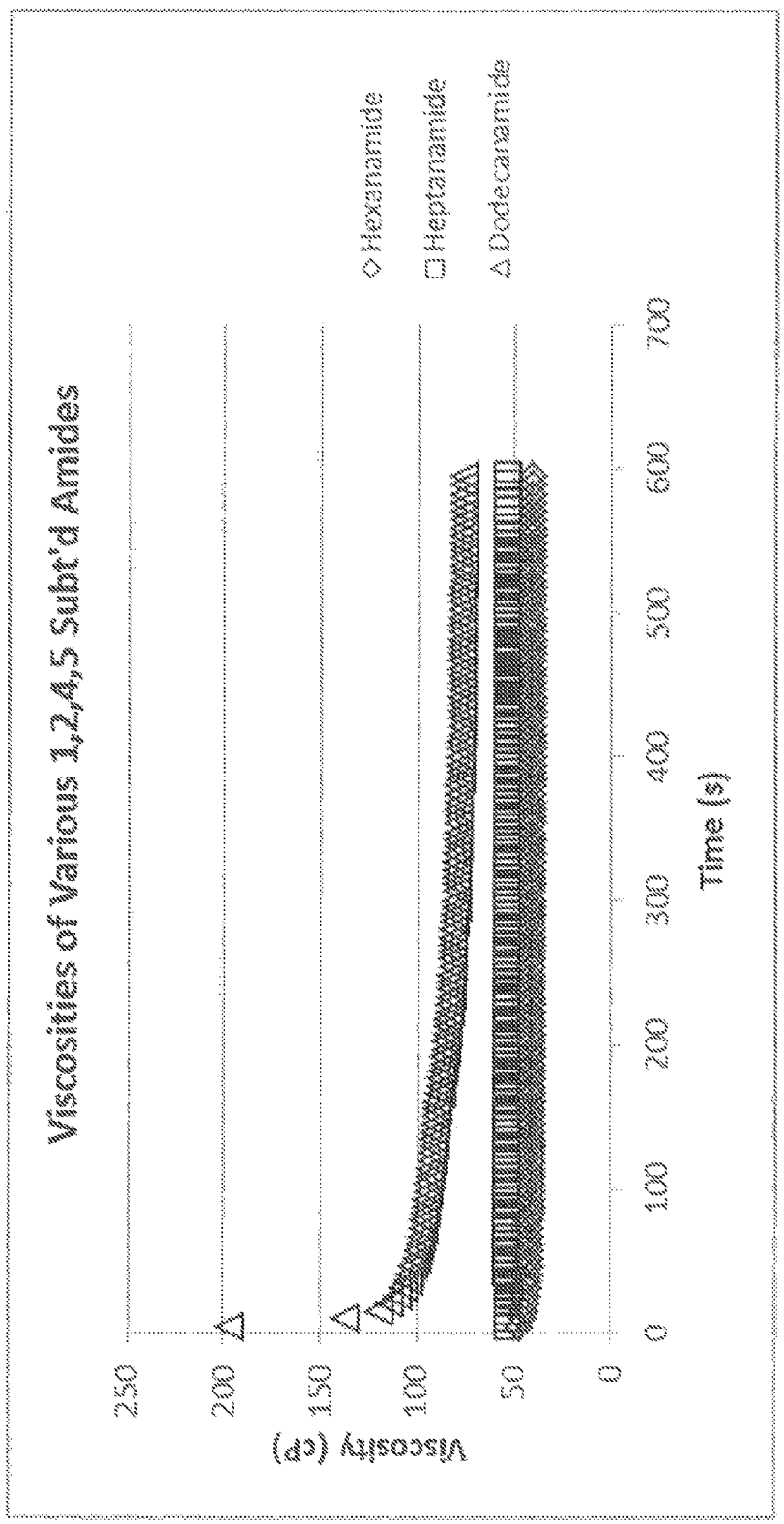

FIG. 64 is a graph of the viscosities of various 1,2,4,5 substituted tetra-amides.

DETAILED DESCRIPTION

Immaterial modifications may be made to the embodiments described here without departing from what is covered by the claims.

Figure 1A:
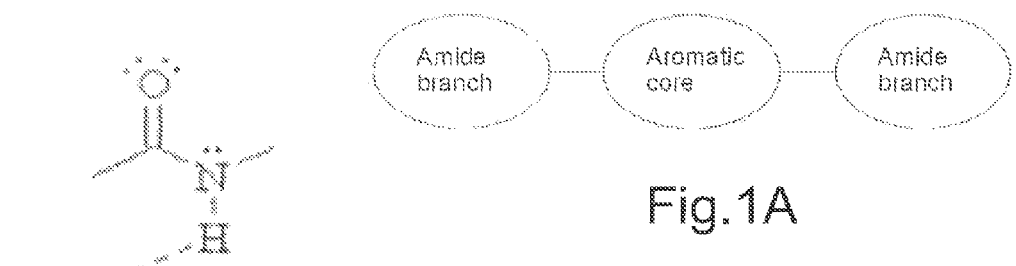
FIG. 1A shows the basic structure of an amide branched aromatic gelling agent.
Figure 1:
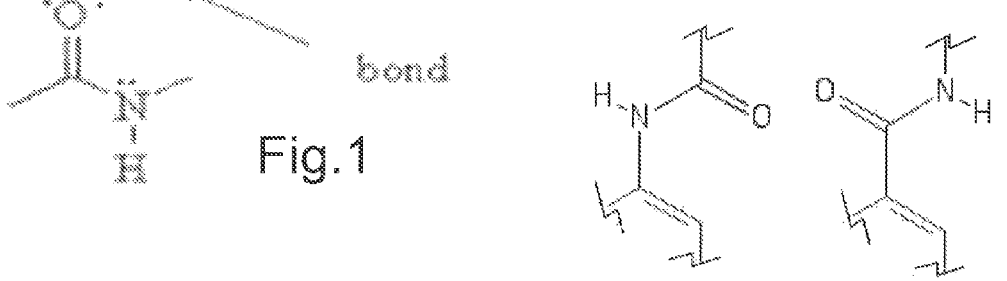
FIG. 1 illustrates hydrogen bond formation.
Figure 1B:
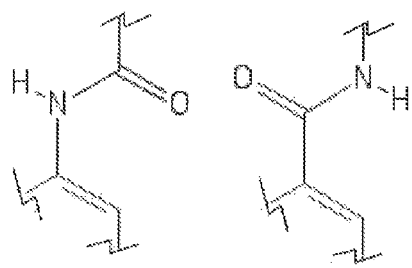
FIG. 1B shows on the left and right an amide branch connected to the aromatic core via a carbon-nitrogen bond and a carbon-carbon bond, respectively.

Referring to FIGS. 1A-B, amide branched aromatic compounds are disclosed in this document as being useful gelling agents for downhole fluids. A gelling agent is an agent that thickens a fluid. Such gelling agents have an aromatic core of one or more aromatic rings as shown in FIG. 1A. Two or more, for example, three to six or more, amide branches are distributed about the aromatic core, each of the two or more amide branches having one or more organic groups. Each of the amide branches may be connected to the aromatic core via a carbon-carbon or carbon-nitrogen bond as shown in FIG. 1B.

One example of an amide branched aromatic gelling agent is a pyromellitamide. Pyromellitamides have the general base structure (1) shown below:

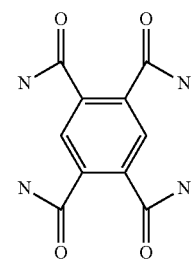

(1)

Pyromellitamides are disclosed in this document as being useful gelling agents for downhole fluids.

For example, a suitable gelling agent may have the general formula of:

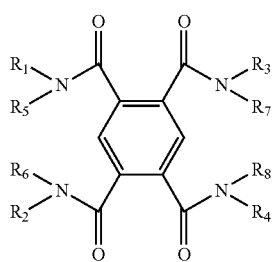

(2)

with $R_1$, $R_2$, $R_3$, $R_4$, $R_5$, $R_6$, $R_7$, and $R_8$ each being a hydrogen or an organic group. The description below of variations of the organic groups applies to the organic groups discussed for all embodiments disclosed in this document. $R_5$, $R_6$, $R_7$, and $R_8$ may each be hydrogens (example non organic group) and one or more or all of $R_1$, $R_2$, $R_3$, and $R_4$ may each be an alkyl group (an example of an organic group). In some cases, $R_1=R_2=R_3=R_4$. $R_1$, $R_2$, $R_3$, and $R_4$ may each have 6 carbon atoms, for example, 6-10 or 6-24 carbon atoms. Each alkyl group may be one or more of straight chain, branched, aromatic, or cyclic. However, preferably each alkyl group is straight chain, for example if $R_5$, $R_6$, $R_7$, and $R_8$ are each hydrogens, and $R_1$, $R_2$, $R_3$, and $R_4$ are each straight chain alkyl groups with 6-10 carbon atoms. In one example, $R_1$, $R_2$, $R_3$, $R_4$, $R_5$, $R_6$, $R_7$, and $R_8$ are each hydrogen or a C7-24 alkyl group. The organic groups may include functional groups such as esters. In addition to the pyromellitamides synthesized and tested below, example pyromellitamides synthesized and successfully used to gel TG740 include compounds where $R_5$, $R_6$, $R_7$, and $R_8$ are each hydrogens, and $R_1=R_2=R_3=R_4$, and $R_1$ equals n-pentyl (from 1-pentylamine used in amide synthesis), $R_1$=CH(Me)CH2CH3 (from 2-aminobutane used in amide synthesis), $R_1$=CH(Me)CH2CH2CH2CH2CH3 (from 2-aminoheptane used in amide synthesis), $R_1$=CH(Me)CH2CH2CHMe2 (from 2-amino-5-methylhexane used in amide synthesis), and $R_1$=CH2CH(Et)CH2CH2CH2CH3 (from 2-ethylaminohexane used in amide synthesis). Also tested were tetracyclohexyl, tetrabenzyl, tetraallyl, tetra n-butyl and tetra t-butyl pyromellitamides.

Downhole fluids, such as downhole treatment fluids, containing such gelling agents may comprise a base fluid, such as a hydrocarbon base fluid for example with 3-8 carbon atoms, for further example liquefied petroleum gas. In other embodiments C3-24 hydrocarbon fluids may be used. In some embodiments, the gelling agent and the downhole fluid contain no phosphorus. The basic structure of the amide branched aromatic gelling agents disclosed here is believed to be primarily responsible for the gellation mechanism, with variation in the side chains being useful to tailor the resultant gel. The successful tests and disclosure reported here, as well as the properties and mechanisms reported here, support use of amide branched aromatic and pyromellitamide gels with other non-tested base fluids, for example, non-polar and hydrocarbon based fluids. Utility is soundly predicted for the disclosed but untested entities, including gels, gel enhancers, breakers, fluids, and other compounds reported here, based on a sound prediction that such entities have the same relevant properties as the respective tested entities.

Downhole fluids may also comprise a suitable breaker, such as an ionic salt, for example comprising one or more of a bromide a chloride, an organic salt, and an amine salt, such as a quaternary amine salt. Small anion cooperativity (1 equivalent) (e.g. chloride>acetate>bromide>nitrate) may induce the gel to solution transition by decreasing viscosity by a factor of 2-3 orders of magnitude. The time for the gel to collapse may be proportional to the binding strength of the anion.

The breaker may comprise one or more of an alcohol or alkoxide salt, for example, with 2 or more carbon atoms, such as propanol. The alkoxide salt may comprise aluminium isopropoxide. In some cases the breaker may need a source of water to activate the breaker to break the gel, for example if a solid alkoxide like aluminium isopropoxide is used. The water source used may be connate water from the formation. In some cases a hydrate or other compound capable of releasing water at a delayed rate may be used for example by inclusion in the injected downhole fluid. For example, the hydrates disclosed in Canadian patent document no. 2685298 may be used, and include hydrated breakers having a crystalline framework containing water that is bound within the crystalline framework and releasable into the fracturing fluid. For example, hydrates of any one of magnesium chloride, sodium sulfate, barium chloride, calcium chloride, magnesium sulphate, zinc sulfate, calcium sulphate, and aluminum sulphate may be used. NaSO4-10H2O may be used as an example of a sodium sulfate hydrate. An ionic salt hydrate or covalent hydrate could be used. A combination of breaker coating or encapsulation with crystallized water addition may be used.

Another example of a water activatable breaker is a piperidine salt. Unlike piperazine, a breaker with one amine disrupts the hydrogen bond network believed to be responsible for gelling the gels. Piperidine is an effective breaking agent but is a liquid and thus not always practical to use as a breaker on a large scale. Therefore the hydrogen chloride salt of piperidine, piperidine hydrochloride was synthesized and tested as a solid breaker. There was no major change in viscosity once the piperidine hydrochloride was added to a 100 mL TH in TG740 gel solution. Once a small amount of water (20 drops) was added the solution's viscosity decreased noticeable although the two layers seemed slightly immiscible as there were several bubbles in the solution.

An exemplary procedure for synthesizing a piperidine salt, in this case piperidine hydrogen chloride is as follows. A round bottom flask was charged with aqueous hydrochloric acid (2 M, 58.5 mL) before being cooled to 0° C. using an ice bath. Piperidine (10.0 g, 117 mmol, 11.6 mL) was added dropwise over 30 minutes whilst the solution was stirred vigorously. Once all the piperidine had been added the solvent was removed and the yellow solid recrystallised from ethanol, filtered and washed with cold ethanol to give the desired piperidine hydrochloride as a white solid. Yield was 0.95 g, 7.82 mmol, 6.7%, mp: 245 oC, (lit. 246-247 oC).

Breakers that were tested and showed a noticeable decrease in viscosity once added to the gel include: 1-dodecanol>98%, Benzyltriethylammonium chloride 99%, Tetrabutylammonium hydrogen sulfate 99%, Sodium tosylate 95%, Iron (III) sulfate 97%, 2-Chloride-N—N-diethylethylamine hydrogen chloride 99%, Thiodiglycolic acid 98%, Pyruvic acid 98%, 2-hydroxybenzyl alcohol 99%, Azelaic acid 98%, Glutaric acid 99%, Malonic acid 99%, 1-octylamine 99%, Cyclohexylamine 99%, L-ascorbic acid 99% Acetamide 99% Poly(vinyl) alcohol 89,000-98,000 99%, Ethylenediamine 99.5%, Beta-alanine 99%, L-proline 99%, Breakers that were tested and showed a slight decrease in viscosity once added to the gel include: Benzyltributylamonium chloride>98%, T-butanol anhydrous 99.5%, 2-ethyl- 1-butanol 98%, 2-ethyl-1-hexanol 99.6%, 1-hexanol 99%, 1-butanol 99.8%, 2-aminobutane 99%, 2-ethyl-1-hexylamine 98%, Benzylamine 99%, Piperidine 99%, Propan-2-ol 99.7%, Benzyltrimethylammonium hydroxide 40 wt % in methanol, Tetra-n-butylammonium hydroxide 40 vol % in water.

The breaker may be configured to delay breaking action. For example, a time delay breaker may be achieved by coating the breaker, for example with a material selected to release the breaker at a predetermined rate over time downhole, for example wax. Referring to FIGS. 55-56, graphs are provided that illustrate the delay in breaking action when a wax coating is used on a breaker, in this case tetrabutyl ammonium bromide (pure form, lines 42 and 46, wax, lines 40 and 44). 5 mM solutions of TH were prepared in both TG740 and SD810 and the molar equivalent of tetrabutyl ammonium bromide (0.8 g) or wax-coated tetrabutyl ammonium bromide (1.0 g) was added to the solutions. The change in viscosity was measured using a chandler viscometer. The results the TH mixture with TG740 showed initial viscosities of 93.6 and 68.3 cPa for waxed and unwaxed breaker, respectively while the SD810 showed initial viscosities of 97.7 cPa and 100.3 for waxed and unwaxed breaker, respectively. With TG740 there was a marked difference between the wax coated and pure breaker while with SD810 the difference was muted although delayed action was observed. The wax breaker action in SD810 had a slower rate in the drop in viscosity compared with the pure breaker. However both waxed and unwaxed breaker in SD810 showed a slower rate of degradation compared to that done with TG740.

Compounds that were visually tested as breakers and showed no decrease in viscosity or in some cases an increase in viscosity once added to the gel include: 1,3-dihydroxyl benzene (resorcinol) 99%, Diphenylacetic acid 99%, Imidazole 99%, Propionamide 97%, Magnesium carbonate, Citric acid 99.5%, Benzoic acid 99.5%, Phenylacetic acid 99%, Potassium phthalimide 98%, Pentaerythrite 99%, 1-butylamine 99.5%, 1-hexylamine 99%, Hydroxylamine hydrogen chloride 98%, Ethanolamine 98%, L-histidine 99%, Aspartic acid 98%, Glycine 99%, D-Sorbitol 98%. These and other compounds may be used as gel enhancers or thickeners in addition to the gelling agent.

Compounds that were visually tested as breakers and showed an increase in viscosity once added to the gel include: Potassium tertbutoxide 95%, Piperazine 99%, Diethanolamine 98%, L-menthol 99%, Lactic acid 85%, Mandelic acid 99%, Ammonium acetate 98%, Paraformaldehyde 95%, Hydroquinone 99%, Tetramethylammonium hydroxide 25 vol % in water. These and other compounds may be used as gel enhancers in addition to the gelling agent.

Table 0 below illustrates further testing done on potential breakers. Tests were carried out using 10 mM TH in TG740 (42 cm$^3$) for 30 minutes with a shear rate of 100 s$^{-1}$ and standard pressure. The baseline viscosity was calculated as: Maximum viscosity (21° C.)=327.41 cP, minimum viscosity (50° C.)=154.69 cP.

TABLE 0

Viscosity Test Results on potential breakers.

| Breaker name | Conc: mmols | Min viscosity: cP | Category |
|---|---|---|---|
| No breaker (baseline) | N/a | 154.69 | N/a |
| Piperidine | 80.0 | 203.92 | Enhancer |
| Piperidine | 160.0 | 87.69 | Breaker |
| Piperidine | 240.0 | 63.08 | Breaker |
| Piperidine | 320.0 | 42.40 | Breaker |
| 1-Butanol | 80.0 | 46.99 | Breaker |
| 1-Hexanol | 80.0 | 12.83 | Breaker |
| Isopropanol | 80.0 | 78.23 | Breaker |
| 2-ethyl-1-hexylamine | 80.0 | 16.67 | Breaker |
| Ammonium chloride | 80.0 | 169.31 | Enhancer |
| Benzylamine | 80.0 | 103.13 | Breaker |
| 2-ethyl-1-hexanol | 80.0 | 21.62 | Breaker |
| Piperidine plus benzylamine | 80.0 80.0 | 56.18 | Breaker |
| Choline chloride | 80.0 | 238.63 | Enhancer |
| Melamine | 80.0 | 226.49 | Enhancer |
| Benzyltri-n-butylammonium chloride | 80.0 | 0.51 | Breaker |
| Sodium hydroxide | 80.0 | 72.55 | Breaker |
| Benzyltrimethylammonium hydroxide 40% w/w in MeOH | 80.0 | 3.07 | Breaker |
| Methanol | 80.0 | 6.14 | Breaker |
| Methanol | 48.0 | 36.91 | Breaker |
| Hexamethylene diaminochloride | 80.0 | 256.90 | Enhancer |
| Ibuprofen tablets (200 mg) | 80.0 | 19.83 | Breaker |
| Tetrabutylammonium bromide | 80.0 | 86.36 | Breaker |
| Triphenylphosphine | 80.0 | 100.58 | Breaker |
| Ammonium chloride (finely ground) | 80.0 | 158.61 | Enhancer |
| Hydrochloric acid | 80.0 | 90.41 | Breaker |
| Sodium hydroxide (finely ground) | 80.0 | 51.13 | Breaker |
| Toluene | 80.0 | 80.01 | Breaker |
| Tetrahydrofuran | 80.0 | 68.82 | Breaker |
| 1,3,5-trimethylhexahydro-1,3,5-triazine | 80.0 | 91.42 | Breaker |
| 2-aminoheptane | 80.0 | 7.84 | Breaker |
| Water | 80.0 | 147.53 | Breaker |
| Ibuprofen sodium salt | 80.0 | 166.67 | Enhancer |
| Ibuprofen sodium salt plus citric acid | 80.0 80.0 | 0.54 | Breaker |
| Citric acid | 80.0 | 109.25 | Breaker |
| Pure Ibuprofen | 80.0 | 13.48 | Breaker |
| Hydrocinnamic acid | 80.0 | 29.31 | Breaker |
| Phenylacetic acid | 80.0 | 13.78 | Breaker |

Referring to FIG. 61, a comparison of various tetrabutyl ammonium derivative breakers is illustrated. Reference numerals 48, 50, 52, 54, and 56, identify the viscosity v. time curves of TG740 gelled with TH and broken with tetrabutyl bisulfide, tetrabutyl nitrate, tetrabutyl bromide, tetrabutyl borohydride, and tetrabutyl acetate, respectively. Tetrabutyl bisulfide showed no breaker activity, while at least tetra butyl nitrate showed delayed breaker characteristics. The latter three tetrabutyl derivatives showed fast breaker action. In some embodiments non halogenated breakers may be used as a less toxic alternative to halogenated breakers.

As discussed elsewhere in this document the gelling agent may form a hydrogen-bond network through intermolecular hydrogen bonds between the amide branches of adjacent gelling agent molecules, and the breaker may disrupt the intermolecular hydrogen bonds. Suitable breakers may include hydrogen bonding agents that form a hydrogen bond, with the amide branches of the gelling agent, that is stronger than the intermolecular hydrogen bonds between the amide branches of adjacent gelling agent molecules. Aromatic carboxylic acid breakers are believed to operate in such a fashion. The protonated COOH moiety is expected to have improved solubility in the hydrocarbon phase relative to the deprotonated COO— version discussed below as a gel enhancer. The strength of the hydrogen bond formed by the COOH moiety results in the COOH moiety preferentially hydrogen bonding to the gels and to other COOH molecules, thus disrupting the gel network at concentrations past a threshold concentration. If a cation complexing agent such as citric acid is used in conjunction with an aromatic carboxylic acid salt, the COO— moiety has improved solubility in the hydrocarbon phase and may lead to a breaking effect as well, for example, see Table 0 regarding the example of ibuprofen salt with citric acid.

Some breakers may also function as gel enhancers, as further discussed below.

The downhole fluids disclosed herein may incorporate other suitable chemicals or agents such as proppant. The downhole treatment fluids disclosed herein may be used in a method, for example a fracturing treatment as shown in FIG. 62, of treating a downhole formation. The gelling agents may be used in oil recovery enhancement techniques.

Referring to FIG. 62, a method and system is illustrated, although connections and other related equipment may be omitted for simplicity of illustration. A base fluid, such as a hydrocarbon frac fluid, is located in storage tank 10 and may be passed through piping 12 into a well 22 and introduced into a downhole formation 24, such as an oil or gas formation. Gel may be combined with the base fluid to make a downhole fluid. For example, gel may be added on the fly from a gel tank 14, or may be pre-mixed, for further example in tank 10. Other methods of gelling the base fluid may be used. For example, batch mixing may be used to make the gel. Other storage tanks 16 and 18 may be used as desired to add other components, such as proppant or breaker, respectively to the downhole fluid.

The gelling agent may be provided with a carrier, for example an inert carrier like glycol (ethylene glycol). Referring to FIG. 54, a graph of the viscosities achieved by mixing into TG 740 varying amounts of a solution of glycol with 15 mM TH is shown. The gel was initially formed after 30 seconds of blending in TG-740 frac fluid. As the concentration of glycol increased, the viscosity of the final mixture increased. Gel formation was almost immediate. Glycol is considered suitable because the gelling agent won't gel the glycol. Instead, the carrier provides a medium for dispersing the gelling agent as a dissolved liquid or suspended solid prior to being combined with base fluid. The gelling agent may be ground prior to mixing with carrier if the gelling agent is solid, in order to facilitate dispersion or dissolution. Once mixed with base fluid, the carrier dissolves in the base fluid, for example hydrocarbon base fluid, facilitating dissolution of the gelling agent in the base fluid without interfering with gelling. Using a carrier allows the gelling agent to be stored or transported in a low viscosity state within the carrier whilst facilitating quicker dissolution into and hence quicker gelling within the base fluid than could be accomplished with solid or neat gelling agent. Other carriers may be used including acetonitrile or glycerine, for example thamesol.

To facilitate dispersion in the carrier the gelling agent may be provided with a suspending agent such as clay. The suspending agent may act as a thickener to suspend the gel in the carrier. The suspending agent helps to maintain the gelling agent in homogeneous dispersion within the carrier, and slows or stops the gelling agent from settling within the carrier. Other suspending agents may be used, such as various polymers.

The gelling agent may be provided with a wetting agent, such as a surfactant. For example, in the mixture tested in FIG. 54, DYNOL™ 604 surfactant by Air Products™ is used as the surfactant. DF-46 is the glycol/DYNOL™ 604/pyromelitamide mixture. The wetting agent may be used to help wet the surface of the solid amide branched aromatic and pyromellitamide gels, thus speeding up the dissolution of the solid and improving time to gel. For example, time to achieve viscosity may be under four minutes and further under a minute or 30 seconds for a mixture of hydrocarbon base fluid and a solution of pyromellitamide gelling agent, glycol, suspending agent, and DYNOL™ 604 surfactant. Other wetting agents may be used, such as DYNOL™ 607.

Referring to FIG. 62 the downhole fluid may be recovered from the downhole formation 24, for example, through a recovery line 28, and recycled, for example using one or more recycling apparatuses 26. The recycling stage may incorporate removal of one or more compounds within the recovered fluid, for example if breaker is removed. Distillation may be used, for example, to remove alcohol or amine, and aqueous separation may be used, for example, to remove salts.

When the R groups contain non alkyl functionality, for example as shown below in structure (3) with ester functionality, aggregation may be inhibited in hydrocarbon fluid compared to when the R groups are alkyl. This effect may be attributed to the fact that the ester group increases polarity of the compound, thus decreasing solubility in hydrocarbon fluids, and the ester group reduces geometric compatibility with the alkyl containing hydrocarbon fluids used.

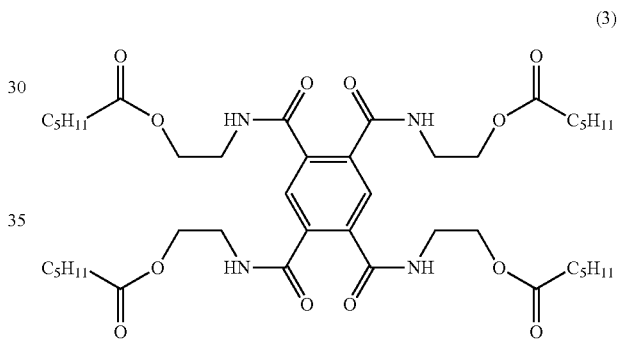

(3)

Exemplary Synthesis and Related Testing

The synthesis of tetra alkyl pyromellitamides may be carried out in two stages, although other routes and stages may be used:

1. benzene-1,2,4,5-tetracarbonyl tetrachloride (4) synthesis:

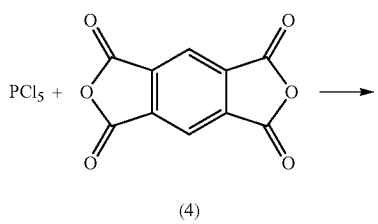

(4)

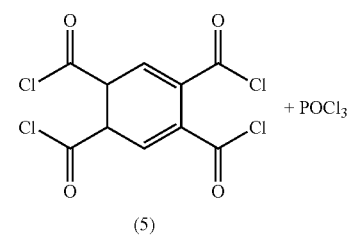

(5)

2. amide synthesis:

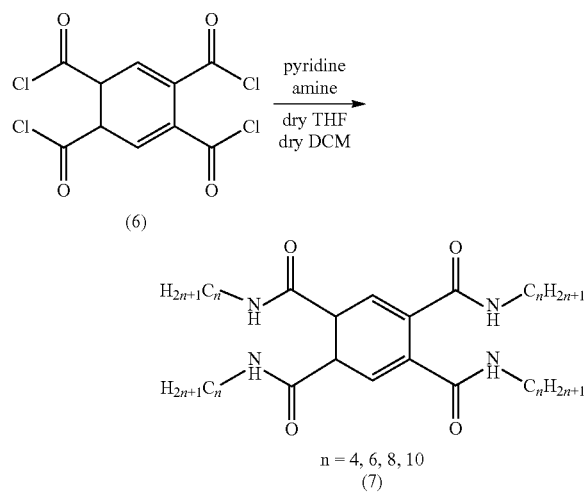

n = 4, 6, 8, 10
(7)

An exemplary procedure for route 1 is as follows. Phosphorus pentachloride (45 g, 0.22 mol) and pyromellitic anhydride (25 g, 0.11 mol) were placed in a round bottom flask and mixed together. A hair dryer was used to heat one spot of the flask to initiate the reaction, causing liquid POCl3 to be produced. Once the reaction had been initiated an oil bath was used to heat the flask to continue the reaction. Once all the solid had melted the POCl3 by-product was distilled off (80-95° C.), and the product was then reduced under vacuum (150-180° C.) using a Kugelrohr machine, yielding the desired product as a white solid (23.7838 g, 73.0 mmol, 66.4%).

An exemplary procedure for route 2 is as follows, albeit without using pyridine. Benzene-1,2,4,5-tetracarbonyl tetrachloride (2.0 g, 6.0 mmol) in dry tetrahydrofuran (15 mL, 185.0 mmol) was added dropwise to a solution of triethylamine (3.5 mL, 25.0 mmol), hexylamine (3.23 g, 31.2 mmol) in dichloromethane (15 mL, 235.0 mmol) and dry tetrahydrofuran (15 mL, 185.0 mmol) whilst the solution was stirred vigorously. After addition was complete the reaction was allowed to stir overnight at room temperature, before the product was filtered off and the solvent removed using a rotary evaporator. The crude product was subsequently washed with methanol and acetone to give the desired pure product as a white solid. Yields achieved ranged from 0.20 g, 0.34 mmol, 5.7%, to 0.49 g, 0.82 mmol, 13.7%, to 1.26 g, 2.11 mmol, 35.2%. In the example procedure that led to the 35.2% yield, the hexylamine and triethylamine solution was cooled to 0° C. before the acid chloride was added. The reaction was also kept at this low temperature throughout the addition of the acid chloride and for an hour after addition had been completed. This alteration in conditions led to less precipitate being formed, which was believed to be the unwanted triethylammonium chloride salt and any imide that had formed, thus showing that low temperatures help form the correct product rather than the unwanted imide, as reflected in the improved yield obtained (35.2%).

Gel Test. To test the samples prepared, a sample of the compound to be tested was placed in a glass vial with a few mL of solvent, and the sample was heated until a clear solution formed or until the boiling point of the solvent was reached. After cooling if viscosity could be detected the compound was said to gel the solvent.

Gelation mechanism. Referring to FIG. 1, it has been proposed that amide branched aromatic and pyromellitamide gelation is achieved through π-π interactions and primarily intermolecular hydrogen bonds between amide groups, according to the structural interaction shown.

Table 2 below indicates the results of gel testing of four compounds, TB, TH, TO, and TD. TB, TH, TO and TD refer to structure (1) above each with four butyl, hexyl, octyl, or decyl, alkyl groups to give N,N',N'',N'''-tetrabutylbenzene-1,2,4,5-tetracarboxamide (TB), N,N',N'',N'''-tetrahexylbenzene-1,2,4,5-tetracarboxamide (TH), N,N',N'',N'''-tetraoctylbenzene-1,2,4,5-tetracarboxamide (TO), and N,N',N'',N'''-tetradecylbenzene-1,2,4,5-tetracarboxamide (TD), respectively. In Tables 2 and 3, TG indicates the formation of a transparent gel, TG* indicates formation of a transparent gel only with heating, I indicates insoluble, S indicates soluble, P indicates that the compound gels but precipitates on subsequent cooling, PG indicates partial gelling with liquid solvent only after shaking, with the solubility of the molecule requiring heating to get it to dissolve in the liquid, and X equals no gel formed as the compound is not soluble in the liquid.

TABLE 2

Gelling properties of various solvents

|  | solvent | | | | | | | | |
|---|---|---|---|---|---|---|---|---|---|
|  | Toluene | Methanol | Acetone | Water | Ethyl ethanoate | Diethyl ether | Pentane | Hexane | cyclohexane |
| TB | TG | P | P | I | I | I | I | I | TG* |
| TH | TG | P | P | I | I | TG | TG | TG | TG |
| TO | TG | I | I | I | I | TG | TG | TG | TG |
| TD | TG | I | I | I | I | TG | TG | TG | TG |

Table 2 indicates that TB, TH, TO, and TD gel non-polar, aprotic solvents. This result is consistent with the fact that intermolecular H-bonding is responsible for the gel structure.

TABLE 3

Gelling properties in SYNOIL ™ products

| Compound | TG740 - BP range: 70-170° C. | SF800 - BP range: 125-270° C. | SF840 - BP range: 150-330° C. |
|---|---|---|---|
| TB | X | X | X |
| TH | TG | PG | PG |
| TO | TG | PG | PG |
| TD | TG | PG | PG |
| Decreasing solubility –> | | | |

Table 3 indicates that without agitation not all solvent may be aggregated into the gel. With shaking TG740 obtains uniform viscosity. SF800 and SF840 were never completely incorporated.

Figure 2:
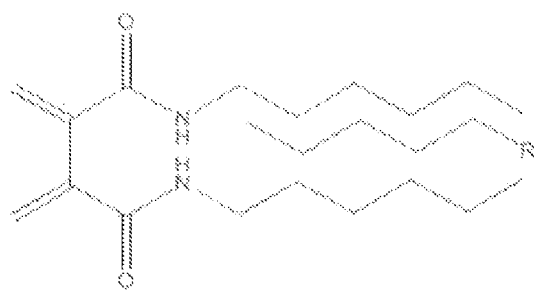
FIG. 2 illustrates a proposed solvation interaction between an alkyl solvent and a pyromellitamide gelling agent with straight chain alkyl groups.

Referring to FIG. 2 and Table 4 below, an explanation of the gel testing results in Tables 2 and 3 may be that alkyl compound chains line up better with alkyl solvent chains than with aromatic solvent chains, which are more polar than straight chain alkyls. In addition, sterics may play a role.

TABLE 4

| SynOil Hydrocarbon Product | Aromatic content | |
|---|---|---|
| TG740 | 10% | Decreasing |
| SF800 | 20% | Gelation |
| SF840 | 35% | ↓ |

The gelling agent may be provided with increased aromatic character in order to improve solvation with aromatic solvents. Referring to FIG. 57 for example, a gelling agent was tested and made with $R_1$, $R_2$, and $R_3$ being hexyl alkyl groups, $R_5$, $R_6$, $R_7$, and $R_8$ being hydrogens, and $R_4$ being a benzyl group to add aromatic character and improve aromatic viscosity. The sample tested in FIG. 57 had a 10 mM concentration in SF840, and illustrated gelling action.

Solvation temperature testing.

Figure 3:
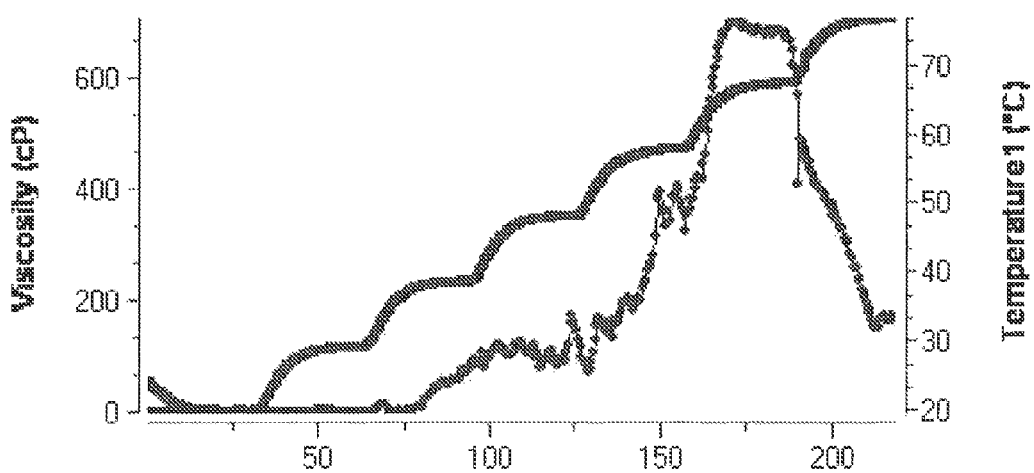
Figure 4:
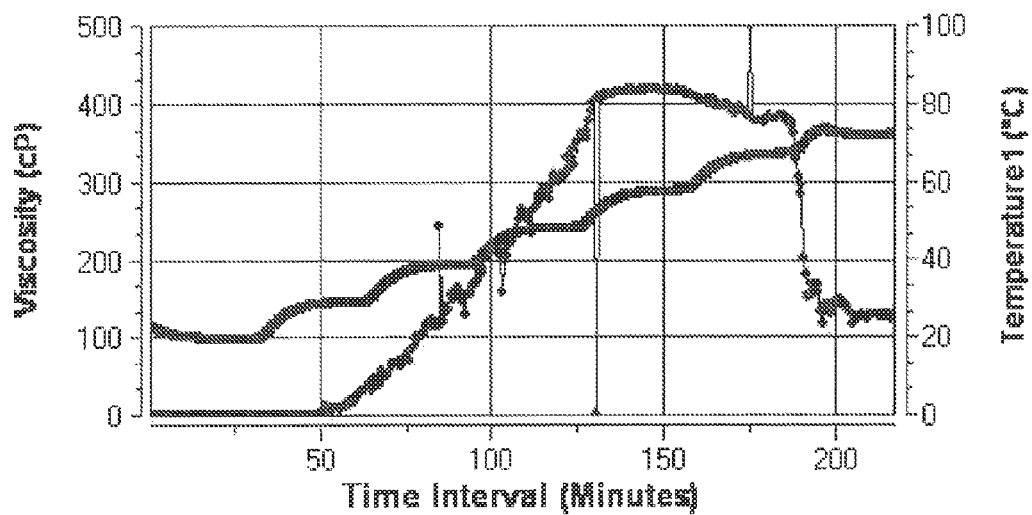
Figure 5:
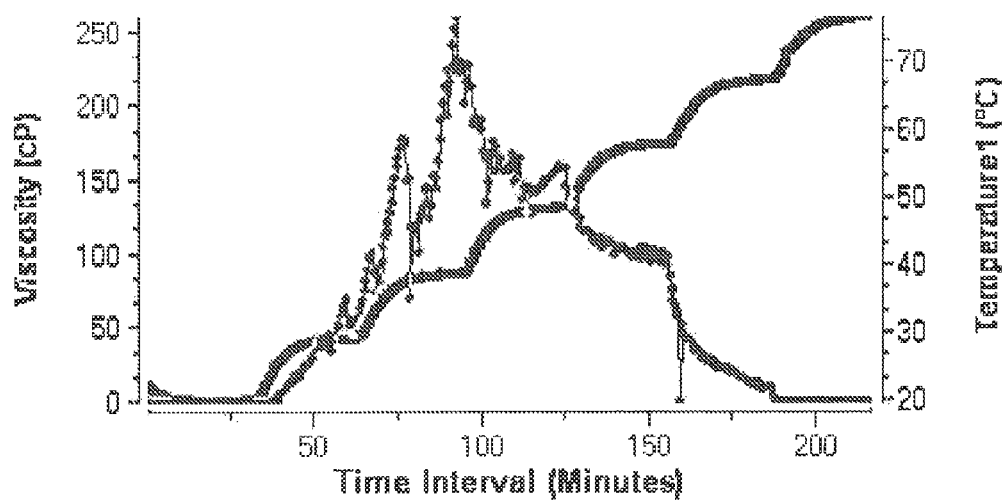
Figure 6:
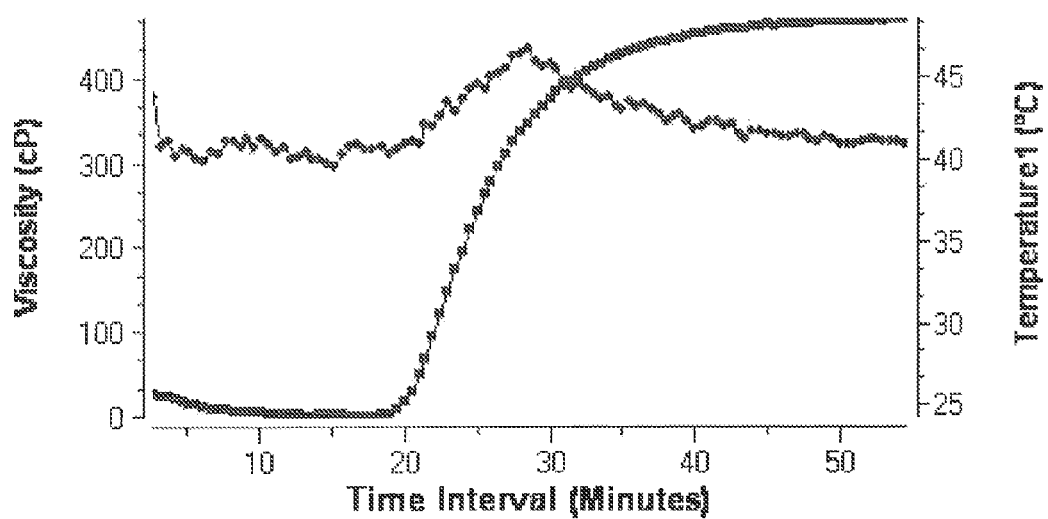
Figure 7:
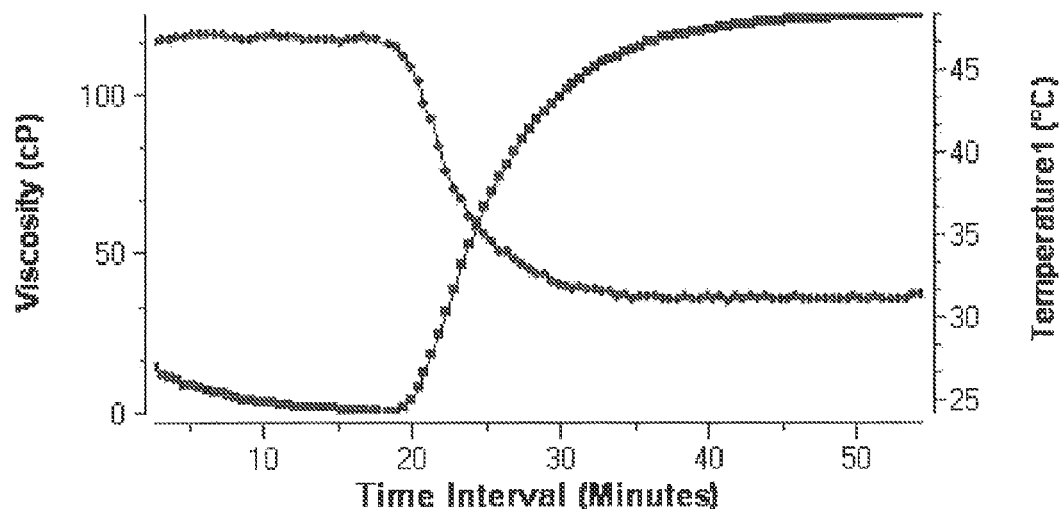
Figure 8:
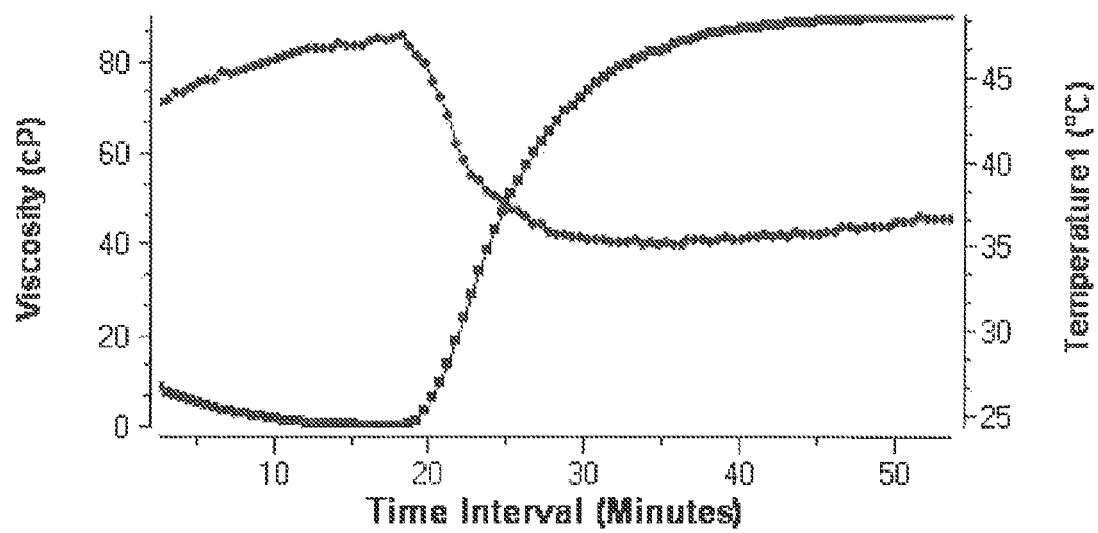
Figure 9:
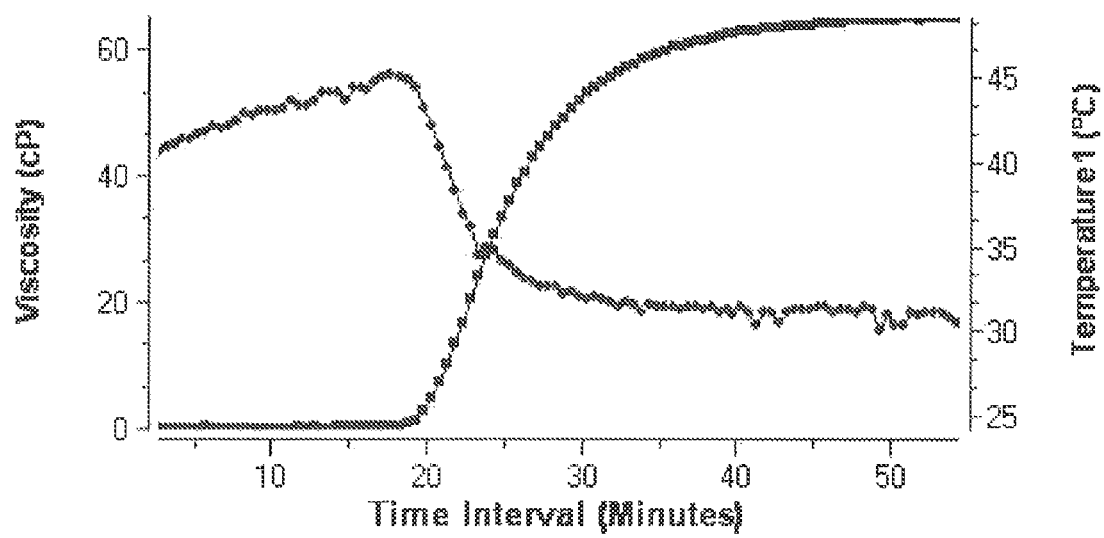
Figure 10:
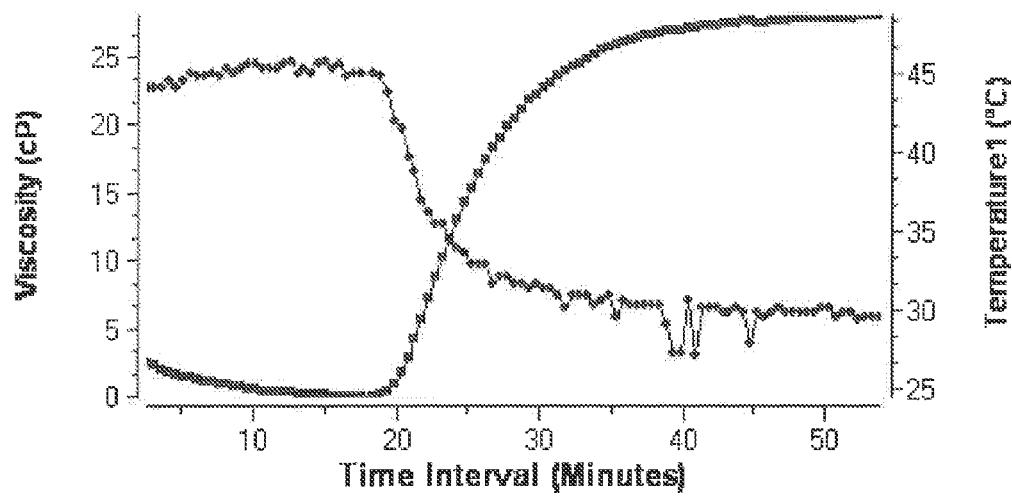
Figure 11:
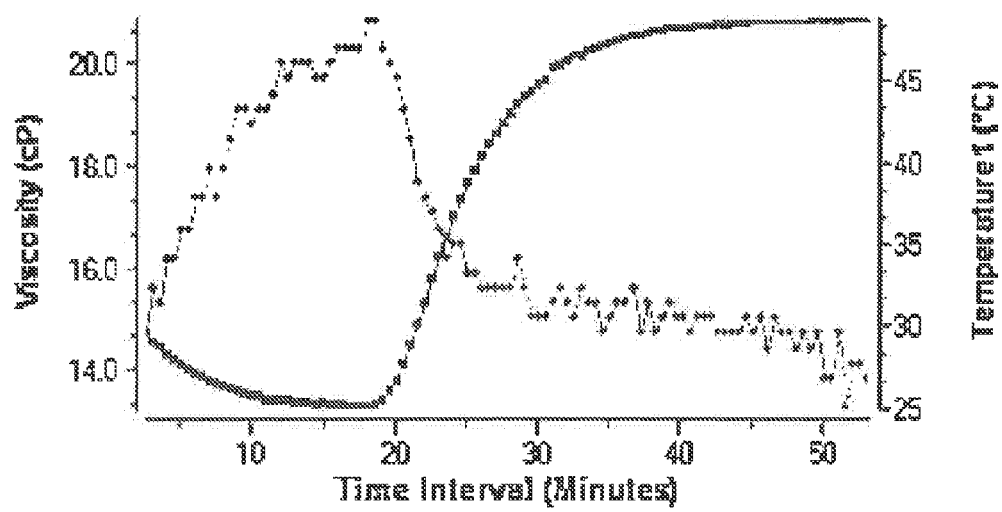
Figure 12:
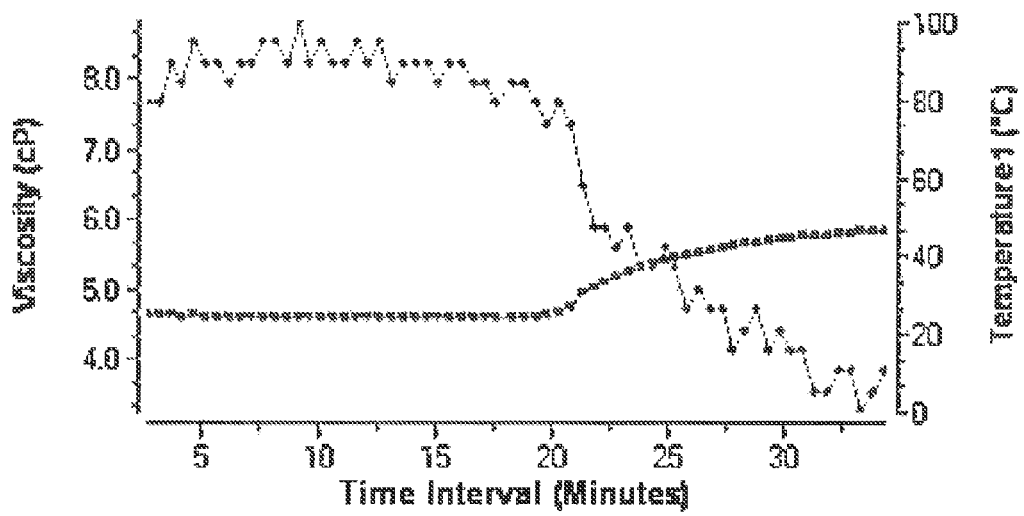

Referring to FIGS. 3-5 and Table 5 below, viscosity test results for TH, TO, and TD in TG740 at 10 mM concentration are illustrated. The results illustrate that increased chain length=increased solubility as the compound becomes less polar, and decreased viscosity due to reduced H-bond strength. Increased viscosity was almost instant obtained at room temperature. An additional but successful experiment not in the figures or tables involved injecting highly concentrated gelled sample TH in TG740 into ungelled TG740 in a blender at room temperature.

TABLE 5

| Gel type | Max viscosity (cp) | Time (mins) | Min. Temp. (° C.) to Gel |
|---|---|---|---|
| TH | 707 | 85 | 40 |
| TO | 421 | 50 | 29 |
| TD | 256 | 40 | 26 |

As indicated above, TB did not gel TG740. TB was found to be insoluble in TG740, although soluble in cyclohexane. When cyclohexane gelled with TB was injected into TG740, a cloudy dispersion resulted and TG740 was not gelled.

Figure 13:
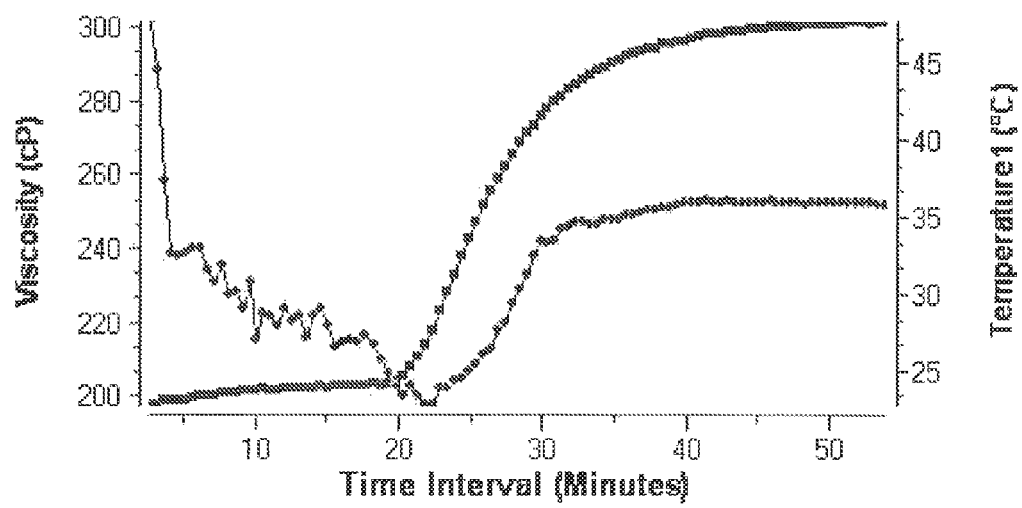
Figure 14:
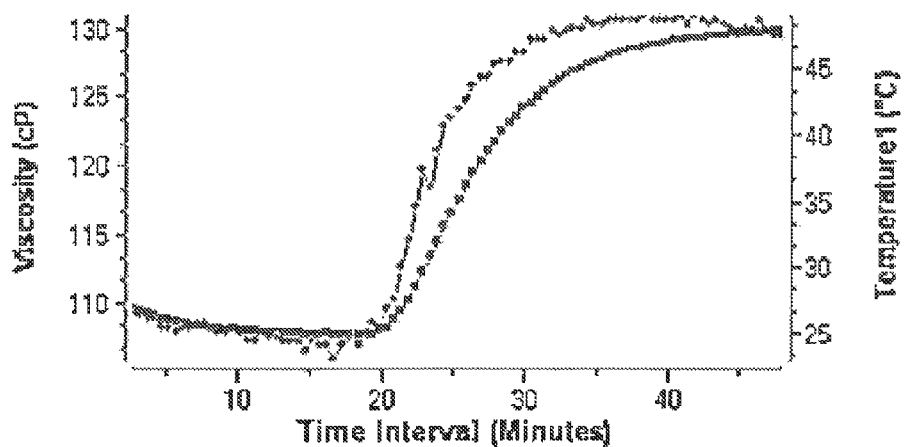
Figure 15:
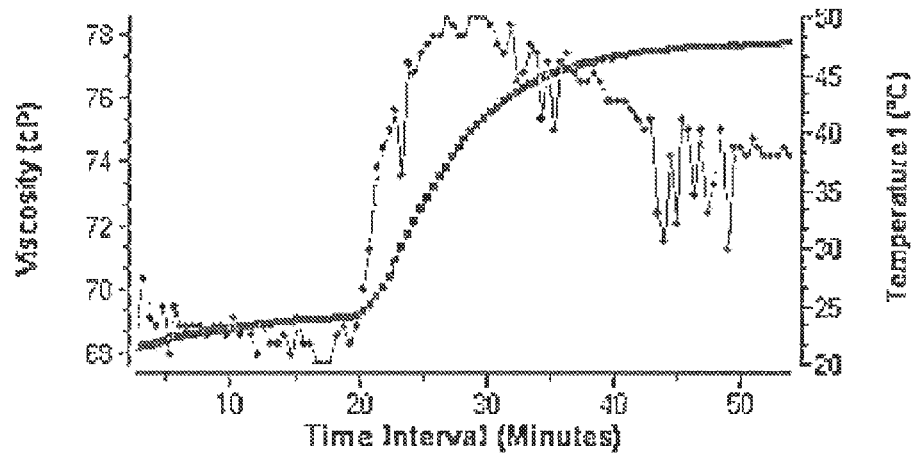
Figure 16:
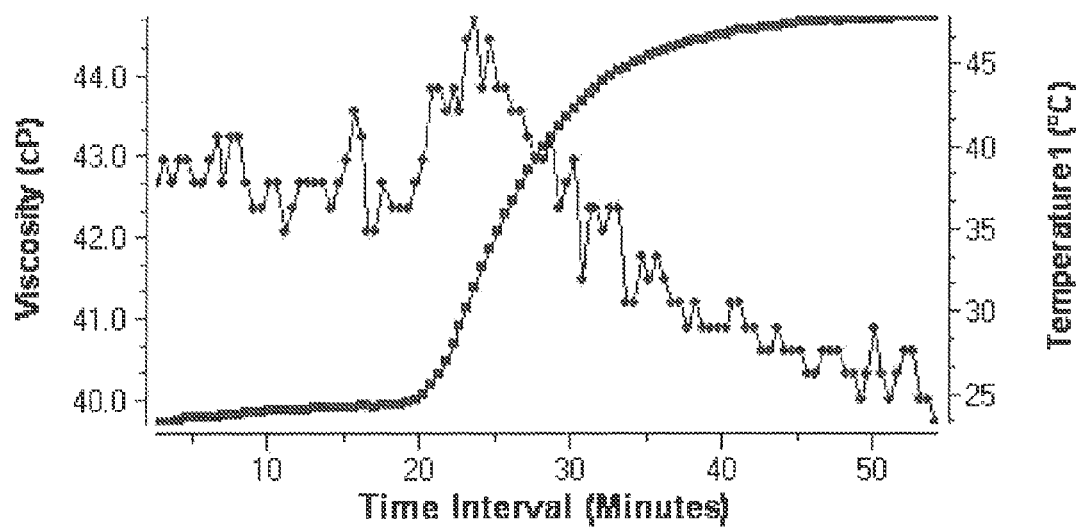
Figure 17:
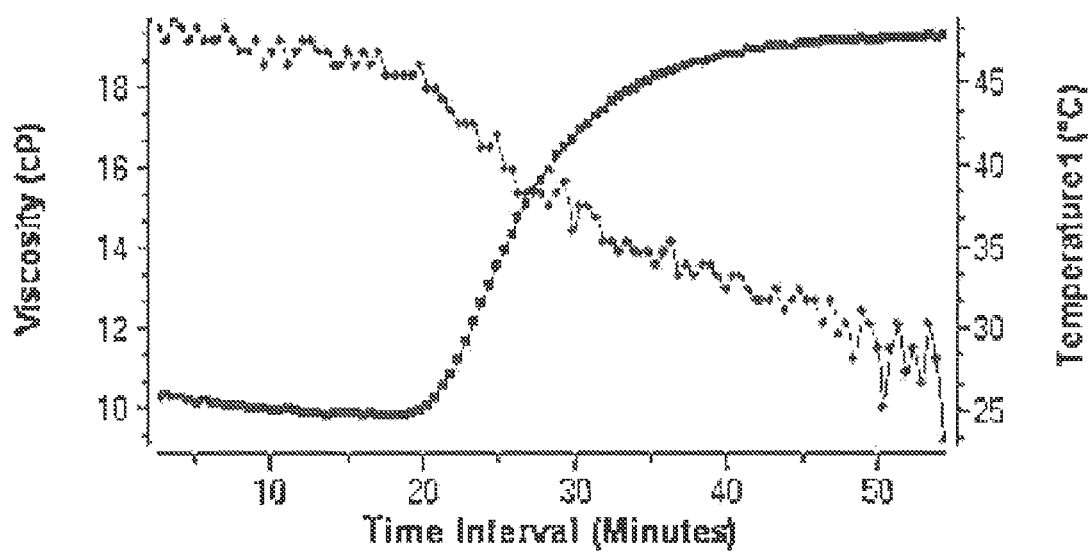
Figure 18:
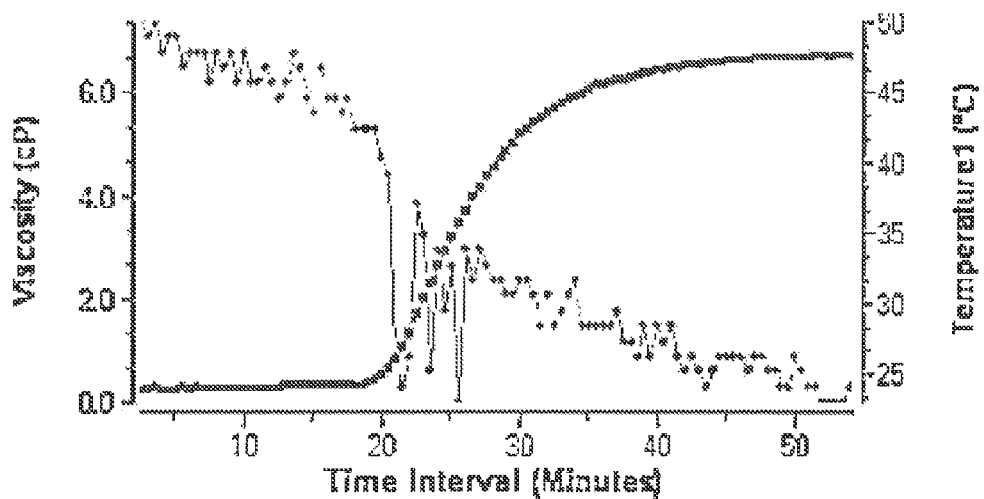
Figure 19:
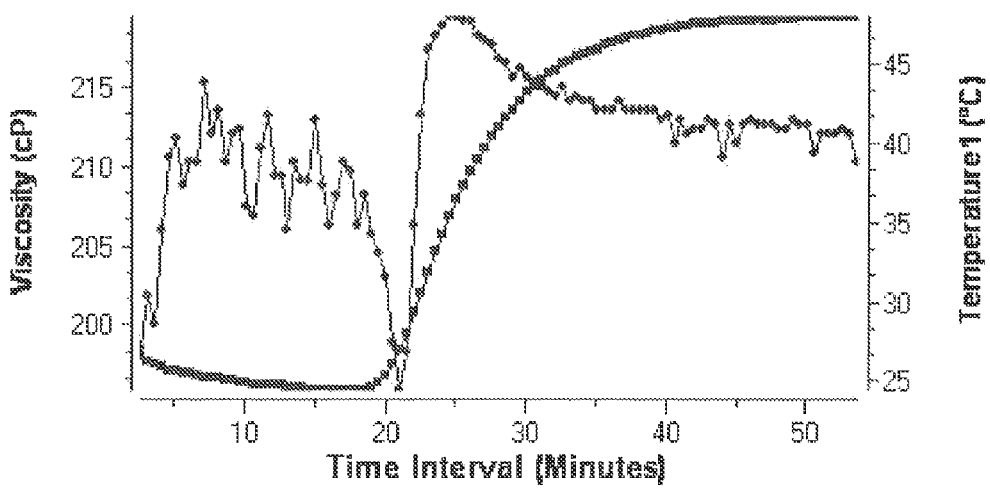
Figure 20:
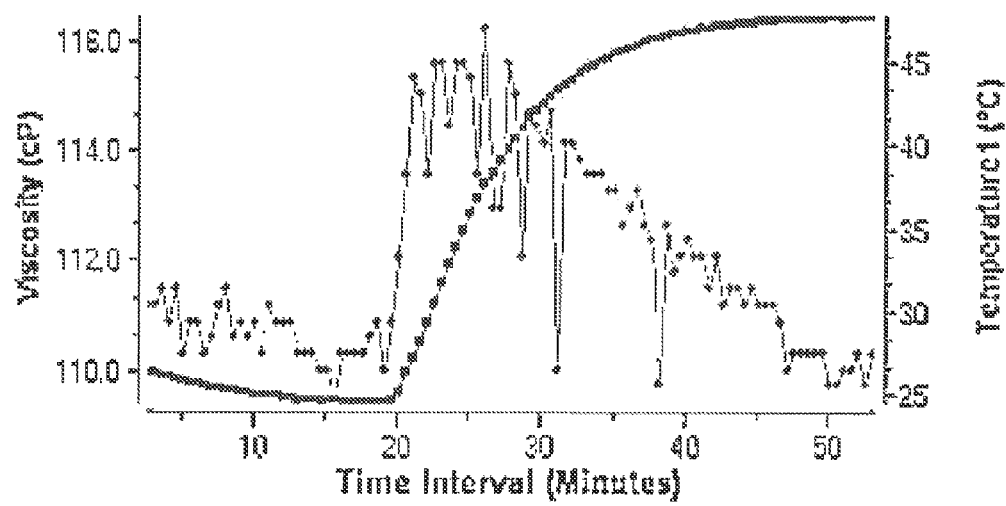
Figure 21:
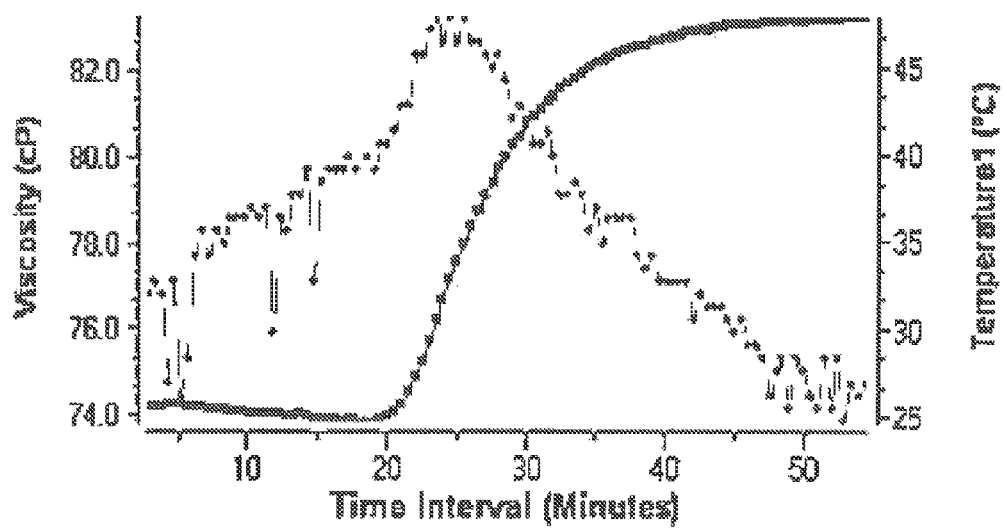
Figure 22:
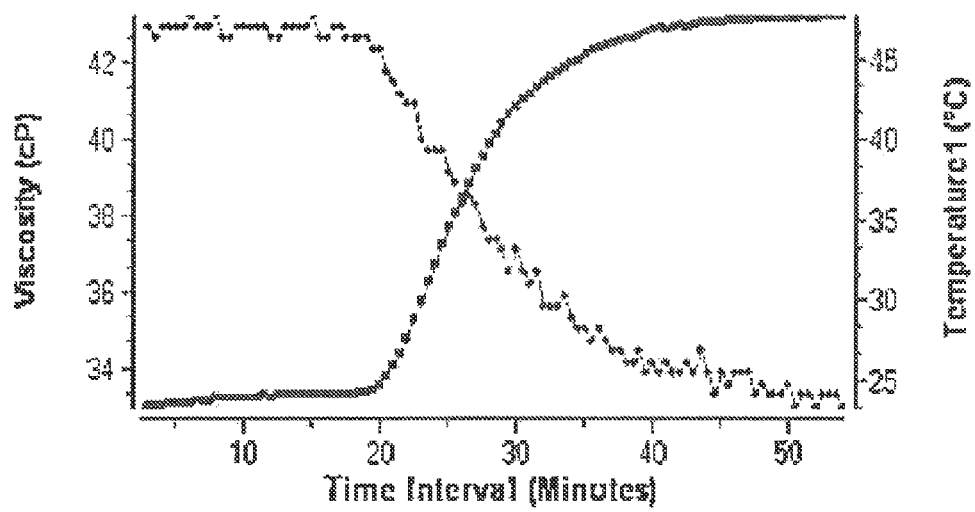
Figure 23:
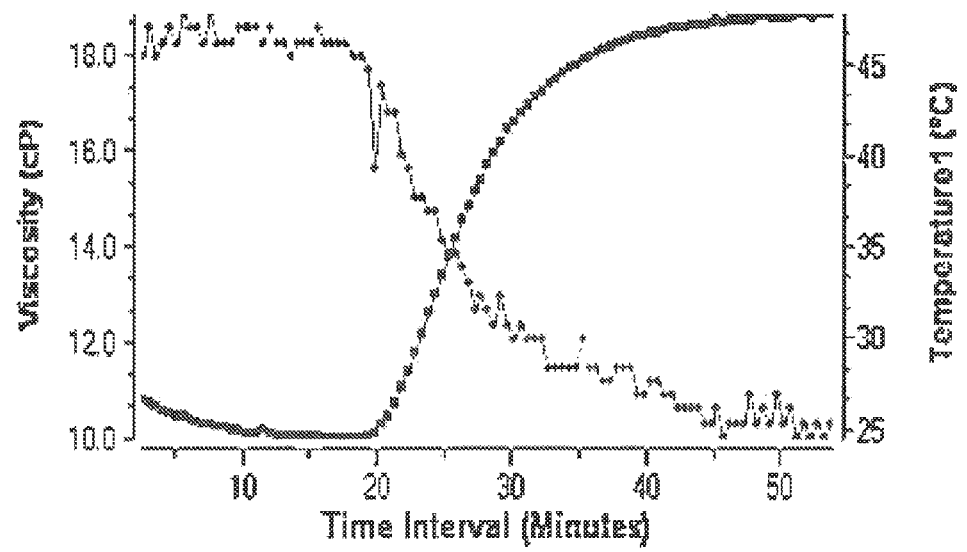
Figure 24:
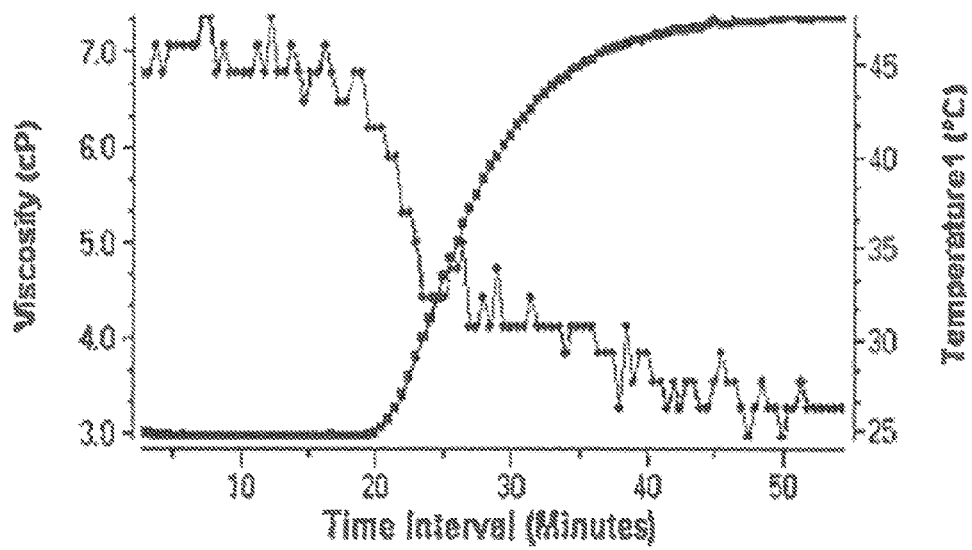
Figure 25:
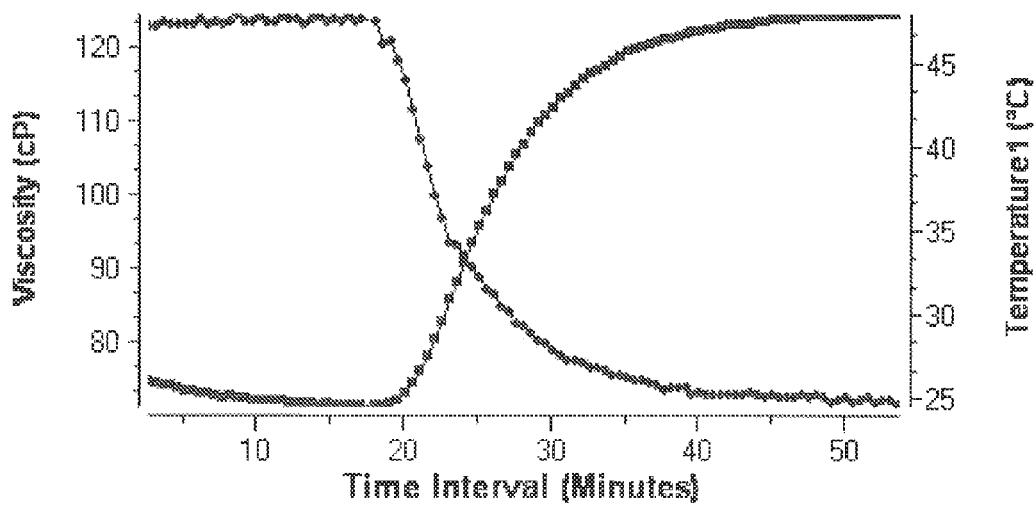
Figure 26:
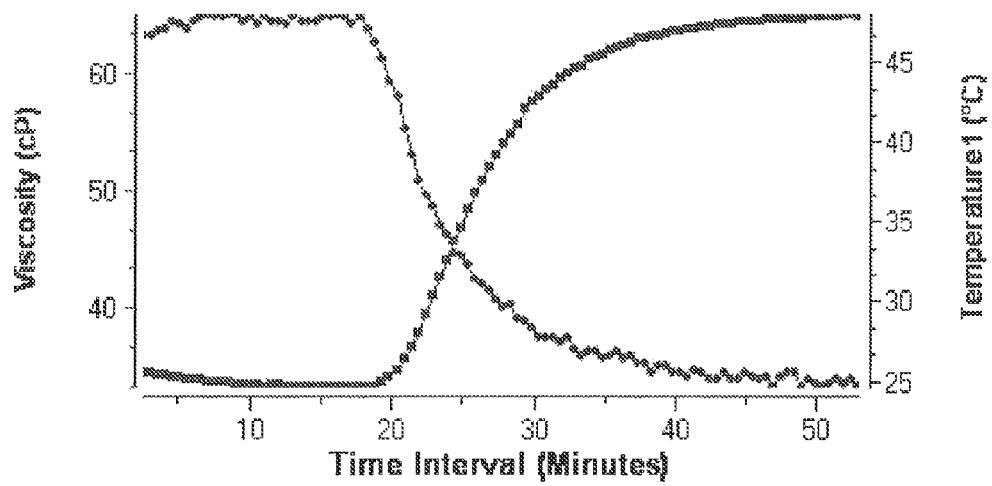
Figure 27:
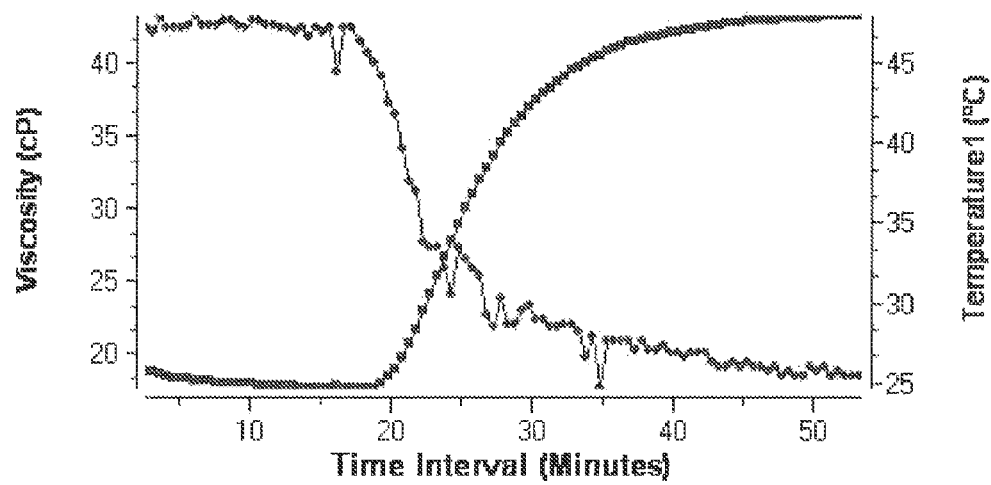
Figure 28:
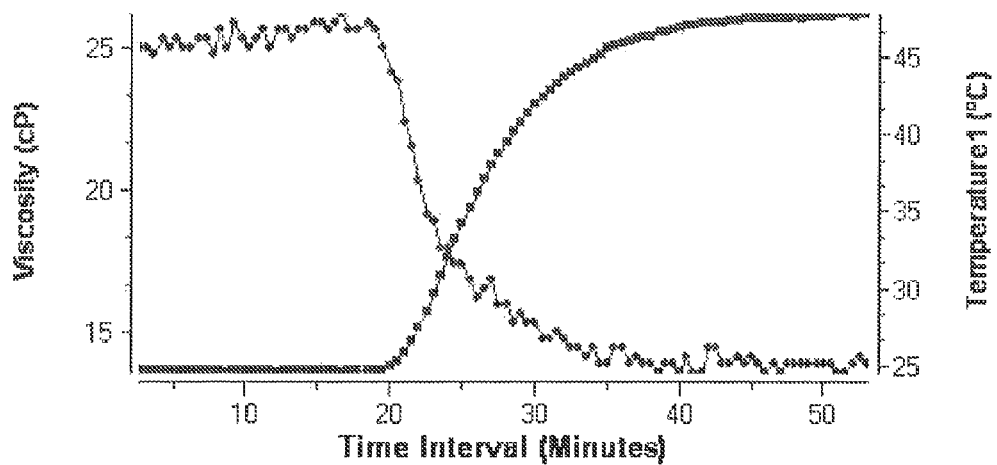
Figure 29:
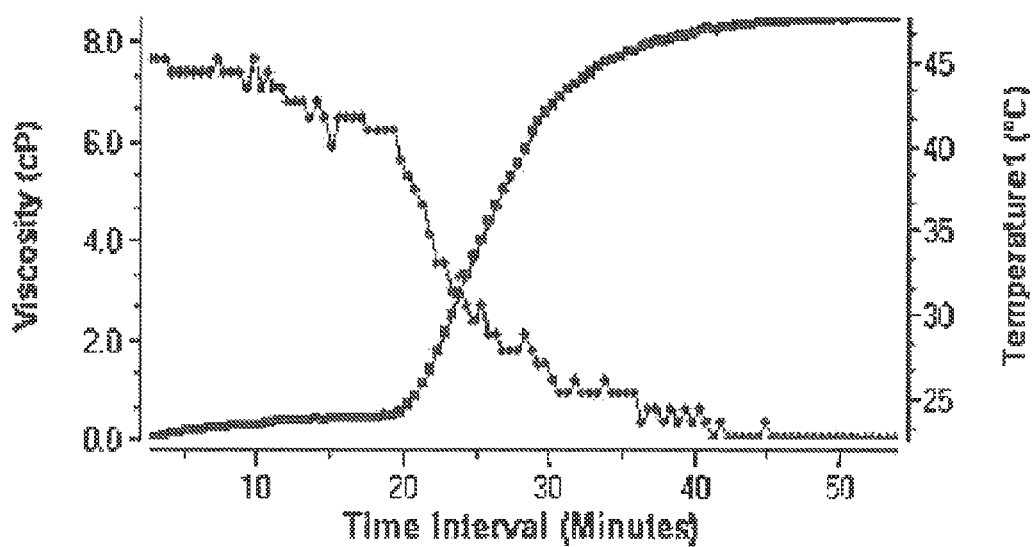
Figure 30:
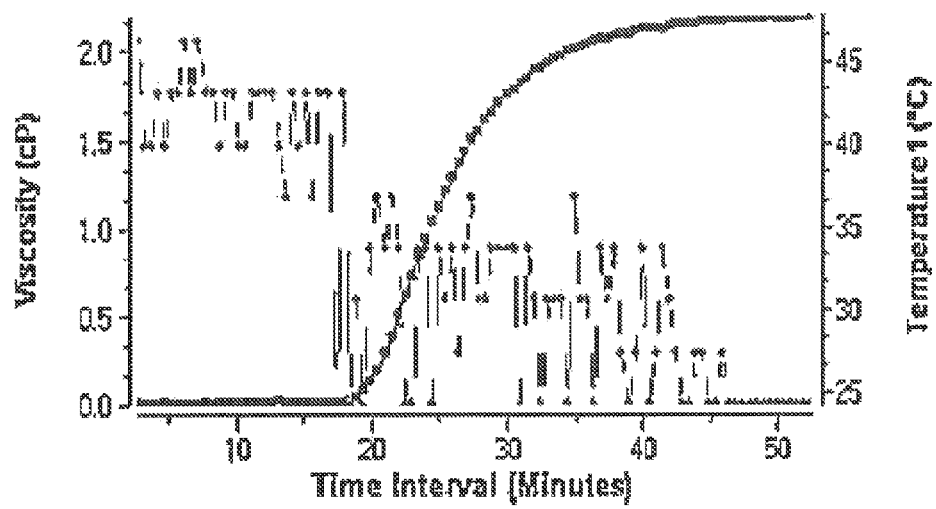
Figure 31:
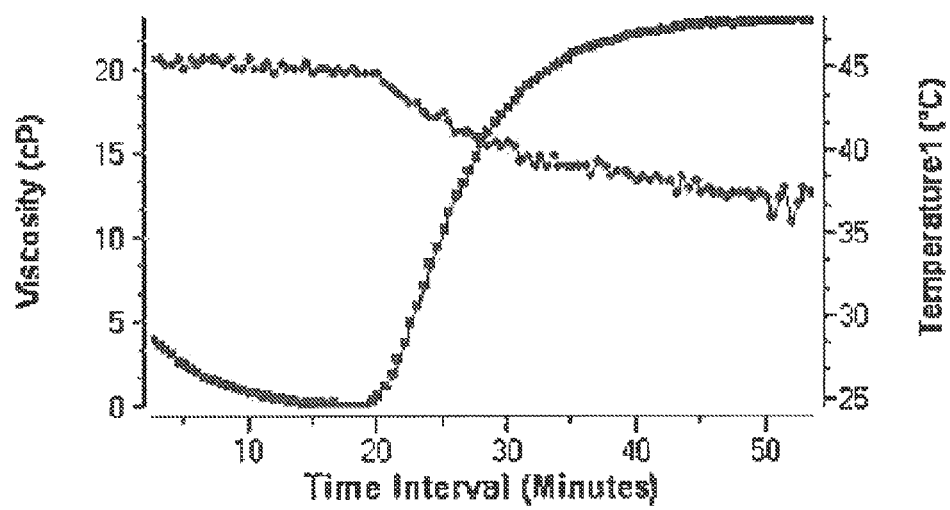
Figure 32:
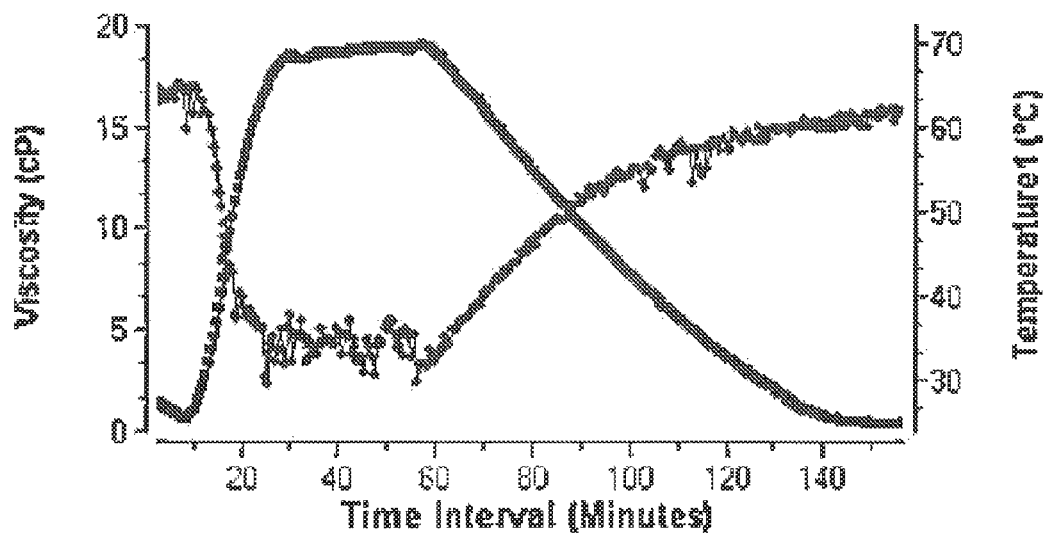
Figure 33:
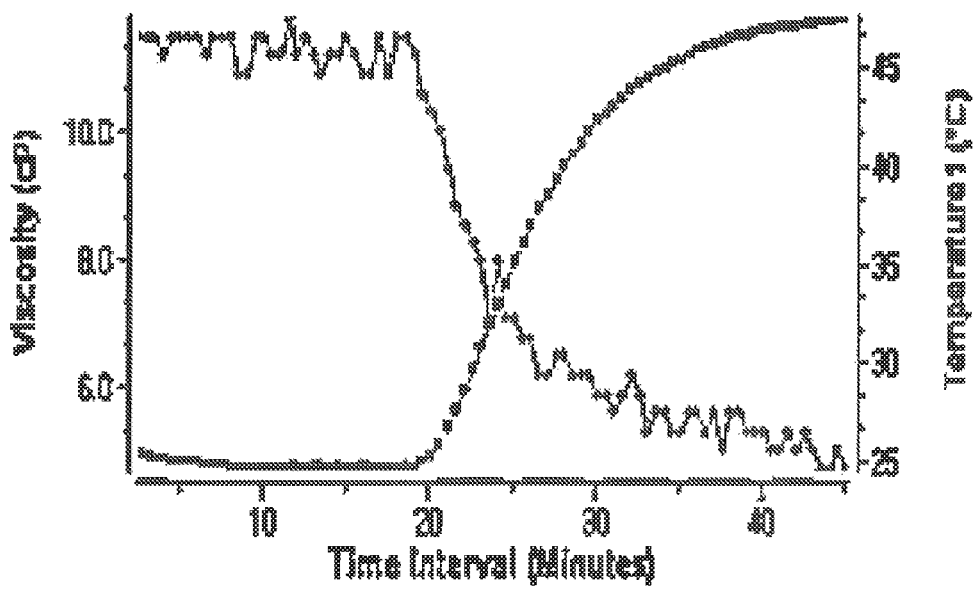
Figure 34:
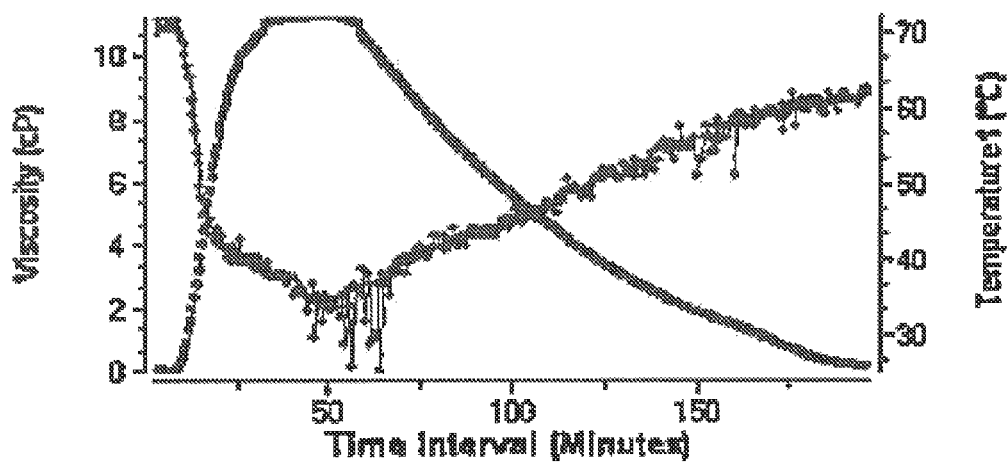
Figure 35:
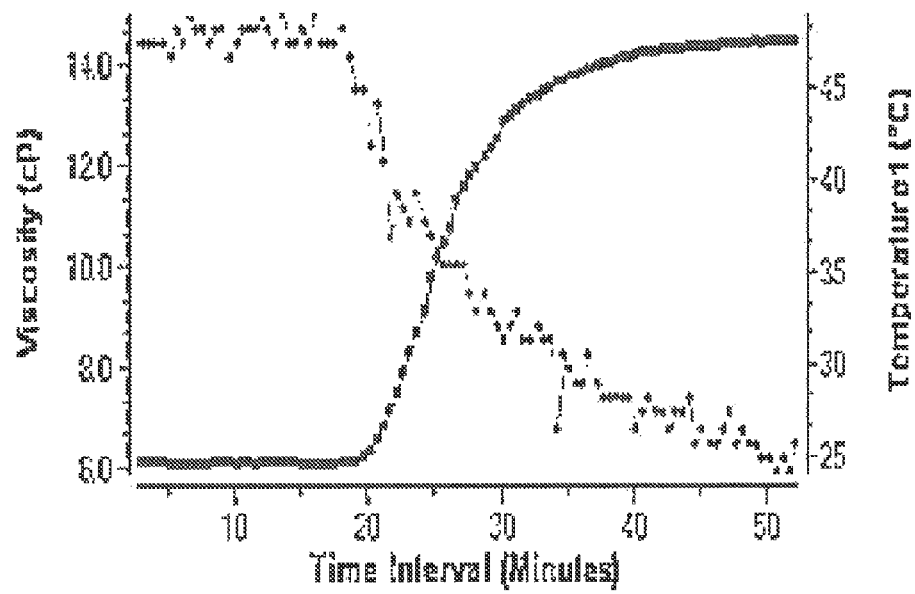
Figure 36:
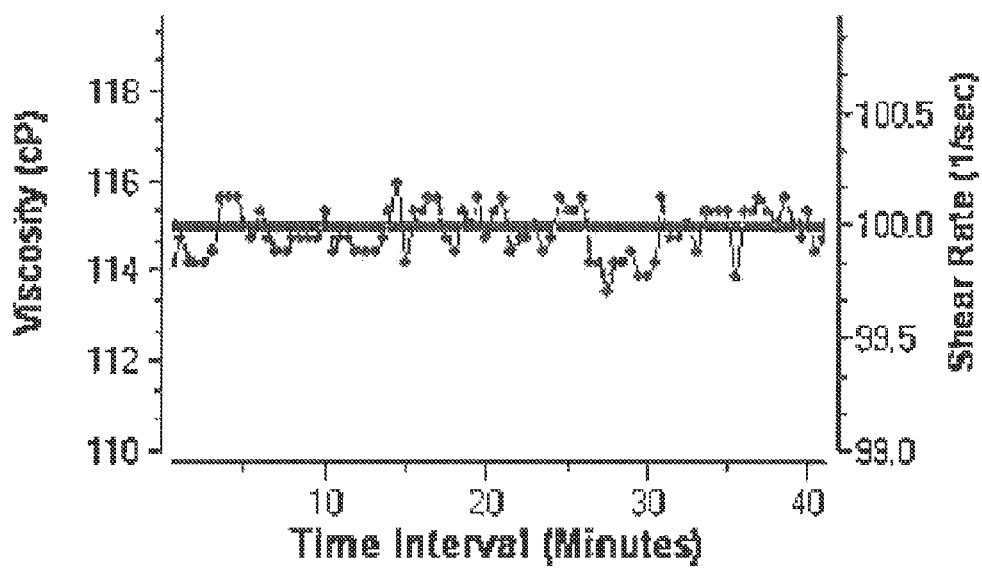
Figure 37:
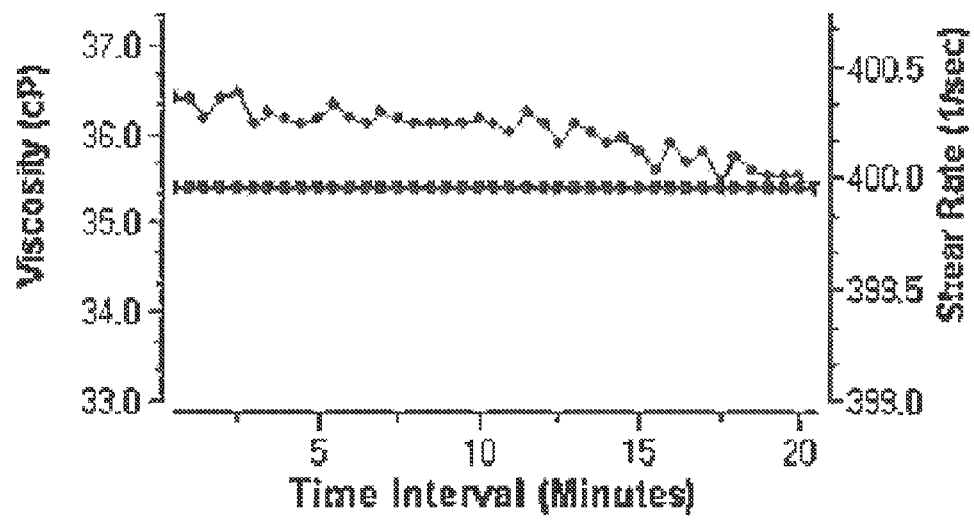
Figure 38:
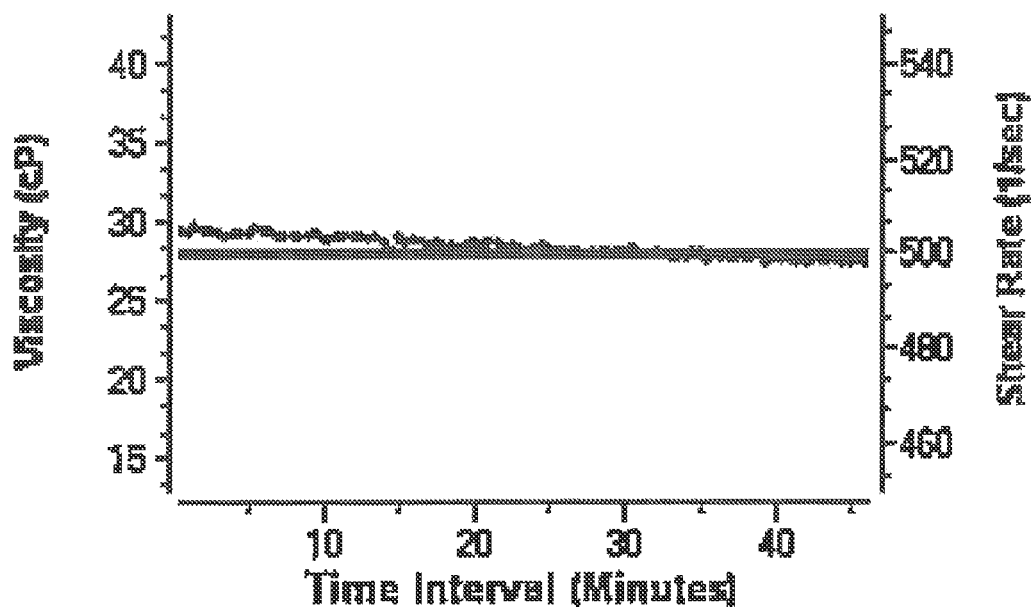

FIGS. 3-30 illustrate viscosity testing results for TB, TH, TO and D as indicated in Table 1 above. Many of the results, for example the results shown in FIGS. 13-15 for TH gelled TG 740, indicate that increasing temperature increased viscosity, which was unexpected.

Referring to FIGS. 31-35 and Table 6, various mixtures of gelling agents were tested. Such mixtures demonstrated thermoreversible gelling, which is in line with the theory that reversible H bonding between molecules was responsible for gelling. The mixture results also demonstrate that gelling is temperature dependent and chain length dependent.

TABLE 6

| | THTO | THTD | TOTD |
|---|---|---|---|
| Max viscosity (cp) | 21 | 15 | 12 |
| Min viscosity (cp) | 13 | 6 | 5 |

Tables 7-10 below illustrate viscosity testing results for TB, TH, TO, and TD, respectively.

TABLE 7

Viscosity test results for TB in cyclohexane

| Conc. (mM) | Max. viscosity (cP) | Temp. max viscosity reached (° C.) | Min. viscosity (cp) | Temp. min viscosity reached (° C.) |
|---|---|---|---|---|
| 10 | 436 | 42 | 303 | 25 |
| 7 | 119 | 25 | 35 | 48 |
| 5 | 85 | 24 | 39 | 47 |
| 4 | 56 | 24 | 16 | 49 |
| 3 | 25 | 25 | 3 | 48 |
| 2 | 20 | 25 | 14 | 48 |
| 1 | 9 | 25 | 4 | 47 |

TABLE 8

Viscosity test results for TH in TG740

| Conc. (mM) | Max. viscosity (cP) | Temp. max viscosity reached (° C.) | Min. viscosity (cp) | Temp. min viscosity reached (° C.) |
|---|---|---|---|---|
| 7 | 301 | 22 | 198 | 27 |
| 5 | 130 | 48 | 107 | 25 |
| 4 | 79 | 40 | 69 | 24 |
| 3 | 45 | 31 | 40 | 48 |
| 2 | 19 | 25 | 9 | 48 |
| 1 | 7 | 24 | 0 | 28 |

TABLE 9

Viscosity test results for TO in TG740

| Conc. (mM) | Max. viscosity (cP) | Temp. max viscosity reached (° C.) | Min. viscosity (cp) | Temp. min viscosity reached (° C.) |
|---|---|---|---|---|
| 7 | 219 | 35 | 196 | 26 |
| 5 | 116 | 38 | 110 | 48 |
| 4 | 83 | 33 | 74 | 48 |
| 3 | 43 | 24 | 33 | 48 |
| 2 | 19 | 25 | 10 | 48 |
| 1 | 7 | 25 | 3 | 48 |

TABLE 10

Viscosity test results for TD in TG740

| Conc. (mM) | Max. viscosity (cP) | Temp. max viscosity reached (° C.) | Min. viscosity (cp) | Temp. min viscosity reached (° C.) |
|---|---|---|---|---|
| 7 | 124 | 26 | 71 | 48 |
| 5 | 64 | 25 | 33 | 48 |
| 4 | 43 | 25 | 19 | 48 |
| 3 | 26 | 25 | 14 | 48 |
| 2 | 8 | 23 | 0 | 47 |
| 1 | 2 | 24 | 0 | 47 |

FIGS. 36-41 illustrate shear testing results for TB in cyclohexane. The results shown in FIGS. 36-39 illustrate that the gels formed may be shear stable, as illustrated by testing with a constant shear rate over time. FIGS. 39-41 examine the viscosity of TB in cyclohexane under a varying shear rate, and illustrate that there is a nonlinear relationship between shear rate and shear stress, thus indicating Non-Newtonian behavior.

Referring to FIG. 42, an examination of TB gelation in cyclohexane at different concentrations illustrated a non-linear relationship between viscosity and concentration as shown. This finding supports the theory that the formation of gels is thought to occur via a hierarchical self-assembly of columnar stacks, helical ribbons and similar aggregates to form a 3D network.

Nuclear Magnetic Resonance Spectroscopy (NMR)

NMR was used to determine molecular structure, and is based on radio frequency emission from high to low spin state as is known in the art. NMR gives information on the type of environment of an atom, the neighboring environment based on the splitting pattern, the number of protons in environment (integral), and the symmetry of the molecule. Given a symmetrical molecule, corresponding proton and carbon environments are expected to be the same. In a symmetrical pyromellitamide the NMR data was thus expected to show 1 peak for the amide protons and 1 peak for the aromatic protons.

Referring to FIGS. 44-51 and Table 11, proton and carbon NMR data is illustrated for TH and TO.

TABLE 11

NMR peak data

| FIG. | Gelling agent | NMR Type | Peak assignment |
|---|---|---|---|
| 44 | TH | $^1$H | N,N',N'',N'''-tetrahexylbenzene-1,2,4,5-tetracarboxamide $\delta_H$ (300 MHz, d$_5$-pyridine, Me$_4$Si) 0.75-0.85 (12H, m, CH$_3$), 1.15-1.27 (16H, m, CH$_2$), 1.30-1.42 (8H, m, CH$_2$), 1.69-1.77 (m, 8H, CH$_2$), 3.56-3.71 (8H, m, CH$_2$), 8.37 (1H, s, CH), 8.69 (1H, s, CH), 9.20 (1H, m, NH) and 9.29 (3H, m, NH). |
| 45 | TH | $^{13}$C | N,N',N'',N'''-tetrahexylbenzene-1,2,4,5-tetracarboxamide $\delta_C$ (75 MHz, d$_5$-pyridine, Me$_4$Si) 14.2 (CH$_3$), 22.9 (CH$_2$), 27.1 (CH$_2$), 29.9 (CH$_2$), 31.8 (CH$_2$), 40.5 (CH$_2$), 168.3 (C=O). |
| 46/49 | TO | $^1$H | N,N',N'',N'''-tetraoctylbenzene-1,2,4,5-tetracarboxamide $\delta_H$ (300 MHz, d$_5$-pyridine, Me$_4$Si) 0.81-0.89 (12H, m, CH$_3$), 1.10-1.30 (32H, m, CH$_2$), 1.36-1.47 (8H, m, (CH$_2$), 1.74 (8H, tt, CH$_2$, J = 7.5 Hz), 3.59-3.76 (8H, m, CH$_2$), 8.35 (1H, s, CH), 8.68 (1H, s, CH), 9.15 (1H, t, NH, J = 5.7 Hz) and 9.319 (3H, m, NH). |
| 47/48 | TO | $^{13}$C | N,N',N'',N'''-tetraoctylbenzene-1,2,4,5-tetracarboxamide $\delta_C$ (75 MHz, d$_5$-pyridine, Me$_4$Si) 14.3 (CH$_3$), 22.9 (CH$_2$), 27.4 (CH$_2$), 29.5 (CH$_2$), 29.6 (CH$_2$), 30.0 (CH$_2$), 32.0 (CH$_2$), 40.5 (CH$_2$), (2 aromatic peaks obscured by pyridine solvent peaks), 130.6 (C), 133.0 (C), 135.8 (C) 160.4 (C=O) and 168.4 (C=O). |

The NMR data appeared to indicate that the pyromellitamides analyzed were unsymmetrical. For example, the $^1$H NMR appears to indicate an unsymmetrical molecule by illustrating that the protons on the benzene ring are in different environments. Referring to The $^1$H data appears to show 1 amide proton in a distinctly unique environment as evidenced by a triplet, whereas the 3 other amide protons are in similar environments as evidenced by overlaid triplets. FIG. 43, examples of possible rotamers are shown that may cause this type of pattern. The molecules in FIG. 43 illustrate from left to right the (syn-syn)-(anti-anti), (syn-syn)-(syn-anti), and the (syn-syn)-(anti-anti) examples.

FIGS. 50-51 illustrate variable temperature (VT) $^1$H NMR Spectra. The VT $^1$H NMR spectra provide evidence for H bonding, as well as evidence of the rotamer interconversion seen as the shape of the amide H peaks changed with increasing temperature indicating a changing environment, thus consistent with the data illustrated in FIG. 16. Referring to FIG. 50, the $^1$H NMR VT illustrated a stepwise decrease in chemical shift as the temperature increased. A reduction in the extent of H-bonding as temperature is increased was also shown, which is consistent with the data illustrated in FIG. 16. Referring to FIG. 51, the TO $^1$H NMR VT illustrated an upfield shift, which is conventionally described as negative temperature coefficient. In a hydrogen-bonded amide group, the carbonyl functionality causes the amide proton to be shifted downfield. Increased temperature=increased magnitude of thermal fluctuations=increase in the average distance between atoms. Thus, the hydrogen bond is weakened and the amide proton is shifted downfield to a lesser extent (i.e. a relative upfield shift).

Referring to FIGS. 52-53, both TH and TO show similar amide hydrogen shift temperature dependence.

The disclosed embodiments may provide low viscosity gels or high viscosity gels. An example of a low viscosity gel (2-50 cp) is SLICK OIL™ designed application is for tight oil and gas formations. High viscosity gels may require addition of a breaker.

The base components of TG740, SF800 and SF 840 are alkanes, isoalkanes and aromatic hydrocarbons. TG740, SF800 and SF 840 are frac fluids available for sale under the same or different names at various refineries in North America. SD810, or SynDril 810, is a drilling fluid available for sale under the same or different names at various refineries in North America.

The downhole fluids disclosed herein may be used as downhole treatment fluids, as drilling fluids, or for other downhole uses. FIG. 63 illustrates the fluid 30 being used as a drilling fluid in association with a drill bit 32 drilling a well 34. For a drilling fluid example, a sample of Syndril 810 (SD810), which is a mineral oil, was mixed with 5 mM TO. The mixture was mixed for 5 hours in a mixer at level 1-40% and left mixing overnight. The sample wasn't fully dissolved by the morning so the sample was heated for 30 min at 70° C. before being mixed again for 1 hour after which the TO had fully dissolved into the sample mixture. Viscosity was tested on a Fann Model 35A 6 speed Viscometer available from the FANN INSTRUMENT COMPANY™, of Houston, Tex. Viscosity results are shown below in Table 12, and indicated a plastic viscosity of 10 cP and a yield point of 12 lbs/100 ft². The drilling fluid testing indicated that the resulting mixture has suitable viscosity and low end rheology (solids removal). The viscosity test was then repeated after a wetting agent (described further above) was added (5 mL/L) to the sample. The viscosity results for the subsequent test with the wetting agent sample are shown below in Table 13, and indicate a plastic viscosity of 10 cP and a yield point of 11.5 lbs/100 ft². Drilling chemicals are generally large amines that don't affect the hydrogen bonding of the amide branched aromatic and pyromellitamide gel. Drilling fluids include inverts.

TABLE 12

Drilling fluid test results

| Speed (RPM) | Viscosity (cP) |
| --- | --- |
| 600/300 | 44/34 |
| 200/100 | 30/26 |
| 6/3 | 21/19 |

TABLE 13

Drilling Fluid test results with Wetting Agent

| Speed (RPM) | Viscosity (cP) |
| --- | --- |
| 600/300 | 43/33 |
| 200/100 | 29/24 |
| 6/3 | 20/18 |

Table 14 illustrates further tests done with drilling fluid (5 mM TO in SD810, with rev dust and a wetting agent Dynol™ 604), and indicate a plastic viscosity of 17 cP and a yield point of 10.5 lbs/100 ft².

TABLE 14

Drilling fluid results with wetting agent

| Speed (RPM) | Viscosity (cP) |
| --- | --- |
| 3 | 18 |
| 6 | 19 |
| 100 | 26 |
| 200 | 32 |
| 300 | 38 |
| 600 | 55 |

Table 15 illustrates viscosity testing that compares a 5 mM TO gel in SD810 with various other drilling fluids. Table 16 indicates the components present in the drilling muds tested. Viscosity and ES measurement taken at 25° C., and fluid loss was performed at 100° C. and 500 psi differential pressure. As can be see, the SD810 drilling fluid showed higher viscosity than comparable drilling muds.

TABLE 15

Further drilling fluid evaluation of DF-48

| | | SynDril 810 | Drillsol Plus 90/10 | | Synoil 470 90/10 | |
| --- | --- | --- | --- | --- | --- | --- |
| | | | BHR | AHR | BHR | AHR |
| Viscosity | 600 rpm | 65 | 46 | 40 | 29 | 25 |
| | 300 rpm | 45 | 28 | 24 | 17 | 15 |
| | 200 rpm | 37 | 21 | 18 | 12 | 11 |
| | 100 rpm | 30 | 14 | 12 | 7 | 7 |
| | 6 rpm | 22 | 5 | 4 | 2 | 2 |
| | 3 rpm | 22 | 4 | 3 | 1 | 1 |
| Plastic viscosity (mPa-s) | | 20 | 18 | 16 | 12 | 10 |
| Yield point (Pa) | | 12.5 | 5 | 4 | 2.5 | 2.5 |
| ES - Electrical Stability (ave) | | <1999 | 1562 | >2000 | 644 | 1777 |
| HTHP - high temperature high pressure (mL) | | 4.6 | 5.3 | | 6.1 | |

TABLE 16

Components of drilling fluids from Table 15

| | | Drillsol Plus 90/10 | | Synoil 470 90/10 | |
| --- | --- | --- | --- | --- | --- |
| Base fluid | SynDril 810 | BHR | AHR | BHR | AHR |
| DF-48 (TO) | 3.30 kg/m³ | | | | |
| Wetting agent (Drilltreat from Halliburton) | 4 L/m³ | | | | |
| Rev Dust | 50 Kg/m³ | 100 Kg/m³ | | 100 Kg/m³ | |
| Drillsol Plus | | 90/10 OWR | | | |
| Syndril 470 | | | | 90/10 OWR | |
| Bentone 150 | | 20 Kg/m³ | | 20 Kg/m³ | |
| 30% CaCl₂ brine | | 90/10 OWR | | 90/10 OWR | |
| Clearwater P | | 10 L/m³ | | 10 L/m³ | |
| Clearwater S | | 5 L/m³ | | 5 L/m³ | |
| Lime | | 12 Kg/m³ | | 12 Kg/m³ | |

Various N,N',N'',N'''-(benzene-1,2,4,5-tetrayl) variants were tested and gelled in SynDril 810 at 5 mM, results shown in Table 17.

TABLE 17 viscosities of tetraamides in SynDril 810 (SD810)

| Gel name | Viscosity (cP) |
| --- | --- |
| N,N',N'',N'''-(benzene-1,2,4,5-tetrayl) heptanamide | 96-98 |
| N,N',N'',N'''-(benzene-1,2,4,5-tetrayl) octanamide | 87-89 |
| N,N',N'',N'''-(benzene-1,2,4,5-tetrayl) nonanamide | 85-87 |
| N,N',N'',N'''-(benzene-1,2,4,5-tetrayl) decanamide | 78-79 |
| N,N',N'',N'''-(benzene-1,2,4,5-tetrayl) dodecanamide | 16-18 |
| N,N',N'',N'''-(benzene-1,2,4,5-tetrayl) tetradecanamide | 8-10 |
| N,N',N'',N'''-(benzene-1,2,4,5-tetrayl) hexadecanamide | 71-73 |

Table 18 below illustrates viscosity test results for a drilling fluid (SD810) gelled with TO, and with a gel enhancer added, namely hexamethylene diaminochloride (hexamethylene diamine dihydrogen chloride). The gel was made with a concentration of 1.2 mM (2.4 kg/m3) and had added to it a 9.6 mM enhancer (which is the equivalent of 80 mM with 10 mM gel). The results indicate good low end rheology, for example at the 6/3 setting. Such results indicate that the fluid has cleaning power at low flow rate, because the gel maintains sufficient viscosity.

TABLE 18

Viscosity of enhanced drilling fluid

| RPM | Initial gel cP | Initial gel after 1 hr rest cP | Gel after 5 mins blending with Intensifier cP |
|---|---|---|---|
| 600/300 | 28/21 | 32/24 | 34/25 |
| 200/100 | 18/14 | 20/16 | 22/18 |
| 6/3 | 5/4 | 7/6 | 9/7 |

The base fluid may comprises fluid other than hydrocarbons. For example, the base fluid may include one or more of nitrogen or carbon dioxide. For further example N2 may be present at 50-95% while CO2 may be present at 5-50%. Other ranges and other base fluids may be used. Hydrocarbon base fluids may be combined with other fluids such as N2 and CO2 in some cases.

Gel Enhancers (Intensifiers)

The discovery of compounds that increase rather than decrease the viscosity of the pyromellitamide gelling agents led to the conclusion that the pyromellitamide and amide branched aromatic gels may be used in conjunction with such gel enhancers. Co-use of gelling agent and enhancer may be synergistic and reduce the amount of gel required to achieve relatively comparable viscosities.

Suitable gel enhancers may be used. For example, the gel enhancer may comprise one or more of a metal compound, potassium tert-butoxide, diethanolamine, L-menthol, lactic acid, mandelic acid, ammonium acetate, paraformaldehyde, hydroquinone, and tetramethylammonium hydroxide.

Potassium tert-butoxide and piperazine were tested as gel enhancers. One test performed was intended to determine if the enhanced gels could be broken. Solutions were made up containing the already gelled TH in TG740 hydrocarbon solution and a small amount of either potassium tert-butoxide or piperazine. Five breaking agents, namely benzyltributyl ammonium chloride, 2-ethyl-1-butanol, 2-ethyl-1-hexylamine, benzylamine, and 1-butanol were tested against these solutions. These breakers had worked well to destroy the hydrogen bond network in the standard gelled hydrocarbon solutions and were now used to determine effectiveness in these thickened solutions. In non-enhanced solution these breakers immediately returned the viscosity back to the original hydrocarbon viscosity. With potassium tert-butoxide present, benzyltributyl ammonium chloride, 2-ethyl-1-butanol, and 1-butanol reduced viscosity immediately upon mixing. However, 2-ethyl-1-hexylamine decreased viscosity only slightly, and benzylamine didn't reduce viscosity noticeably. For piperazine, benzyltributyl ammonium chloride, 2-ethyl-1-butanol, benzylamine, and 1-butanol all reduced viscosity noticeably after mixing, while 2-ethyl-1-hexylamine decreased viscosity only slightly. None of these breakers worked as well in enhanced solutions as in non enhanced solutions. 2-Ethylhexanol could also be used as a breaker.

After noticing that piperazine thickens the solution and increased the viscosity of the already gelled solution, several tests were done to see if the amount of pyromellitamide gelling agent could be reduced using piperazine whilst still giving the same relative viscosity level. The standard gel solution that the viscosity of the various compositions were measured and compared against was an 8.0 mmol solution of the TH solution (24 mg in 5 mL of TG 740 hydrocarbon). First tested was a 10% gel solution with 0.8 mmol tetramide (2.4 mg/5 mL) and 7.2 mmol piperazine (3.1 mg/5 mL). This ratio didn't seem to increase the viscosity of the solution in comparison to the starting hydrocarbon gel solution, even when excess of piperazine was added (up to 12 times more piperazine compared to tetramide) suggesting that a certain base concentration, for example at least the 50% solution tested next, of the tetramide must be present in order for the enhancement to be significant. Next a 50% gel solution was tested: 4.0 mmol tetramide (12 mg/5 mL) and 4.0 mmol piperazine (1.7 mg/5 mL). The solution became thicker than the original hydrocarbon but not quite as thick as the standard 8 mmol tetramide gelled solution. Next a 1:2 ratio gel solution was tested: 4.0 mmol tetramide (12 mg/5 mL) and 8.0 mmol piperazine (3.4 mg/5 mL). Having double the amount of piperazine increased the viscosity of the solution in comparison to the previous test, making the solution about as thick as the standard 8.0 mmol tetramide solution. Next a 1:3 ratio gel solution: 4.0 mmol tetramide (12 mg/5 mL) and 12.0 mmol piperazine (5.1 mg/5 mL). This gel seemed to have a slight effect on increasing the viscosity however the solution wasn't as thick as in the 1:2 ratio gel, possibly indicating that piperazine can also act as a breaker, thickening the solution when a small amount is added, but then breaking it when an excess is used. Next a 60% gel solution was tested: 4.8 mmol tetramide (14.4 mg/5 mL) and 3.2 mmol piperazine (1.38 mg/5 mL). This combination increased the viscosity of the solution noticeably, and became as thick if not slightly thicker than the standard 8 mmol tetramide solution normally used. Finally, an 80% gel solution was tested: 6.4 mmol tetramide (19.2 mg/5 mL) and 1.6 mmol piperazine (0.68 mg/5 mL). This combination increased the viscosity more than the standard 8 mmol tetramide solution. The gel enhancer may be present at or above a ratio of enhancer:gel of 1:1, or 50%, in some cases.

Several other molecules were tested to see if they thickened (enhanced) the regular TH gel solution. Three chemicals that achieved this result were L-menthol, paraformaldehyde and hydroquinone. Thus the composition of the original gel solution 8 mmol (24 mg in 5 ml hydrocarbon) was altered to see if less of the tetramide could be used, without diminishing the viscosity of the gelled solution. Each chemical was tested in three different compositions: 1) 50:50 solution: 4.0 mmol tetramide, 4.0 mmol other chemical all in 5 ml of hydrocarbon, 2) 60:40 solution: 4.8 mmol tetramide, 3.2 mmol other chemical all in 5 ml of hydrocarbon, and 3) 80:20 solution: 6.4 mmol tetramide, 1.6 mmol other chemical all in 5 ml of hydrocarbon. For L-menthol, the first composition had almost no effect on viscosity, the second caused a slight increase in viscosity, and the third composition was almost as viscous as the standard 8 mmol tetramide solution. Paraformaldehyde performed comparably with L-menthol. For hydroquinone, the first composition had almost no effect on viscosity, the second increased viscosity more than the other two compounds despite still not achieving the same viscosity as the standard 8 mmol solution, and the third composition was as viscous as the standard 8 mmol solution and thicker than the viscosity caused by the other two compounds.

Although hydroquinone appeared to be the most effective thickening agent of these three tested, with an 80:20 gel:enhancer ratio showing viscosity comparable to a 100:0 ratio, none of these three chemicals worked as well as piperazine in this regard. However, the results indicate that hetrocycles, for example with a 1,4 relationship, may work as gel enhancers given that piperazine and hydroquinone seemed to increase viscosity the most of all compounds tested. Thus, the gel enhancer may comprise cyclic heterocycles in some embodiments, for example heterocycle with at least two heteroatoms (neither carbon nor hydrogen) spaced from one another and each having one or more lone pairs of electrons. As stated one 6 atom ring heterocycle example is piperazine. In other embodiments the heterocycle may form a 6 atom ring with the two non carbon atoms located at the 1 and 4 positions or on respective functional groups originating from the 1 and 4 positions. Nitrogen donors may work better than oxygen donors, most likely because of nitrogen's lower electronegativity, which allows its lone pairs to donate better and form more hydrogen bonds. Heterocycles or other types of cross-linkers are believed to work in a fashion similar to clay platelets in drilling, in that the compounds can hydrogen bond on both sides of the compound, thus linking two adjacent gel chains together.

As demonstrated elsewhere in this application, tetramethylammonium hydroxide was tested along with tetra-n-butylammonium hydroxide as additives to the tetramide gel solution to see if breaking or enhancing would occur. The tetra-n-butylammonium hydroxide broke the gel solution once added, however tetramethyl ammonium hydroxide thickened up the solution, thus, showing two different results, which may be due to the different chain lengths of the alkyl groups attached to the nitrogen atom. Like with piperazine, the effect of tetramethyl ammonium hydroxide was tested by replacing a portion of the gel with tetramethyl ammonium hydroxide to see if viscosity could be maintained while using less tetramide gel. As before, the benchmark for viscosity was the 8 mmol solution (24 mg tetramide in 5 ml of TG 740 hydrocarbon). The first composition tested was a 50:50 solution: 4.0 mmol tetramide, 4.0 mmol tetramethyl ammonium hydroxide all in 5 ml of hydrocarbon. This composition caused a slight increase in viscosity at a level comparable with the other gel enhancers. The next composition tested was a 60:40 solution: 4.8 mmol tetramide, 3.2 mmol other chemical all in 5 ml of hydrocarbon. This composition showed a similar result as the 50:50 composition. The last composition tested was a 80:20 solution: 6.4 mmol tetramide, 1.6 mmol other chemical all in 5 ml of hydrocarbon. Again this composition caused no great change in viscosity although the solution remained thick but not as thick as the standard 8 mmol tetramide gel solution. Overall, the tetramethylammonium hydroxide was less effective than piperazine but did show that some of the tetramide could be replaced by another chemical without the viscosity being reduced.

The metal compound gel enhancer, such as a metal salt, may comprise a cation, such as one or more of iron and aluminium. The cation may be complexed, for example chelated using one or more surfactants, to improve solubility in the base fluid. For example, referring to FIGS. 58-60 iron activator in the form of iron (III) sulfate, provided by HGA-65 sold by Weatherford International, was tested in different amounts in the DF-46 gel. HGA-65 is an organometallic complex traditionally used as an activator for phosphate ester gelling agents in hydrocarbon frac fluids. HGA-65 contains citric acid, and amines. FIG. 58 illustrates addition of the gel enhancer after gel formation, and demonstrates that more enhancer equals greater viscosity. FIG. 59 illustrates that addition of the gel enhancer may speed up gelling. FIG. 60 illustrates that the positive effects may drop off as the concentration of pyromellitamide gelling agent decreases past a predetermined concentration or range of concentrations. Success with complexed iron sulfate was unexpected given that pure iron sulfate was shown to have a breaking effect on the gel. However, it is believed that the complexing agents provided with the iron sulfate pull the iron cation into solution within the hydrocarbon base fluid, and bring the iron near the gelling agent molecules where cross-linking with gel molecules may occur or the iron may improve hydrogen bond stability between gel molecules. The breaking action of the pure iron sulfate is thought to be due to the polar iron sulfate chaotropically drawing the gelling agent out of solution with the base fluid.

Other metal compounds, such as polyvalent metal salts, including zinc, may be used. It is thought that the gel enhancer works by cross-linking adjacent gel molecules or by facilitating cross-hydrogen bonding between adjacent gel molecules. The gel enhancer may be present with a surfactant for dispersing the gel enhancer in the base fluid, for example in the case of iron sulfate where citrate and amines are present. Dispersing such as dissolving into solution allows the gel enhancer to access the gel molecules in order to carry out the desired enhancement. In other cases the gel enhancer may be soluble in pure form in the base fluid.

In general, compounds like metal salts that are able to cross link the gel to provide additional viscosity may be used as gel enhancers. For example, $Al^{3+}$ and $Fe^{3+}$ have been tested and both work. At higher concentrations, complexed iron (III) sulphate may be less effective as an enhancer. $Al^{3+}$ may be provided in the form of aluminum isopropoxide, with the Al part enhancing gelling and the propoxide breaking the gel as discussed above, so that the viscosity profile contains a spike in viscosity. Other metal alkoxides may be used as gel enhancers, and in some cases as breakers as well, for example as a water activatable breaker provided in conjunction with a hydrate in the fluid to release water and transform alkoxide into alcohol. In some cases alkoxides are excluded as gel enhancers.

As disclosed above, the gelling agent may form a hydrogen-bond network through intermolecular hydrogen bonds between the amide branches of adjacent gelling agent molecules. The gel enhancer may improve gelling by cross-linking the intermolecular hydrogen bonds or facilitating the intermolecular hydrogen bonds. Cross-linking may be done by hydrogen bond bridging two amide branches with an enhancer. Facilitation may include stabilization a direct hydrogen bond between amide branches.

The gel enhancer may comprise a salt of an aromatic carboxylic acid, such as an ibuprofen salt (Table 0). Other salts include salts of hydrocinnamic acid, diphenylacetic acid, benzoic acid, and phenylacetic acid. It is believed that the COO— hydrogen bonds between amide branches (cross-linking), and the aromatic moiety on the enhancer interacts with the aromatic moiety on the gel, stabilizing the gel. As discussed above the COO— salt may be more water soluble than the COOH and thus the salt may only be retained at a relatively low concentration in the hydrocarbon phase with the gel. By contrast the protonated COOH versions of aromatic carboxylic acids may act as breakers of the gel, see above.

As discussed above, the gel enhancer may also operate as a breaker in different conditions or configurations. One example of a dual function breaker/enhancer is an aromatic carboxylic acid. A modifier may be added to the gel, the modifier being selected to convert the gel enhancer into a breaker. In some cases, the gel enhancer is present in the gel below a threshold concentration above which the gel enhancer becomes a breaker, and in which the modifier comprises an additional source of gel enhancer sufficient to raise the concentration of gel enhancer to above the threshold concentration. Examples of concentration dependent dual function breaker/enhancers include piperidine (see Table 0) and piperazine. The additional source of enhancer may be supplied in a coated form for delayed release. In other cases, the modifier may be a chemical selected to chemically modify the existing gel enhancer. For example, if piperidine is used as an enhancer, the modifier may comprise benzylamine. For further example, if an aromatic carboxylic acid salt is used as an enhancer, the modifier may comprise a protonation source such as an acid, or a cation complexing agent such as citric acid.

The gel enhancer may comprise one or more of ammonium chloride, melamine, choline chloride, and hexamethylene diaminochloride (Table 0). Other enhancers may be used.

In some cases one or more, for example each, of the amide branches are connected to the aromatic core via a carbon-nitrogen bond. Structures (8)-(12) are examples of such gelling agents. The gelling agents may have three or four amide branches, for example four as shown below. Each organic group may be an alkyl group, such as a C6-24 straight chain alkyl group as shown below. FIG. 64 illustrates the viscosity performance of compounds (8), (9), and (12), at 5 mM in TG740 at room temperature.

Preparation of N,N',N'',N'''-(benzene-1,2,4,5-tetrayl) tetrahexanamide (8)

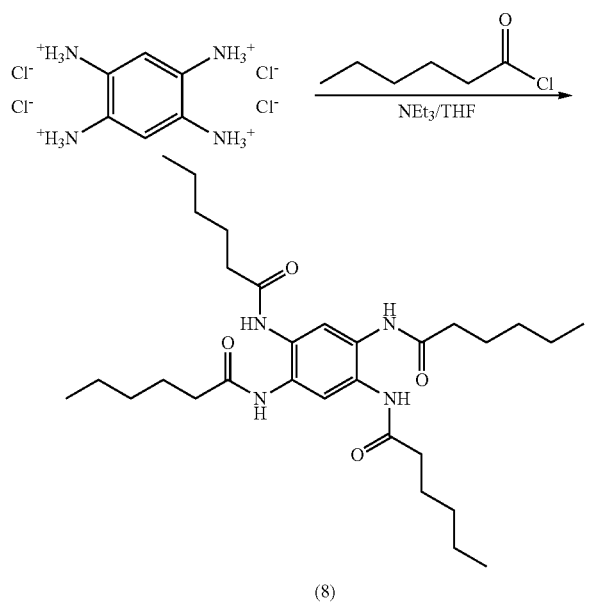

(8)

Procedure. Benzene-1,2,4,5-tetraammonium chloride (2.0 g, 7.0 mmol), triethylamine (5.8 cm3, 42.0 mmol) and dry tetrahydrofuran (150 cm3) were added to a round bottom flask charged with a magnetic stirrer and mixed thoroughly until most of the solid had dissolved. To the solution hexanoyl chloride (4.9 cm3, 35.0 mmol) was added slowly, causing the pink colour in the solution to disappear and a white precipitate to form. The solution was filtered, the solvent removed using a rotary evaporator and the crude orange solid dissolved in toluene (50 cm3) and added dropwise to a solution of vigorously stirred ethanol (200 cm3) to re-precipitate the product. The white solid was filtered off and dried under vacuum to give the desired product as a slightly sticky off-white solid (2.43 g, 61.8%).

Preparation of N,N',N'',N'''-(benzene-1,2,4,5-tetrayl) tetraheptanamide (9)

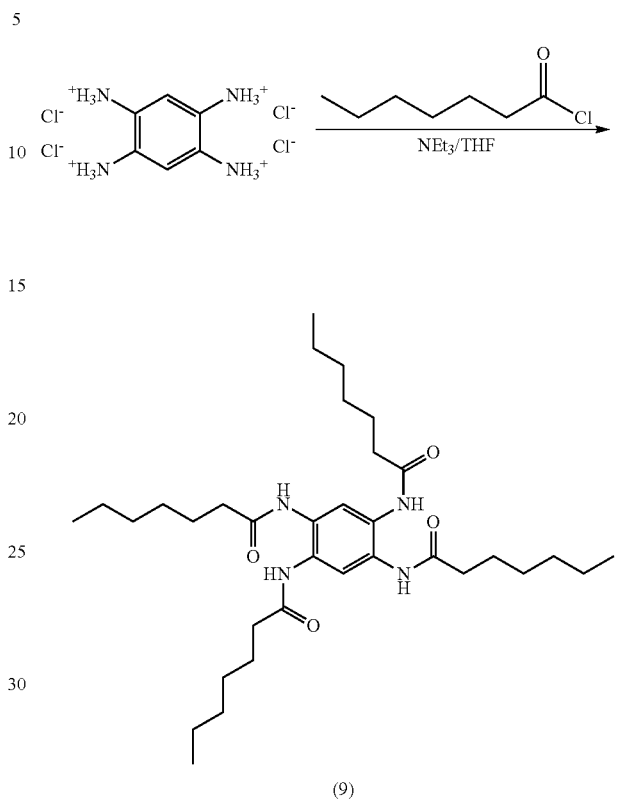

(9)

Procedure. Benzene-1,2,4,5-tetraammonium chloride (1.0 g, 3.5 mmol), triethylamine (2.8 cm3, 20.0 mmol) and dry tetrahydrofuran (50 cm3) were added to a round bottom flask charged with a magnetic stirrer and mixed thoroughly until most of the solid had dissolved. To the solution heptanoyl chloride (2.3 cm3, 15.0 mmol) was added slowly, causing the dark pink solution to turn brown and a precipitate to form. The solution was filtered, the solvent removed using a rotary evaporator yielding an orange solid that when dissolved in toluene (30 cm3) and added to a solution of vigorously stirred ethanol (200 cm3) to re-precipitate the product. The white solid was filtered off and dried under vacuum to give the desired product as a slightly sticky off white solid (0.88 g, 43.0%).

Preparation of N,N',N'',N'''-(benzene-1,2,4,5-tetrayl) tetraoctanamide (10)

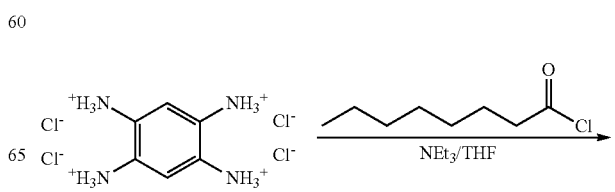

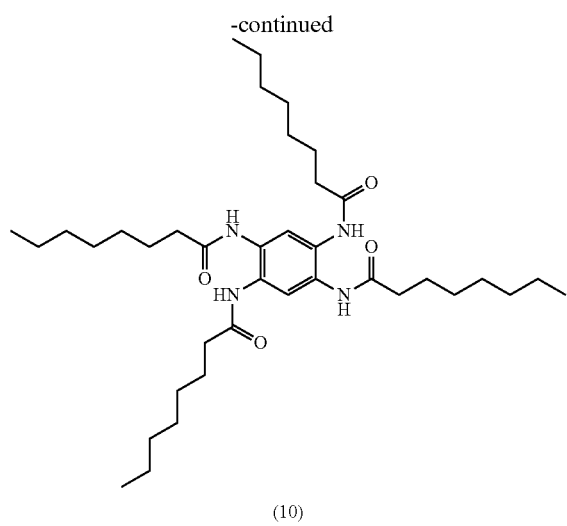

(10)

Procedure. Benzene-1,2,4,5-tetraammonium chloride (1.0 g, 3.5 mmol), triethylamine (2.8 cm3, 20.0 mmol) and dry tetrahydrofuran (50 cm3) were added to a round bottom flask charged with a magnetic stirrer and mixed thoroughly until most of the solid had dissolved. To the solution octanoyl chloride (2.5 cm3, 15.0 mmol) was added slowly, causing the dark pink solution to turn brown and a precipitate to form. The solution was filtered, the solvent removed using a rotary evaporator yielding an orange solid that when dissolved in toluene (30 cm3) and added to a solution of vigorously stirred ethanol (200 cm3) to re-precipitate the product. The white solid was filtered off and dried under vacuum to give the desired product as an off white solid (1.17 g, 51.7%).

Preparation of N,N',N'',N'''-(benzene-1,2,4,5-tetrayl) tetradecanamide (11)

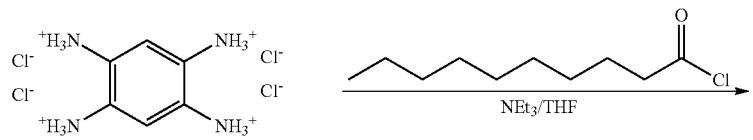

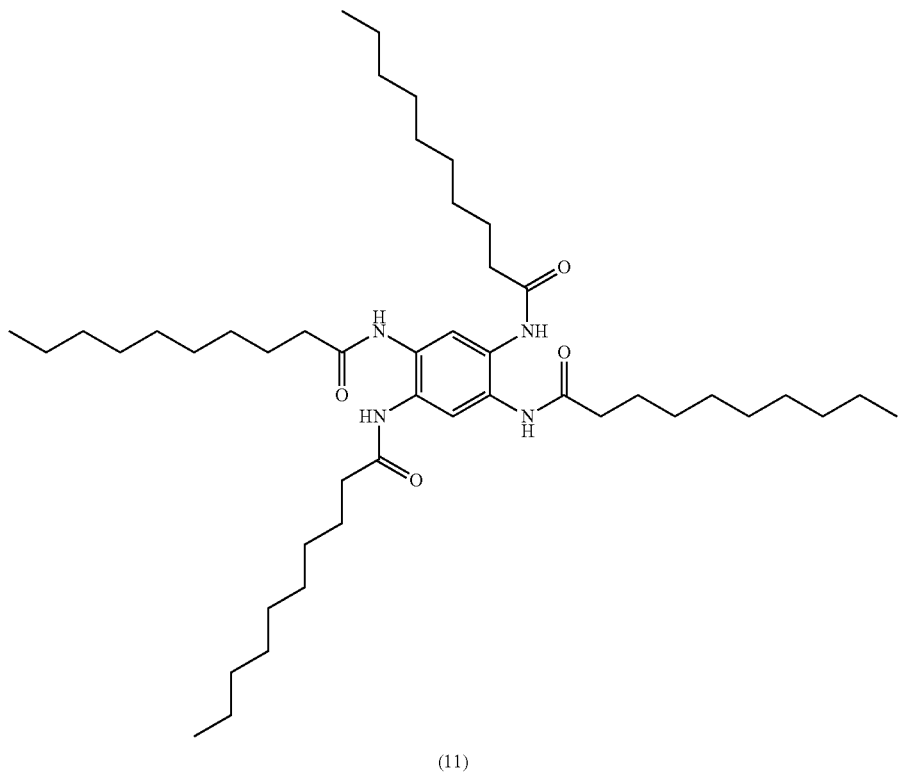

(11)

Procedure. Benzene-1,2,4,5-tetraammonium chloride (1.0 g, 3.5 mmol), triethylamine (2.8 cm3, 20.0 mmol) and dry tetrahydrofuran (50 cm3) were added to a round bottom flask charged with a magnetic stirrer and mixed thoroughly until most of the solid had dissolved. To the solution decanoyl chloride (3.1 cm3, 15.0 mmol) was added slowly, causing the dark pink solution to turn brown and a precipitate to form. The solution was filtered, the solvent removed using a rotary evaporator yielding an orange solid that when dissolved in toluene (30 cm3) and added to a solution of vigorously stirred ethanol (200 cm3) to re-precipitate the product. The white solid was filtered off and dried under vacuum to give the desired product as an off white solid (1.24 g, 46.6%).

Preparation of N,N',N'',N'''-(benzene-1,2,4,5-tetrayl)tetradodecanamide (12)

Procedure. Benzene-1,2,4,5-tetraammonium chloride (1.0 g, 3.5 mmol), triethylamine (2.8 cm3, 20.0 mmol) and dry tetrahydrofuran (50 cm3) were added to a round bottom flask charged with a magnetic stirrer and mixed thoroughly until most of the solid had dissolved. To the solution dodecanoyl chloride (3.6 cm3, 15.0 mmol) was added slowly, causing the dark pink solution to turn brown and a precipitate to form. The solution was filtered, the solvent removed using a rotary evaporator yielding an orange solid that when dissolved in toluene (30 cm3) and added to a solution of vigorously stirred ethanol (200 cm3) to re-precipitate the product. The white solid was filtered off and dried under vacuum to give the desired product as an off white solid (1.34 g, 44.0%).

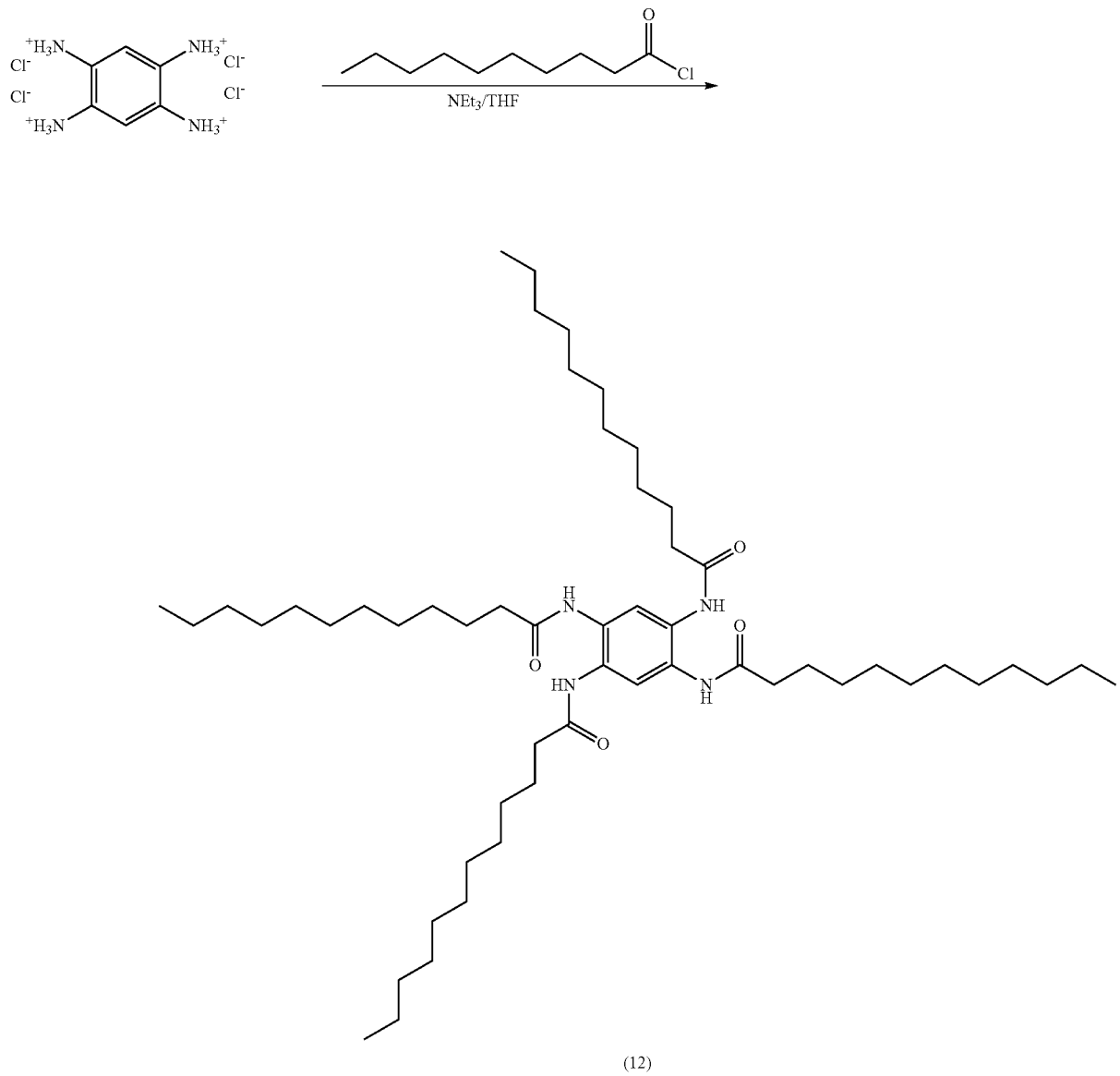

(12)

TABLE 19

Percentage yield, melting point, and viscosity values of the N,N',N'',N'''-(benzene-*) gels

| Abbreviated compound name | Yield (%) | m.p. (° C.) | Average Viscosity in TG740 (cP) | Average Viscosity in SynDrill 810 (cP) |
|---|---|---|---|---|
| Hexanamide | 61.8 | Decomposed | 40.93 | Insoluble |
| Heptanamide | 40.3 | Decomposed | 65.49 | 96.41 |
| Octanamide | 51.7 | Decomposed | Insoluble | 88.16 |
| Nonanamide | 41.2 | Decomposed | 11.39 | 84.64 |
| Decanamide | 46.6 | 299.8-300.4 | 24.66 | 78.34 |
| Dodecanamide | 44.0 | 300.1-301.6 | 0.56 | 15.47 |

In some embodiments the gelling agent has the form of compounds (13) or (14) below, in which R independently represent hydrocarbon or a hydrocarbon group with 1-29 carbon atoms, and R1 independently represents a hydrocarbon group with 1-29 carbon atoms. Further examples of these and other suitable gelling agents are disclosed in U.S. Pat. No. 6,645,577, which describe gel forming compounds. Such compounds are believed to be thus suitable for use with downhole fluids. A synthesis example of one such compound (15) is detailed below.

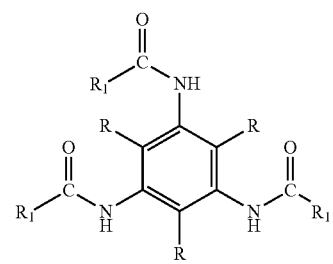
(13)

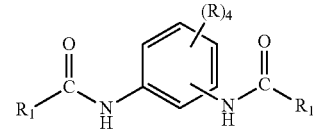
(14)

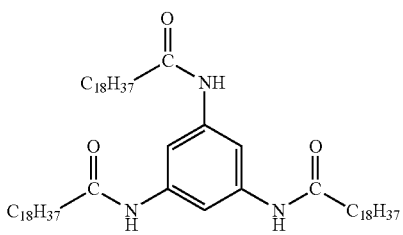
(15)

Procedure. In 70 ml of tetrahydrofuran (THF), 0.7 g of 1,3,5-benzenetricarboxylic acid and 2.5 g of stearylamine were dissolved. To the solution, 3.6 g of 1-ethyl-3-(3-dimethylaminopropyl) carbodiimide hydrochloride (WSC: water-soluble carbodiimide) and 2.52 g of 1-hydroxy-1H-benzotriazole (HOBT) were added, and then 5 ml of triethylamine (TEA) was added dropwise on an ice bath. After the addition, the mixture was stirred for 2 hours on the ice bath and further stirred at room temperature. The reaction mixture was recovered by filtration and dissolved in chloroform. Successive washings with diluted hydrochloric acid, sodium bicarbonate aqueous solution, and water followed. The product was dried with anhydrous sodium sulfate and recrystallized to obtain 4.0 g of an objective compound (15) shown above.

In some embodiments one or more of the amide branches is connected to the aromatic core via a carbon-carbon bond and one or more of the amide branches are connected to the aromatic core via a carbon-nitrogen bond. Examples of such structures with varying proportions of N—C and C—C connections include the form of compounds (16)-(18) below:

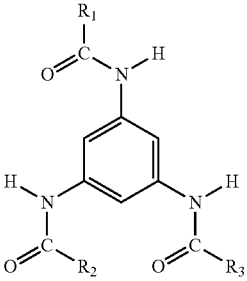
(16)

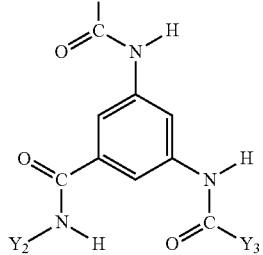
(17)

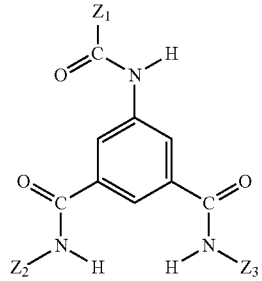
(18)

In the examples of (16)-(18) above, R1, R2 and R3, or Y1, Y2 and Y3, or Z1, Z2 and Z3 independently of one another are C1-C20alkyl unsubstituted or substituted by one or more hydroxy; C2-C20alkenyl unsubstituted or substituted by one or more hydroxy; C2-C20alkyl interrupted by oxygen or sulfur; C3-C12cycloalkyl unsubstituted or substituted by one or more C1-C20alkyl; (C3-C12cycloalkyl)-C1-C10alkyl unsubstituted or substituted by one or more C1-C20alkyl; bis[C3-C12cycloalkyl]-C1-C10alkyl unsubstituted or substituted by one or more C1-C20alkyl; a bicyclic or tricyclic hydrocarbon radical with 5 to 20 carbon atoms unsubstituted or substituted by one or more C1-C20alkyl; phenyl unsubstituted or substituted by one or more radicals selected from C1-C20alkyl, C1-C20alkoxy, C1-C20alkylamino, di(C1-C20alkyl)amino, hydroxy and nitro; phenyl-C1-C20alkyl unsubstituted or substituted by one or more radicals selected from C1-C20alkyl, C3-C12cycloalkyl, phenyl, C1-C20alkoxy and hydroxy; phenylethenyl unsubstituted or substituted by one or more C1-C20alkyl; biphenyl-(C1-C10alkyl) unsubstituted or substituted by one or more C1-C20alkyl; naphthyl unsubstituted or substituted by one or more C1-C20alkyl; naphthyl-C1-

C20alkyl unsubstituted or substituted by one or more C1-C20alkyl; naphthoxymethyl unsubstituted or substituted by one or more C1-C2alkyl; biphenylenyl, flourenyl, anthryl; a 5- to 6-membered heterocyclic radical unsubstituted or substituted by one or more C1-C20alkyl; a C1-C20 hydrocarbon radical containing one or more halogen; or tri(C1-C10alkyl)silyl(C1-C10alkyl); with the proviso that at least one of the radicals R1, R2 and R3, or Y1, Y2 and Y3, or Z1, Z2 and Z3 is branched C3-C20alkyl unsubstituted or substituted by one or more hydroxy; C2-C20alkyl interrupted by oxygen or sulfur; C3-C12cycloalkyl unsubstituted or substituted by one or more C1-C20alkyl; (C3-C12cycloalkyl)-C1-C10alkyl unsubstituted or substituted by one or more C1-C20alkyl; a bicyclic or tricyclic hydrocarbon radical with 5 to 20 carbon atoms unsubstituted or substituted by one or more C1-C20alkyl; phenyl unsubstituted or substituted by one or more radicals selected from C1-C20alkyl, C1-C20alkoxy, C1-C20alkylamino, di(C1-C20alkyl)amino, hydroxy and nitro; phenyl-C1-C20alkyl unsubstituted or substituted by one or more radicals selected from C1-C20alkyl, C3-C12cycloalkyl, phenyl, C1-C20alkoxy and hydroxy; biphenyl-(C1-C10alkyl) unsubstituted or substituted by one or more C1-C20alkyl; naphthyl-C1-C20alkyl unsubstituted or substituted by one or more C1-C20alkyl; or tri(C1-C10alkyl)silyl(C1-C10alkyl).

Further examples of (16)-(18) and other suitable gelling agents are disclosed in U.S. Pat. No. 7,790,793, which describes gelling agents for the preparation of gel sticks and that improve the gel stability of water and organic solvent based systems. Such gelling agents are believed to be thus suitable for use with downhole fluids. A synthesis example of one such compound (19) is detailed below.

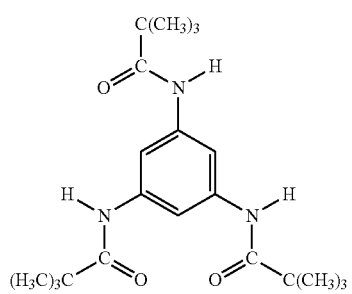

(19)

1.00 g (4.3 mmol) of 1,3,5-triaminobenzene trishydrochloride (See Example A) and 0.1 g of LiCl are added under inert atmosphere to 50 ml of dry NMP and 10 ml of dry pyridine and cooled to 5.degree. C. 1.73 g (14.3 mmol) of pivaloyl chloride is added. The reaction mixture is heated to 60.degree. C. and stirred. After 24 hours the reaction mixture is added to 1000 ml of ice water. The precipitate is filtered off. Customary work-up (recrystallization from tetrahydrofuran) gives the desired product (19).

As shown above, the gelling agents may have benzene as an aromatic core. However, other aromatic cores may be used. For example, naphthalene may be used as an aromatic core. Aromatic cores may be flat and are expected to facilitate the formation of the layered gel mechanism discussed above.

As shown above, each amide branch may have one organic group or side chain. However, in some cases one or more of the amide branches have two organic groups. For example, the amide branch connects to the aromatic core via a carbon-nitrogen bond, the nitrogen has an alkyl group and the carbonyl carbon has an organic group. Other examples may be used. One or more amide branches may have two organic groups on the amide nitrogen, so long as at least one, two, or more amide branches have an amide nitrogen with a free hydrogen for hydrogen bonding. In other cases each amide branch nitrogen has one hydrogen atom for maximum facilitation of hydrogen-bonding and gel formation.

Non-alkyl organic side chains may be used. Organic groups with five or less carbon atoms may be used.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A fluid comprising a base fluid, a gelling agent, a gel enhancer and a modifier selected to convert the gel enhancer into a breaker, in which the gelling agent has an aromatic core of one or more aromatic rings, the gelling agent has two or more amide branches distributed about the aromatic core, and each of the two or more amide branches has one or more organic groups, and in which the gelling agent forms a hydrogen-bond network through intermolecular hydrogen bonds between the amide branches of adjacent gelling agent molecules, and in which the gel enhancer cross-links the intermolecular hydrogen bonds or facilitates the intermolecular hydrogen bonds.

2. The fluid of claim 1 in which the gel enhancer is present below a threshold concentration above which the gel enhancer becomes a breaker, and in which the modifier comprises an additional source of gel enhancer sufficient to raise the concentration of gel enhancer to above the threshold concentration.

3. A fluid comprising a base fluid, a gelling agent, and a gel enhancer, in which the gelling agent has an aromatic core of one or more aromatic rings, the gelling agent has four amide branches distributed about the aromatic core, and each of the amide branches has one or more organic groups.

4. A fluid comprising a base fluid, a gelling agent, and a gel enhancer, in which the gelling agent has an aromatic core of one or more aromatic rings, the gelling agent has two or more amide branches distributed about the aromatic core, and each of the two or more amide branches has one or more organic groups, in which the gelling agent is a pyromellitamide gelling agent and has the general formula of:

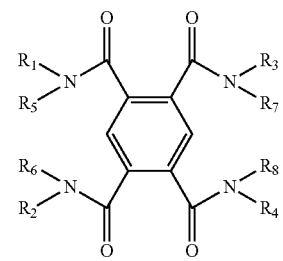

with $R_1$, $R_2$, $R_3$, $R_4$, $R_5$, $R_6$, $R_7$, and $R_8$ each being a hydrogen or an organic group.

5. The fluid of claim 4 in which $R_5$, $R_6$, $R_7$, and $R_8$ are each hydrogens and one or more of $R_1$, $R_2$, $R_3$, and $R_4$ are each an alkyl group.

6. The fluid of claim 5 in which $R_1$, $R_2$, $R_3$, and $R_4$ are each alkyl groups.

7. The fluid of claim 6 in which $R_1=R_2=R_3=R_4$.

8. The fluid of claim 7 in which $R_1$, $R_2$, $R_3$, and $R_4$ each have at least 6 carbon atoms.

9. The fluid of claim 6 in which each alkyl group has 6-24 carbon atoms.

10. The fluid of claim 9 in which each alkyl group has 6-10 carbon atoms.

11. The fluid of claim 5 in which each alkyl group is one or more of straight chain, branched, or cyclic.

12. The fluid of claim 11 in which each alkyl group is straight chain.

13. The fluid of claim 12 in which $R_5$, $R_6$, $R_7$, and $R_8$ are each hydrogens, and $R_1$, $R_2$, $R_3$, and $R_4$ are each straight chain alkyl groups with 6-10 carbon atoms.

14. The fluid of claim 13 in which $R_1$, $R_2$, $R_3$, and $R_4$ have 6 carbon atoms.

15. The fluid of claim 9 in which each alkyl group has 6 carbon atoms.

16. A fluid comprising a base fluid, a gelling agent, a gel enhancer, and a breaker, in which the gelling agent has an aromatic core of one or more aromatic rings, the gelling agent has two or more amide branches distributed about the aromatic core, and each of the two or more amide branches has one or more organic groups, in which the breaker further comprises a coating.

17. The fluid of claim 16 in which the coating further comprises wax.

18. The fluid of claim 9 in which each alkyl group has 8 carbon atoms.

19. A fluid comprising a base fluid, a gelling agent, and a gel enhancer, in which the gelling agent has an aromatic core of one or more aromatic rings, the gelling agent has four or more amide branches distributed about the aromatic core, and each of the four or more amide branches has one or more organic groups, in which each of the amide branches is connected to the aromatic core via a carbon-carbon or carbon-nitrogen bond, and in which one or more of the amide branches are connected to the aromatic core via a carbon-nitrogen bond.

20. A fluid comprising a base fluid, a gelling agent, and a gel enhancer, in which the gelling agent has an aromatic core of one or more aromatic rings, the gelling agent has four amide branches distributed about the aromatic core, and each of the four amide branches has one or more organic groups, in which each of the amide branches is connected to the aromatic core via a carbon-carbon or carbon-nitrogen bond, and in which one or more of the amide branches are connected to the aromatic core via a carbon-nitrogen bond.

21. A fluid comprising a base fluid, a gelling agent, a gel enhancer, and a breaker, in which the gelling agent has an aromatic core of one or more aromatic rings, the gelling agent has two or more amide branches distributed about the aromatic core, and each of the two or more amide branches has one or more organic groups, wherein the breaker comprises ibuprofen.

22. The fluid of claim 18 in which each alkyl group is a straight chain alkyl group.

23. The fluid of claim 15 in which each alkyl group is a straight chain alkyl group.

* * * * *